United States Patent
Matsui et al.

[11] Patent Number: 5,878,949
[45] Date of Patent: Mar. 9, 1999

[54] TEMPERATURE-ACTUATED VALVE DEVICE AND FLOW PASSAGE SWITCHING VALVE USING SUCH DEVICE

[75] Inventors: Hideyuki Matsui; Masatoshi Enoki, both of Kitakyushu; Tsutomu Kato, Yokohama; Tetsuo Masatake, Yokohama; Toshiyuki Ooshima, Yokohama, all of Japan

[73] Assignees: Toto Ltd., Fukuoka-Ken; Piolax, Inc., Kanagawa-Ken, both of Japan

[21] Appl. No.: 849,053

[22] PCT Filed: Sep. 30, 1996

[86] PCT No.: PCT/JP96/02481

§ 371 Date: May 29, 1997

§ 102(e) Date: May 29, 1997

[87] PCT Pub. No.: WO97/12164

PCT Pub. Date: Apr. 3, 1997

[30] Foreign Application Priority Data

| Sep. 29, 1995 | [JP] | Japan | 7-254271 |
| Feb. 16, 1996 | [JP] | Japan | 8-029071 |
| Jul. 31, 1996 | [JP] | Japan | 8-202386 |

[51] Int. Cl.$^6$ ............................................... G05D 23/02
[52] U.S. Cl. .................. 236/93 R; 137/509; 236/101 D; 251/212
[58] Field of Search ................. 236/80 G, 87, 236/93 R, 93 B, 101 D; 137/509; 251/212

[56] References Cited

U.S. PATENT DOCUMENTS

| 2,271,850 | 2/1942 | Zinkil | 236/80 G |
| 3,265,303 | 8/1966 | Harris | 236/80 G |
| 3,452,929 | 7/1969 | Douglas | 236/80 G |
| 4,778,104 | 10/1988 | Fisher | 236/101 D |
| 5,259,554 | 11/1993 | Ewing et al. | 236/87 |
| 5,584,432 | 12/1996 | Lockhart | 236/87 |

FOREIGN PATENT DOCUMENTS

| 56-32679 | of 1981 | Japan . |
| 59-159475 | 9/1984 | Japan . |
| 61-41500 | of 1986 | Japan . |
| 62-228776 | 10/1987 | Japan . |
| 364751 | of 1991 | Japan . |
| 3-9184 | 1/1991 | Japan . |

*Primary Examiner*—William E. Tapolcai
*Attorney, Agent, or Firm*—Birch, Stewart, Kolasch & Birch, LLP

[57] ABSTRACT

A temperature-actuated valve device which comprises a body 5 provided with a fluid inlet opening 6b and a fluid outlet opening 5a, a vale seat 5b formed on the peripheral edge of the outlet opening 5a, a main valve body 8 which is disposed movably within the body 5 in the flow direction of fluid and which is brought into and out of an abutting engagement with the outlet opening 5a to perform the opening and closing operation, a pilot valve body 7 which is disposed movably within the body 5 in the same direction as the direction of movement of the main valve body 8 and which is of a tubular shape causing a change in the fluid pressure acting on the upstream side or the downstream side of the main valve body 8, and a temperature-actuated spring 11 which is linked to the pilot valve body 7 and which deforms when it reaches a predetermined temperature and above. When the temperature of fluid reaches a predetermined temperature and above, the temperature-actuated spring 11 deforms in the direction of expansion, thereby causing the pilot valve body 7 to be moved and causing the fluid pressure acting on the downstream side of the main valve body 8 to be reduced, whereby the main valve body 8 is brought into an abutting engagement with the valve seat 5b to shut off the outflow of the fluid.

9 Claims, 44 Drawing Sheets

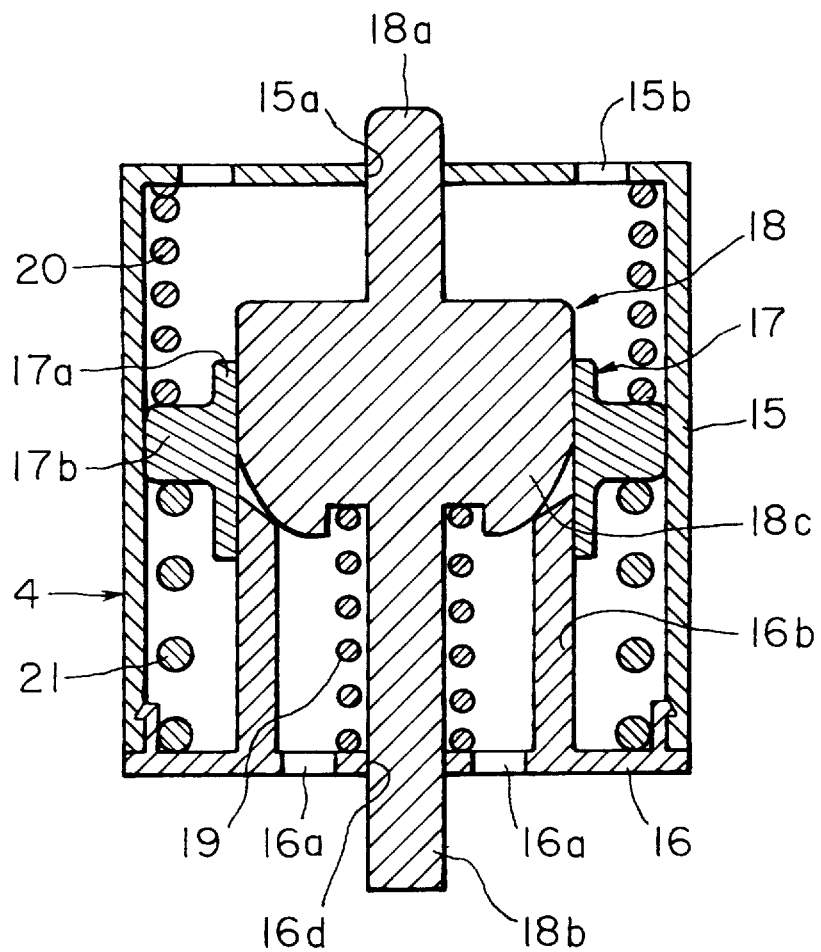
F I G. 7

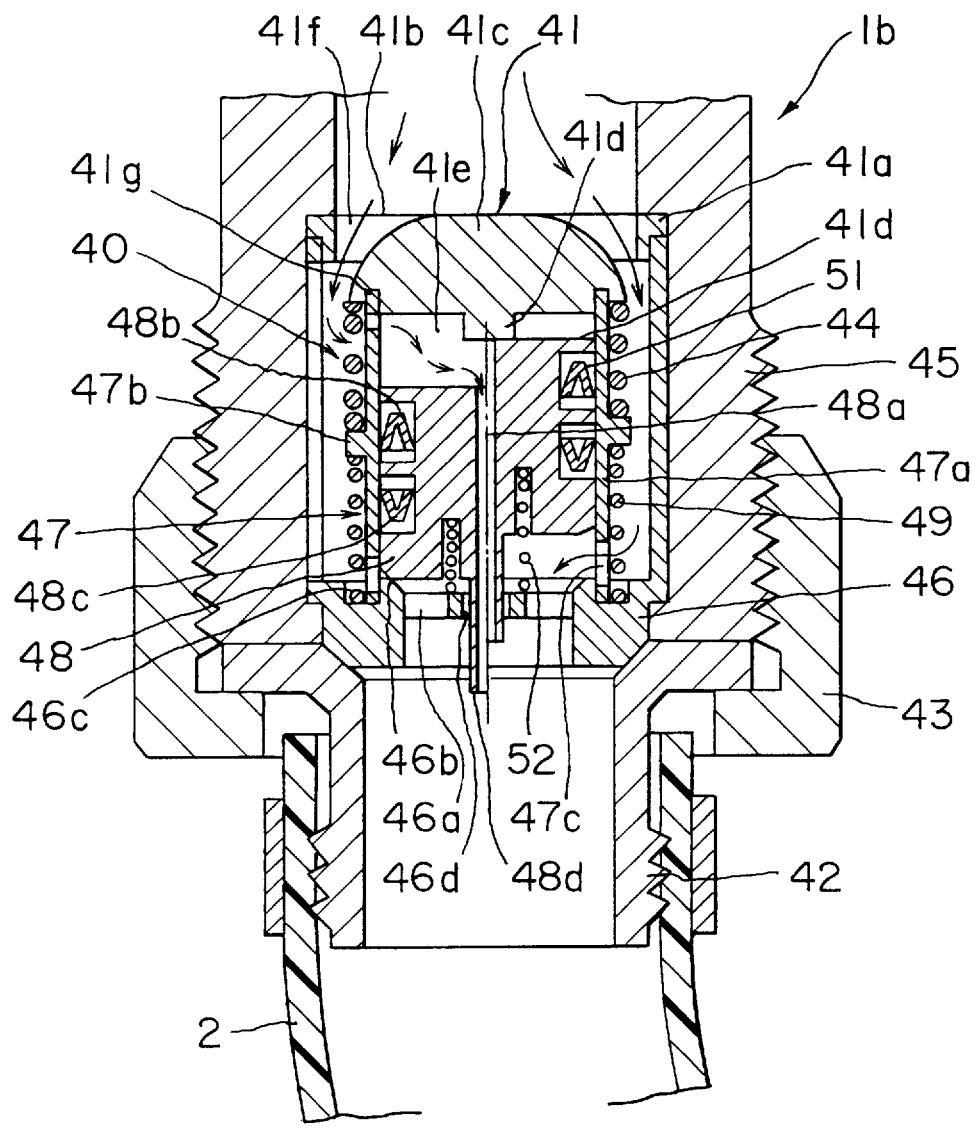
F I G. 20

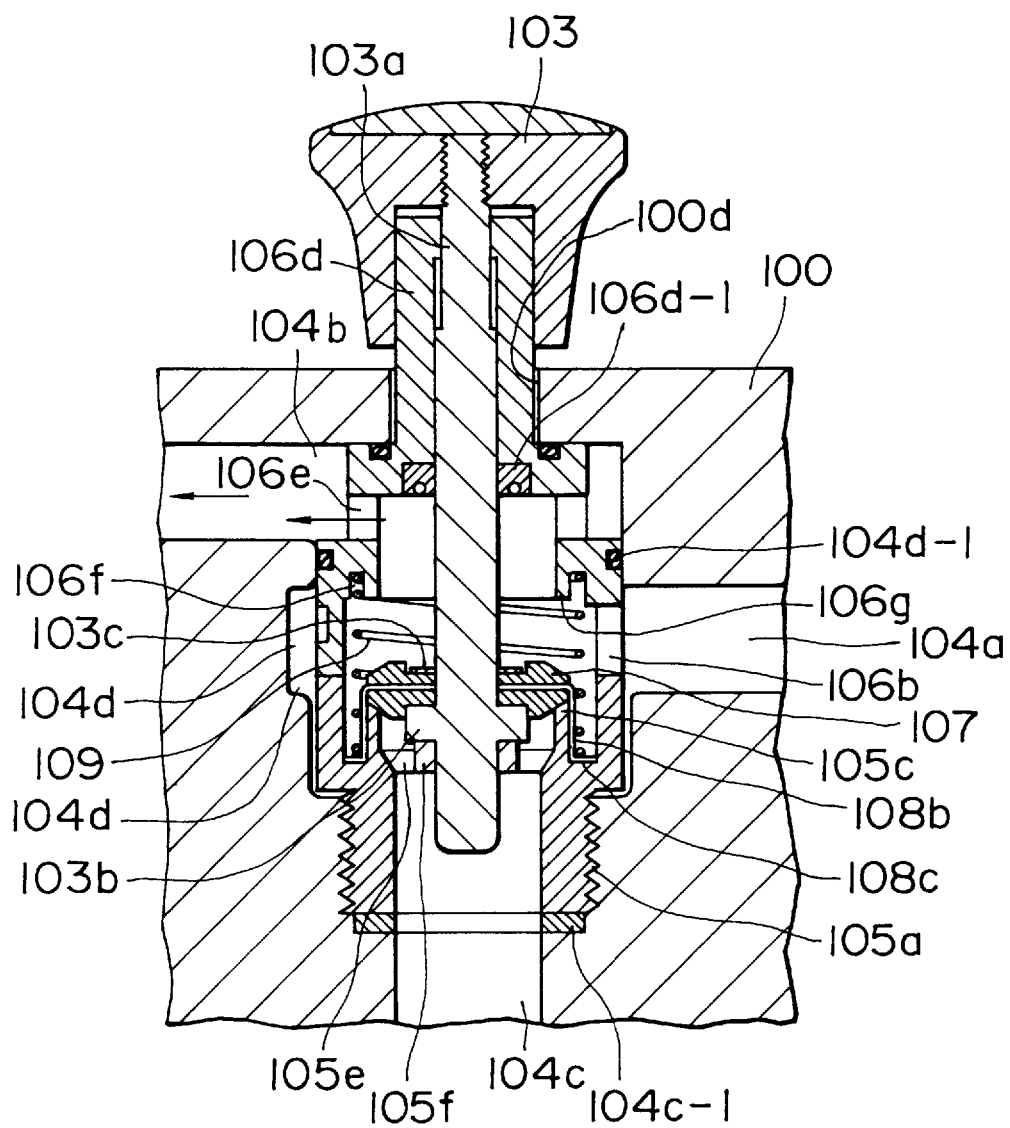
F I G. 24

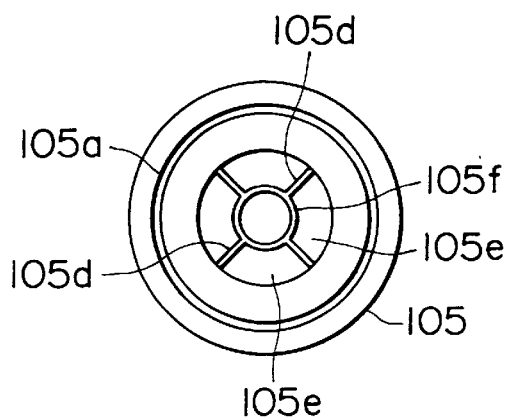 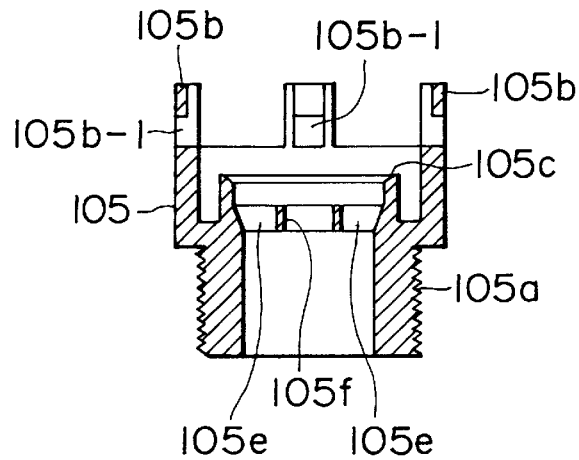
F I G. 26A  F I G. 26B
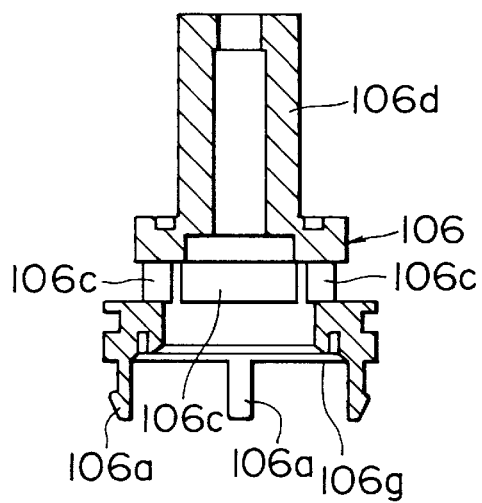
F I G. 27

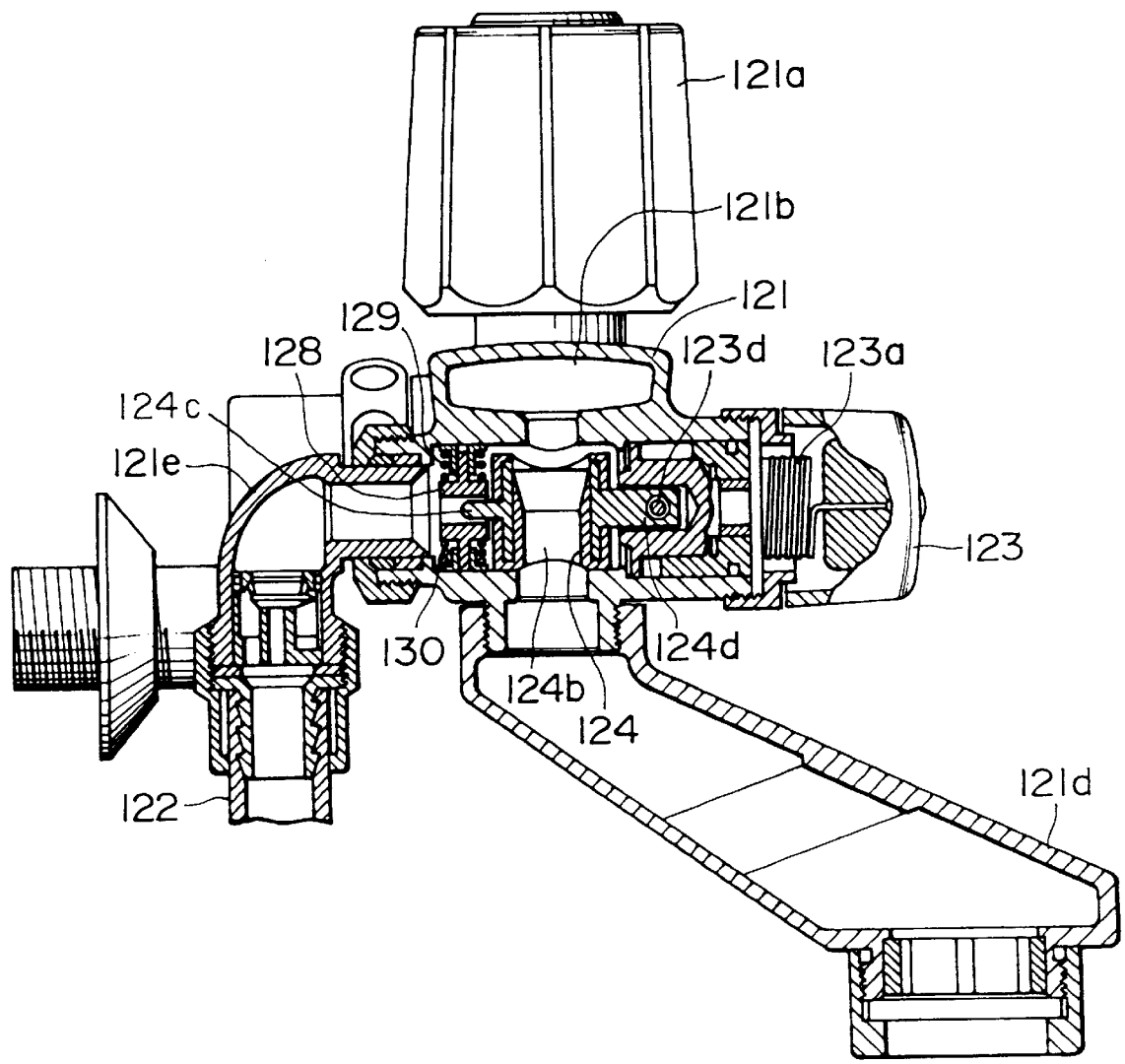
F I G. 39

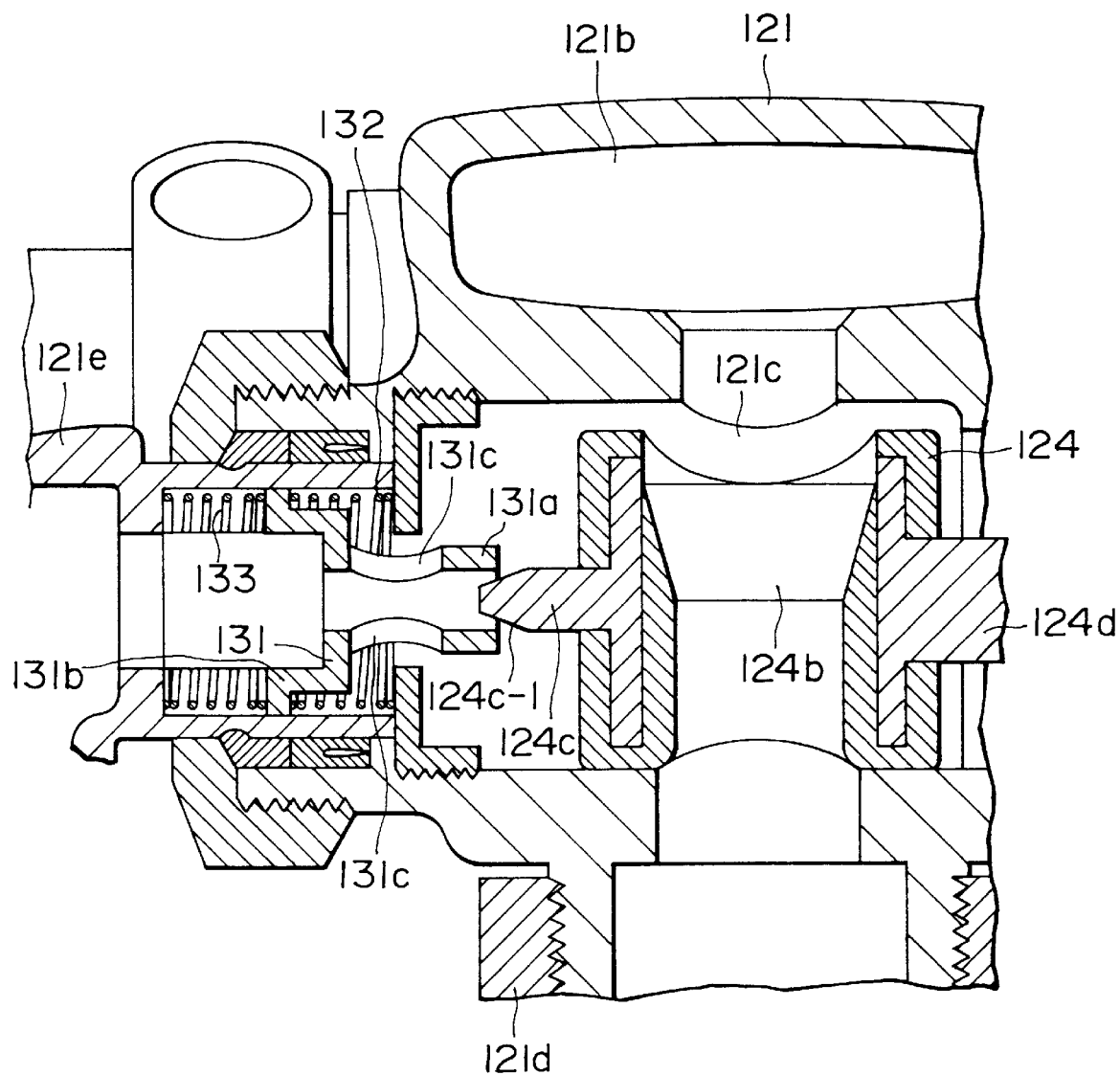
F I G. 41

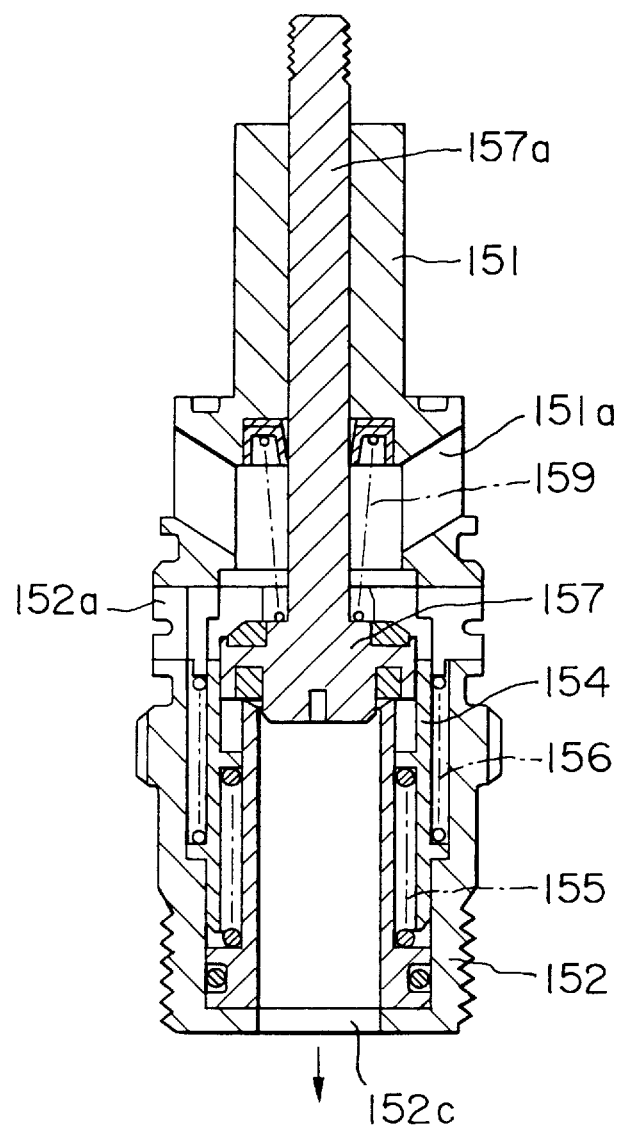
F I G. 48

TEMPERATURE-ACTUATED VALVE DEVICE AND FLOW PASSAGE SWITCHING VALVE USING SUCH DEVICE

TECHNICAL FIELD

This invention relates to a temperature-actuated valve device for preventing the delivery of hot water having a temperature higher than the optimum temperature of use, for example, in a shower device, and a flow passage switching valve using such temperature-actuated valve device.

BACKGROUND ART

For example, as a shower device in a bath room, there has been generally used a type of shower device with the hot water having an appropriate temperature being sprayed from a shower head connected to a hot and cold water mixing valve by means of a hose. In such shower device, the temperature of sprayed water is set by adjusting the valve opening degree at the cold water side and hot water side of the hot and cold water mixing valve by means of a wide variety of mechanisms.

In the operation of a shower, the case has actually occurred where the temperature of sprayed water becomes higher and lower than the set value due to a sudden change in the supply pressure of the cold water and hot water and some other causes. In this case, since the sprayed water has an extremely high temperature, some danger is involved, and so provision of a temperature-actuated valve is effective, such valve being so constituted that, if the temperature of hot water which flows toward the shower head exceeds a certain level, the supply of such hot water is shut-off.

Such temperature-actuated valve is described, for example, in JPB Hei-3-64751, the outline of which is shown in FIG. 50.

This temperature-actuated valve comprises a valve seat 251 incorporated into the internal flow passage of a body 250, a lift valve type of valve body 252 which is adapted to be brought into a seating engagement with the valve seat 251, and a damper spring 253 and a coil spring 254 made of a shape-memory alloy arranged so as to hold therebetween a shift ring 252a provided on the valve body 252.

The coil spring 254 maintains a contracted shape up to a certain temperature, so that the valve body 252 is maintained in the position where it is shifted downward in the drawing, and the seating surface of the valve body 252 is brought out of engagement with the valve seat 251 to thereby open the flow passage. When the temperature exceeds a certain temperature, the coil spring 254 expands due to its shape-memory property and the valve body 252 is brought into a seating engagement with the valve seat 251 to close the flow passage, so that supply of the hot water having a high temperature is shut-off.

Further, there is another construction described, for example, in JPU Sho-61-41500, in which a valve body is provided in the direction of traversing the section of a flow passage, and a coil-like temperature sensing expansion body made of a shape-memory alloy is linked coaxially to the moving direction of the valve body. When the temperature of hot water passing therethrough exceeds the set temperature (for example, 50 degrees centigrade), the valve body is shifted due to the coil-like temperature sensing expansion body to thereby close the flow passage.

The lift valve type of valve body 252 has a considerably large flow resistance, since the valve is closed in a way to gradually narrow the flow passage between the valve body 252 and the valve seat 251. This requires an elastic reaction force of the coil spring 254 made of a shape-memory alloy to be made large, in order that the coil spring 254 shifts the valve body 252 in the direction of closing the valve body 252.

However, although the elastic reaction force of the coil spring 254 depends on the quality of material and the heat treatment of a wire rod, it is also proportional to the size of the outer diameter of the wire rod and, therefore, in order to drive the valve body 252 of the above-described lift valve type, it is necessary to make the wire rod of the coil spring 254 thick. If the coil spring 254 is made large in this way, an influence on the aspect of cost cannot be ignored because the raw material thereof is an expensive shape-memory alloy.

Moreover, if the outer diameter of the wire rod of the coil spring 254 is great, the distance between the winding loops of the coil becomes small. Since the hot water flows to the downstream side passing from the outside of the coil spring 254 through the inside thereof, the resistance of the flow passage becomes large. Accordingly, a quantity of the flow is also limited, and if one attempts to ensure the quantity of flow, it is necessary to make the whole valve large in size.

In the valve body 252 of the lift valve type, since the position thereof is held by the elastic support of the spring, when the flow rate and pressure of hot water is large, the position of the valve body 252 is apt to be changed by a change in the flow pressure of hot water. For this reason, a degree of opening the flow passage by the valve body 252 changes, so that the hot water which is discharged also changes in temperature, and providing the operation of the valve body at a stable temperature is limited to equipment with a low flow rate.

Further, also in the device described in JPU Sho-61-41500, since the valve body disposed in the direction of traversing the section of the flow passage is elastically supported by the spring, in the case where the flow rate and pressure of hot water are large, the temperature of hot water changes in a similar way. Moreover, since it is necessary to make the section of the flow passage great to some degree in order to ensure the quantity of hot water supplied, the stroke of movement of the valve body becomes great. For this reason, even though the temperature sensing expansion spring is actuated when the hot water at a high temperature passes, time is consumed until the valve body shuts off the flow passage and, therefore, there is an aspect of this device which is not suitable for instantaneous shut-off of the hot water at a high temperature.

In the meantime, in the case where the temperature-actuated valve is incorporated into a flow passage toward the shower head connected to a hot and cold water mixing valve by means of a hose, it is most preferable to sense the temperature of the hot water immediately after leaving the mixing valve to thereby shut off the flow passage. For this reason, it has been considered that the temperature-actuated valve should be incorporated utilizing such a joint as an elbow which is connected to the back of the hot and cold water mixing valve and to which the base end of the hose is connected.

However, in the device in which the lift valve type of valve body or the valve body of the type of traversing the section of flow passage is incorporated, as described in the above-described publications, the springs in the inner flow passage and the spring which performs the temperature sensing movement are apt to be bulky and, therefore, such spring is not appropriate for incorporation into such elbow.

Further, in order to allow the valve body to be quickly set to the valve closing position as the hot water at a high temperature passes, there is also a device equipped with such a pilot valve mechanism as described, for example, in U.S. Pat. No. 5,295,554. This is a mechanism which comprises a leaf spring made of a shape-memory alloy incorporated into a pilot valve which provides an energizing force to a diaphragm-type main valve in the valve opening direction, and when a small quantity of hot water which passes through the pilot valve reaches a high temperature, the diaphragm-type main valve is closed.

However, in the device including the pilot valve which links the diaphragm, the number of the components is considerably increased and the resistance of the flow passage is great and, in addition, the diaphragm is provided as a main valve, so a loss in pressure is increased. Further, there is a problem in that since the diaphragm is closed due to a difference in pressure before and after the throttling portion of the diaphragm part, in the case where a quantity of flow is small which makes the production of such difference in pressure difficult, it is difficult to discharge the functions as a temperature-actuated valve. Therefore, there is a tendency of the large-sized device similar to that described in the above-described publications to ensure the quantity of flow; so, the position where the diaphragm is incorporated is limited. Moreover, there is a problem in that because of a great loss in pressure, a sufficient delivery quantity of shower water cannot be ensured in a region where water pressure is low.

As described above, the conventional temperature-actuated valve has disadvantages not only in that the flow resistance due to the spring incorporated as a shape-memory element is great and the construction becomes bulky, but also in that the delivery of hot water due to the delay in the valve closing time of the valve body as the hot water at a high temperature passes cannot be avoided.

Moreover, as an example of the hot and cold water mixing valves equipped in a bath room, there is a mixing valve to which a shower head is connected by way of a hose, in addition to a delivery pipe for the supply of cold and hot water to a bathtub. Such hot and cold water mixing valve is normally provided with a switching valve for switching the flow passage to the delivery pipe side or the shower head side, in addition to the valve for adjusting the flow rate and temperature of the mixed water. For example, a switching valve such as that described in JPU Sho-56-32679 is adopted.

This switching valve includes an operating handle to which a cylindrical valve body is linked by way of a torsion spring and, during normal operation, the state is maintained in which the hollow portion of a valve body communicates with the flow passage at the delivery pipe side and, simultaneously, the flow passage toward the shower side is shut off. When the handle is switched to the shower side, the valve body is pressed against the valve seat, which forms the beginning end of the flow passage of the delivery pipe side, by the water pressure of the mixed water toward the shower side, whereby the position of the valve body is suppressed so as to shut off the flow passage toward the delivery pipe.

With such a switching valve, when supply of the mixed water is stopped after switching to the shower side and being used, the water pressure of the mixed water against the valve body gradually drops and, accordingly, the valve body is rotated together with the handle by means of the torsion spring to open the flow passage toward the delivery pipe side and to close the flow passage toward the shower side.

Therefore, after the shower has been used, the flow passage is always automatically switched to the delivery pipe side, and even though the switched position remains unconfirmed when the mixing valve is used next time, the delivery of hot water at a high temperature from the shower can be avoided, allowing the mixing valve to be used safely without getting scalded.

In this way, so long as the operation of switching to the shower side is not made by means of the operating handle when the hot and cold water mixing valve is used, the hot water at a high temperature is never discharged from the shower, so this type of the mixing valve is used particularly suitable as equipment for general use.

However, when a user has switched the switching handle to the shower side by mistake at the time the mixing valve begins to be used, he may be suddenly showered with hot water at a high temperature from the shower. Namely, even though hot water is discharged when the delivery pipe is used, the hot water pours only onto a finger tip and there is little hinderance to ease of use. However, if it is a sprayed water from the shower head, the hot water pours over the whole body and, therefore, a degree of danger cannot be ignored for the user who is unfamiliar with the operation.

In this way, even though the switching valve in which the flow passage is switched to the delivery pipe side at the time the mixing valve begins to be used, the case even occurs where the hot water at a high temperature is suddenly discharged when the user makes a mistake in the operation. For this reason, even though the flow passage is switched to the shower side when the mixed water is at a high temperature, it is more preferable from the point of safety to attempt to provide equipment from which the mixed water is not discharged.

SUMMARY OF THE INVENTION

The present invention has been made taking the above-described points into consideration, and aims at providing a temperature-actuated valve which enables the sufficient flow rate to be ensured by making the flow resistance small, while improving the degree of freedom of the incorporation into the flow passage by making the whole valve small in size, and which in a moment can be set to a position of closing the valve at the time of a change in temperature to the high temperature side of hot water.

Further, an object of the present invention is to provide a hot and cold water mixing valve, for example, equipped with a valve for switching the flow passage between the delivery pipe side and the shower side, in which when the mixed water exceeds a temperature of use of the shower and has reached a high temperature, said switching valve is automatically switched from the shower side to the delivery pipe side, thereby allowing the shower to be used safely.

A temperature-actuated valve device according to the present invention comprises a body of the device provided with an inlet opening and an outlet opening, a valve seat formed on the peripheral edge of said outlet opening, a main valve body which is disposed within said body of the device movably in the flow direction of fluid and which is brought into and out of an abutting engagement with said valve seat to control the closing and opening operation of the outlet opening, a pilot valve body which is disposed within the body of the device movably in the same direction as the direction of movement of said main valve body and which causes a change in the fluid pressure acting on the upstream side or the downstream side of said main valve body, and a temperature-actuated means which is linked to said pilot valve body and which deforms when it reaches a predetermined temperature.

According to the present invention, when the temperature of fluid reaches or exceeds a predetermined temperature, the temperature-actuated means deforms in the direction of expansion, causing the pilot valve body to be moved in the direction of the main valve body and further causing a change in the fluid pressure acting on the upstream side or the downstream side of the main valve body so that the main valve body is brought into an abutting engagement with the valve seat to thereby shut off the outflow of fluid.

Further, the temperature-actuated means is composed of a member which deforms in response to a temperature in such a way that, at below a predetermined temperature, it causes said pilot valve body to be moved to a position where the fluid pressure acts on the downstream side of said main valve body and, at above a predetermined temperature, it causes said pilot valve body to be moved to a position where the fluid pressure acts on the upstream side of said main valve body.

Moreover, the invention is characterized in that the temperature-actuated means comprises a spring made of a shape-memory alloy.

Further, the invention is characterized in that the pilot valve body is of a tubular shape, and said main valve body is movable within the pilot valve body in the coaxial direction.

In addition, the invention is characterized in that to the pilot valve body is linked a biasing means which produces an energizing force in the direction opposite the energizing direction of the temperature-actuated means.

Moreover, the invention is characterized in that to the main valve body is linked a biasing means which energizes the main valve body in the direction of separating it from the valve seat.

Further, the invention is characterized in that the body of the device is provided therein with a leak flow path through which fluid leaks to the downstream side while the main valve body is in an abutting engagement with the valve seat.

Moreover, the invention is characterized in that the main valve body is provided with a small hole which passes through in the axial direction.

In addition, the invention is characterized in that a seal member is disposed between the outer periphery of the main valve body and the inner periphery of the pilot valve body.

A temperature-actuated flow passage switching valve according to the present invention comprises a valve body provided with one fluid inlet opening and first and second fluid outlet openings, valve seats formed on the peripheral edges of said two outlet openings, a main valve body which is disposed within the valve body movably between said two valve seats and which is brought into and out of an abutting engagement with said valve seat to thereby control the opening and closing operation of the outlet opening, and a temperature-actuated means which is linked to said main valve body and which deforms when it reaches a predetermined temperature.

A temperature-actuated flow passage switching valve using said temperature-actuated valve device according to the present invention comprises a valve body provided with one fluid inlet opening and first and second fluid outlet openings, valve seats formed on the peripheral edges of said two outlet openings, a main valve body which is disposed movably within the valve body between said two valve seats and which is brought into and out of an abutting engagement with said valve seat to control the opening and closing operation of the outlet opening, a pilot valve body which is disposed movably within the valve body in the same direction as the direction of movement of said main valve body and which causes a change in the fluid pressure acting on the upstream side or the downstream side of said main valve body, and a temperature-actuated means which is linked to said pilot valve body and which deforms when it reaches a predetermined temperature.

Also in the present invention, similar to the above-described temperature-actuated valve device, when the fluid temperature reaches a predetermined level or above, the temperature-actuated means deforms in the direction of expansion, causing the pilot valve body to be moved toward the main valve body and further causing a change in the fluid pressure acting on the upstream side or the downstream side of the main valve body, so that the main valve body is brought into an abutting engagement with one determined valve seat to thereby shut off the outflow of fluid.

Moreover, the present invention is characterized in that an operating means which makes the main valve body abut selectively to said first and second outlet openings is connected to the main valve body.

The present invention is characterized in that the temperature-actuated means consists of a member which deforms in response to temperature in such a way that, at below a predetermined temperature, it causes said pilot valve body to be moved to a position where the fluid pressure acts on the downstream side of said main valve body and, at above a predetermined temperature, it causes said pilot valve body to be moved to a position where the fluid pressure acts on the upstream side of said main valve body.

Further, the present invention is characterized in that the temperature-actuated means is composed of a spring made of a shape-memory alloy.

Moreover, the present invention is characterized in that the pilot valve body is cylindrical in shape, and said main valve body is movable within the pilot valve body in the coaxial direction.

In addition, the present invention is characterized in that to the pilot valve body is linked a biasing means which produces an energizing force in the direction opposite the energizing direction of the temperature-actuated means.

Further, the present invention is characterized in that to the main valve body is linked an energizing means which energizes the main valve body toward any one of the outlet openings.

Moreover, a temperature-actuated flow passage switching valve according to the present invention comprises a valve body provided with one fluid inlet opening and first and second fluid outlet openings, a rotary-type valve body which is disposed rotatably within the valve body and which is adapted to close and open said two fluid outlet openings selectively by outside operation, and a temperature-actuated means which is linked to said valve body and which deforms when it reaches a predetermined temperature to thereby drive in rotation said valve body.

Further, a temperature-actuated flow passage switching valve according to the present invention comprises a valve body provided with one fluid inlet opening, a first fluid outlet opening which opens on the same axis as the inlet opening, and a second fluid outlet opening which opens in the direction intersecting at a right angle to said first fluid outlet opening, a valve seat formed on the peripheral edge of the first fluid outlet opening, a rotary-type valve body which is disposed rotatably within the valve body, which includes an outer peripheral surface which abuts the valve seat of said first fluid outlet opening, a valve hole formed to pass through in the direction intersecting at a right angle to the axis of rotation, and a protruding shaft provided so as to protrude in the direction of the axis of rotation, and which is adapted to close and open said two fluid outlet holes selectively by outside operation, a holding block which is disposed movably between said rotary-type valve body and second fluid outlet opening and which has an opening in which said protruding shaft of the valve body is loosely fitted, a temperature-actuated means which deforms when it reaches a predetermined temperature, which is linked at one end to said holding block and linked at the other end to the valve body, and an energizing means which is linked to said rotary-type valve body and which energizes the rotary-type valve body in the direction of the valve hole of the rotary-type valve body, said valve hole being aligned with said first fluid outlet opening.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF DRAWINGS

The present invention will become more fully understood from the detailed description given hereinbelow and the accompanying drawings which are given by way of illustration only, and thus are not limitative of the present invention, and wherein:

FIG. 7 is a longitudinal sectional view showing a state of the temperature-actuated valve being closed;

FIG. 20 is a sectional view showing a fifth embodiment;

FIG. 24 is a longitudinal sectional view showing a flow passage switching valve provided in the hot and cold water mixing valve shown in FIG. 23;

FIG. 26A is a bottom view of the lower housing;

FIG. 26B is a longitudinal sectional view of the lower housing;

FIG. 27 is a longitudinal sectional view of the upper housing;

FIG. 39 is a longitudinal sectional view of the hot and cold water mixing valve showing an example of a mechanism in which the resistance against the rotation of the valve body when switching from the shower side to the delivery pipe side is removed;

FIG. 41 is a longitudinal sectional view of an essential portion showing an example of a mechanism in which the resistance against the rotation of the valve body is removed by a shifter;

FIG. 48 is a longitudinal sectional view of an essential portion of the switching valve shown in FIG. 45;

BEST MODE FOR CARRYING OUT THE INVENTION

Figure 1:
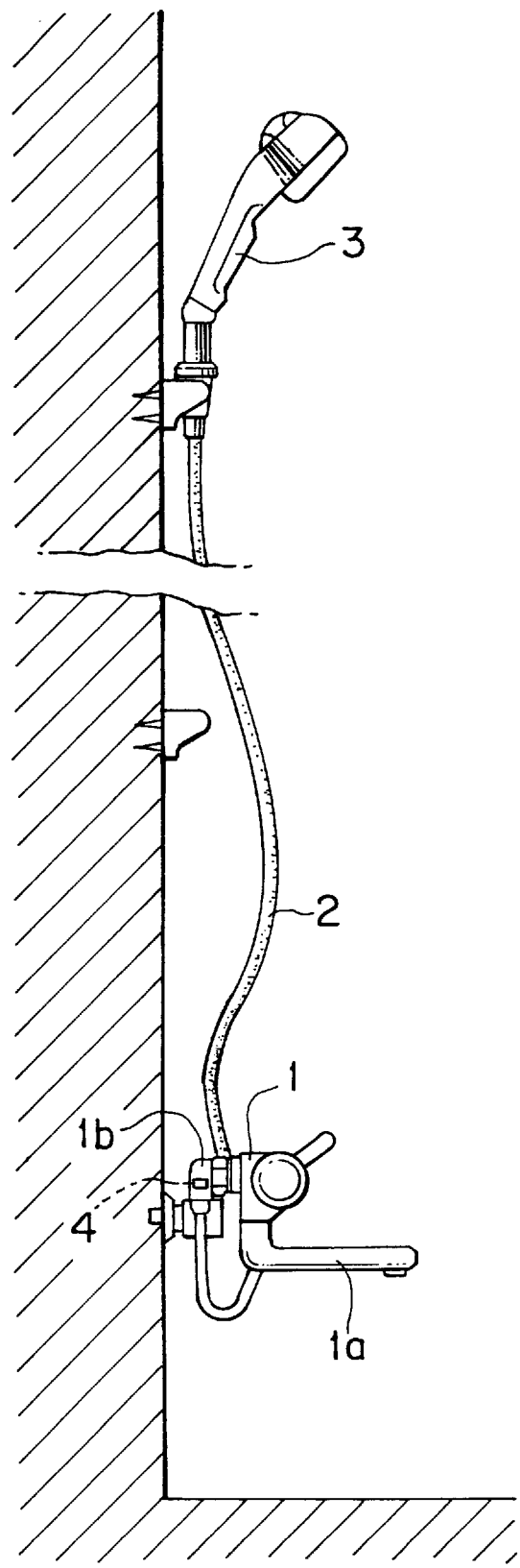
FIG. 1 is a side view showing a shower equipment equipped with a temperature-actuated valve according to the present invention.

FIG. 1 is a side view showing an example of shower equipment for a bathroom provided with a temperature-actuated valve device according to the present invention.

A shower head 3 is connected to a hot and cold water mixing valve 1 secured to the wall of the bathroom by way of a hose 2. The hot and cold water mixing valve 1 is secured to the wall in connection with a cold water supply pipe and a hot water supply pipe (not shown) installed on the building side, similar to conventional ones, and is adapted to be able to be used by switching the flow passage toward a delivery pipe 1a to the flow passage toward a shower head 3 and vice versa, allowing the mixing ratio and flow rate of the cold water and the hot water to be adjusted by operating a handle.

Between the hot and cold water mixing valve 1 is connected an elbow 1b, similar to conventional ones, into which a temperature-actuated valve 4 is inserted and integrally incorporated. In place of such an incorporation, the temperature-actuated valve 4 may be disposed between the elbow 1b and the hose 2, and in any case the temperature-actuated valve 4 may be positioned in the vicinity of the outlet of the mixed water of the hot and cold water mixing valve 1.

Figure 2:
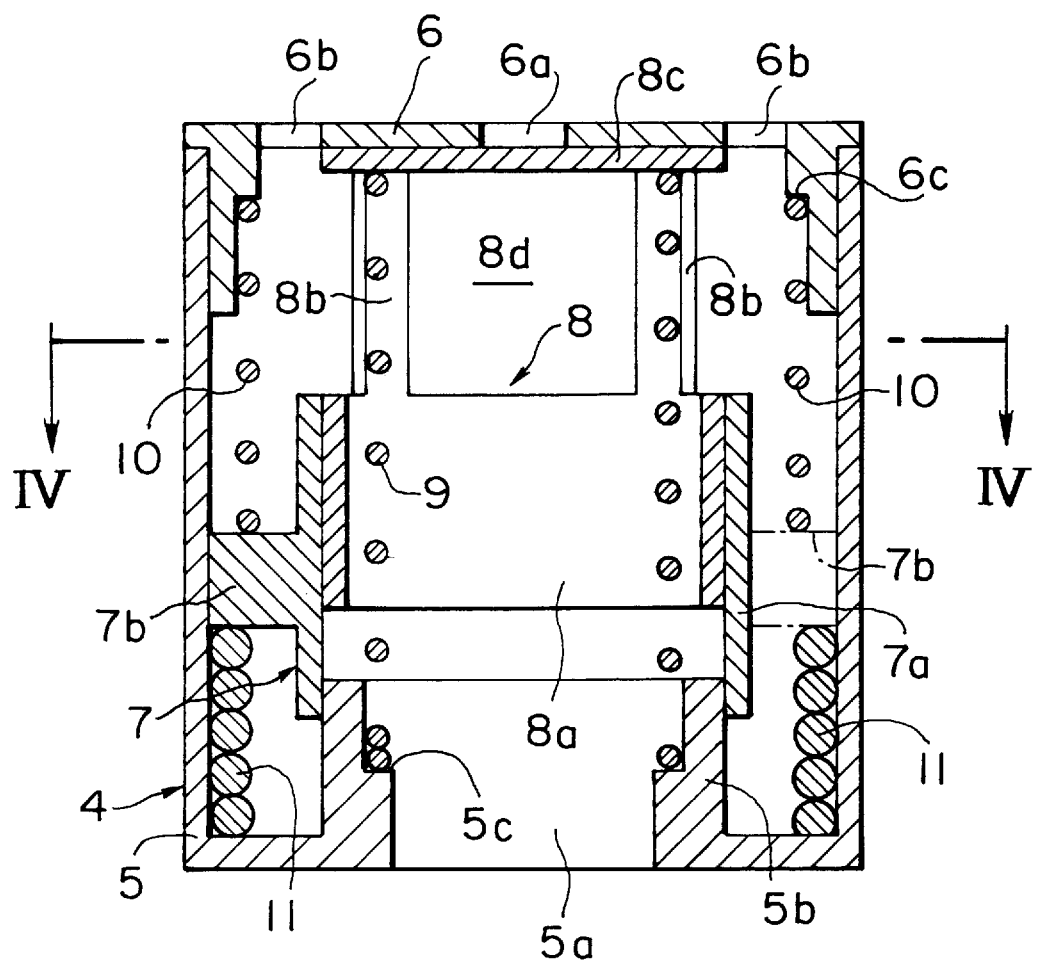
FIG. 2 is a longitudinal sectional view showing a temperature-actuated valve of a first embodiment.
Figure 3:
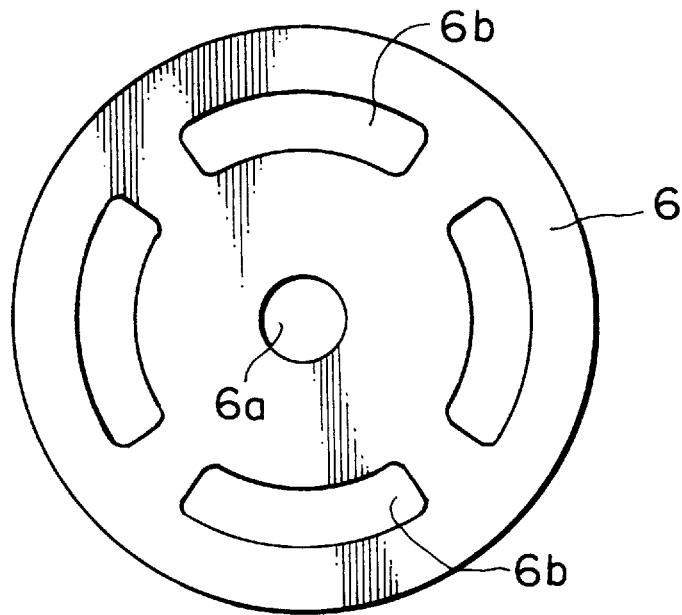
FIG. 3 is a plan view of a plug provided on the top end of the body in FIG. 2.
Figure 4:
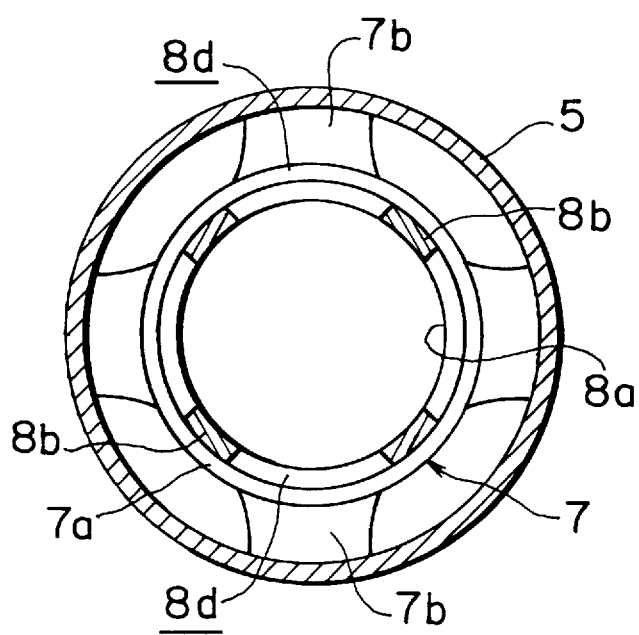
FIG. 4 is a cross-sectional view taken along line IV—IV of FIG. 2.

FIG. 2 is a longitudinal sectional view detailing the temperature-actuated valve 4 according to a first embodiment of the present invention, FIG. 3 is a plan view of the temperature-actuated valve 4 in FIG. 2 as viewed from the above, and FIG. 4 is a cross-sectional view taken along line IV—IV of FIG. 2.

The outline of the temperature-actuated valve 4 comprises a body 5 and a plug 6 fixed integrally to the inflow end side of the mixed water.

The body 5 is cylindrical with the upper end open, and is concentrically provided with an outlet opening 5a in the middle of the lower end. The outlet 5a is provided along the opening edge with a cylindrical valve seat 5b with a vertical rise, which is formed on the inner periphery with an annular stepped portion 5c. Further, as shown in FIG. 3, the plug 6 is provided with a small hole 6a in the middle thereof, around which a total of four inlet openings 6b are arranged in an annular way, and it is firmly fitted to the upper end of the body 5 in a watertight way.

In the interior of the body 5 are concentrically incorporated a pilot valve body 7 and a main valve body 8.

The pilot valve body 7 comprises a cylindrical valve ring 7a which is in sliding contact with the outer periphery of the valve seat 5b of the body 5 and which has an inner diameter of such size so as to be slidably movable in the axial direction, and guides 7b protruding radially from the periphery of the valve ring 7a, as shown in FIG. 4. The guide 7b is given dimensions in which the diameter of an imaginary circle drawn by the outer peripheral surfaces of the guides 7b is a little smaller than the inner diameter of the body 5, whereby the pilot valve body 7 is movable in the axial direction within the body 5 with the coaxial arrangement being maintained.

The main valve body 8 is inserted into the valve ring 7a of the pilot valve body 7 movably in the axial direction, and the lower half thereof is substantially in the form of a cylindrical valve ring 8a, from the top end of which a total of four arms 8b extend and form a pressure receiving plate 8c on the upper end thereof. The four portions which are defined by the arms 8b between the valve ring 8a and the pressure receiving plate 8c serve as pouring-in openings 8d.

The main valve body 8 is energized upwardly in FIG. 2 by a compression spring 9 disposed coaxially between the lower surface of the pressure receiving plate 8c and the stepped portion 5c of the body 5. In the meantime, the pilot valve body 7 is energized downwardly in FIG. 2 by interposing a compression biasing spring 10 between the upper surface of the guide 7b and the annular stepped portion 6c formed on the lower surface of the plug 6. Further, this pilot valve body 7 is elastically supported with an energizing force directed upwardly by means of a temperature-actuated spring 11 incorporated between the lower surface of the guide 7b and the bottom of the body 5. As this temperature-actuated spring 11, a spring made of a shape- memory alloy is used. The spring 9 and the biasing spring 10 are made of a generally used material, for example, steel.

Figure 5:
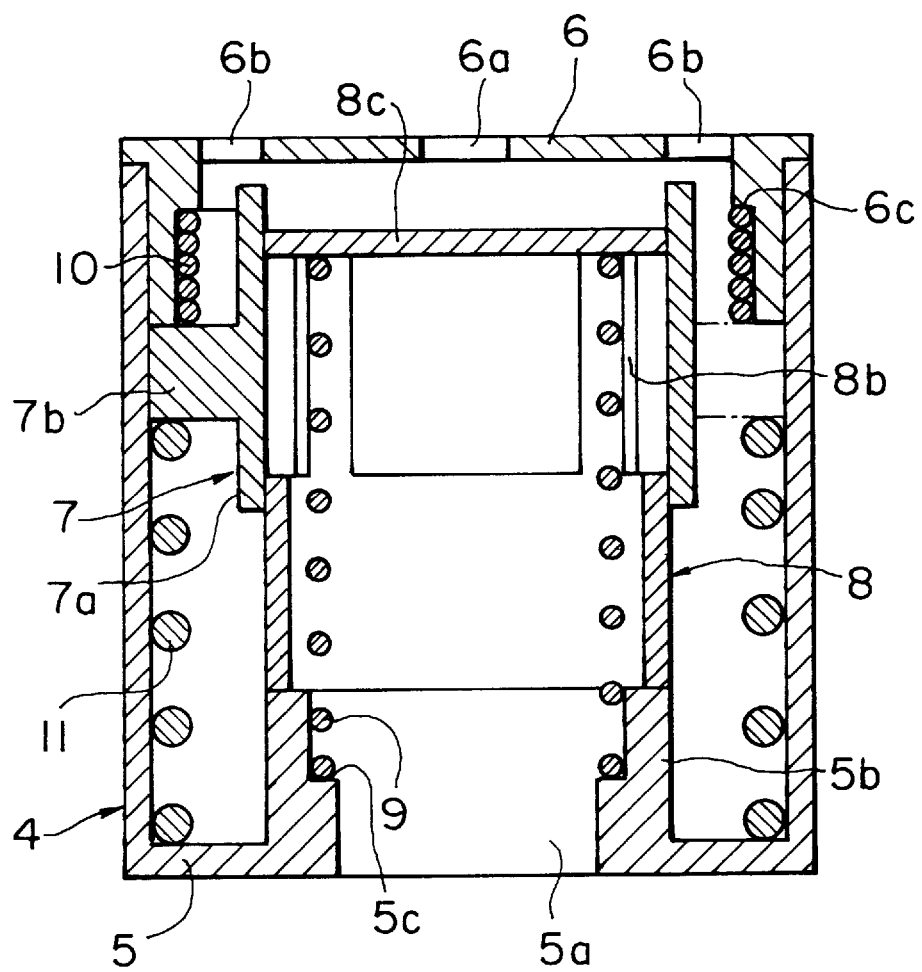
FIG. 5 is a longitudinal sectional view showing a state when the temperature-actuated valve is closed due to the inflow of hot water at a high temperature.

The temperature-actuated spring 11 has a shape-memory property such that a load of production changes due to the temperature of the temperature-actuated spring 11 itself and, at a certain temperature and below, the production of load is lower and the elastic reaction force is suppressed to a small value, however, when such a certain temperature is exceeded, the load of production becomes great and the temperature-actuated spring 11 expands. The temperature-actuated spring 11 is set in such a way that the property shifts at a temperature a little lower than the upper limit temperature at which the shower is used. During normal operation, as shown in FIG. 2, the valve ring 7a of the pilot valve body 7 covers the upper end of the valve seat 5b, and the inlet opening 8d of the main valve body 8 and the outlet opening 5a of the lower end of the body 5 communicates by way of the flow passage within the pilot valve body 7 and the main valve body 8. When the temperature of the mixed water exceeds the optimum temperature at which the shower is used and reaches a high temperature, as shown in FIG. 5, the lower end of the main valve body 8 is brought into a seating engagement with the upper end of the valve seat 5b and, simultaneously, the valve ring 7a of the pilot valve body 7 closes the inlet opening 8d of the main valve body 8, thereby allowing the flow passage to be shut off.

In the construction described above, if the temperature of the mixed water from the hot and cold water mixing valve 1 exists within a region of temperature appropriate to the use of the shower, the temperature-actuated spring 11 maintains the contracted shape and, as shown in FIG. 2, the pilot valve body 7 is positioned so that the valve ring 7a covers the periphery of the valve seat 5b by an energizing force of the biasing spring 10. The main valve body 8 is maintained at a position where the pressure receiving plate 8c strikes the inner wall of the upper end of the plug 6, said small hole 6a being closed by the pressure receiving plate 8c.

Hereupon, a force of moving the main valve body 8 in the valve closing direction is a pressure of the mixed water transmitted from the small hole 6a to the pressure receiving plate 8c, a resistance to the arms 8b when the mixed water passes through the inlet opening 8d and a force of pressing the upper end of the valve ring 8a. Accordingly, in order to maintain the main valve body 8 in the position shown in FIG. 2, it is better to set the spring constant of the spring 9 to a value which is greater than a total of these pressures and the force of action.

In this way, maintaining the pilot valve body 7 and the main valve body 8 in the position shown in FIG. 2, respectively, allows the mixed water from the hot and cold water mixing valve 1 to flow from the inlet opening 6b of the plug 6 into the body 5, passing from the inlet opening 8d of the main valve body 8 through the interior of the respective valve rings 7a and 8a of the pilot valve body 7 and main valve body 8 and flowing out of the outlet opening 5a to be supplied to the shower head 3.

In the meantime, when the mixed water from the hot and cold water mixing valve 1 reaches a high temperature due to a sudden change of the pressure in the supply of cold water and hot water and due to other causes and reaches a region of temperature which is a little lower than the upper temperature limit of use of the shower, the temperature-actuated spring 11 begins to deform in the direction of elongation due to the shape-memory property thereof. The deformation of the temperature-actuated spring 11 causes the pilot valve body 7 to begin to rise, and the valve ring 7a which has covered around the valve seat 5b is gradually moved away from the valve seat 5b. This causes the inlet opening 8d of the main valve body 8 to be closed gradually by the valve ring 7a, so that the flow rate of the mixed water which flows into the valve ring 8a of the main valve 8 is throttled.

Such throttling of the flow rate passing through due to the contraction of the area of the flow passage of the inlet opening 8d by the valve ring 7a of the pilot valve body 7 causes the pressure within the main valve body 8 to be reduced and, simultaneously, causes the pressure within the flow passage at the upstream side of the main valve body 8 to rise, thereby increasing a load on the pressure receiving plate 8c.

In the meantime, although the main valve body 8 has been held by the balance between the flow pressure of the mixed water applied to the above-described pressure receiving plate 8c by way of the small hole 6a and the spring 9, a reduction in pressure within the main valve body 8 due to a rise of the pilot valve body 7 causes the balance in pressure to be lost. When the difference in pressure at this time exceeds the maximum load of production of the spring 9, the main valve body 8 begins to drop from the state shown in FIG. 2. This movement of the main valve body 8 occurs substantially at the same time as a rise of the pilot valve body 7 due to the temperature-actuated spring 11.

When the main valve body 8 drops a little from the state shown in FIG. 2, the upper surface of the pressure receiving plate 8c is moved away from the lower surface of the plug 6, so that the mixed water flows also into a space between the upper surface of the pressure receiving plate 8c and the lower surface of the plug 6. Therefore, at the start the pressure receiving plate 8c has been subjected to a pressure of the mixed water corresponding to the area of opening of the small hole 6a, but now the whole pressure receiving plate 8c comes to be subjected to the flow pressure of the mixed water. As a result, the main valve body 8 is moved toward the valve seat 5b quickly by the flow pressure of the mixed water to thereby bring the lower end of the valve ring 8a into a seating engagement with the upper end of the valve seat 5b and, simultaneously, the inlet openings 8d are closed by the valve ring 7a due to a positional relation between the main valve body 8 and the pilot valve body 7.

In this way, when the temperature of the mixed water exceeds the optimum temperature of the shower, the pilot valve body 7 is moved utilizing the deformation of the temperature-actuated spring 11, thereby causing the main valve body 8 to be started in the valve closing direction due to a reduction in pressure of the flow passage within the main valve body 8. Thereafter, a load applied in the valve closing direction can be increased rapidly due to the flow pressure to the pressure receiving plate 8c. Therefore, the pilot valve body 7 and the main valve body 8 are moved quickly in the valve closing direction to shut off the flow passage, thereby stopping the supply of the mixed water at a high temperature to the shower head 3.

After the flow passage has been shut off, it is preferable to eliminate the hot water at a high temperature remaining in the flow passage up to the shower head 3. For this reason, for example, the dimensional allowance of the inner and outer diameters between the pilot valve body 7 and the main valve body 8 is kept great, thereby providing a relation to such a degree as to allow a leakage of the mixed water from the clearance between the peripheral surfaces of the pilot valve body 7 and main valve body 8. This allows the hot water at a high temperature supplied continuously from the hot and cold water mixing valve 1 to be discharged little by little, even though the flow passage is shut off by the main valve body 8 and the pilot valve body 7. In this case, since the flow rate is extremely small, the hot water only flows down in drops, and the sprayed water is stopped and a user is never subjected to the hot water at a high temperature.

Moreover, if after the hot water at a high temperature has been shut off by the temperature-actuated valve 4, the water supplied from the hot and cold water mixing valve 1 continues to leak little by little even when the valve is closed by the pilot valve body 7 and main valve body 8, as shown in FIG. 5, the temperature of the mixed water within the temperature-actuated valve 4 drops gradually when the mixed water at a low temperature is supplied by operating the temperature adjusting function of the hot and cold water mixing valve 1. Accordingly, the load of production of the temperature-actuated spring 11 becomes gradually small, and the pilot valve body 7 is moved downward in FIG. 5 by the pressure of water supplied from the inlet opening 6b and the force of restoration of the biasing spring 10. Such movement of the pilot valve body 7 makes the opening area of the inlet opening 8d of the main valve body 8 gradually large, causing a rise in the pressure within the main valve body 8, so that the main valve body 8 is restored to the valve opening position in FIG. 2, thereby resuming the delivery from the shower head 3.

Figure 6:
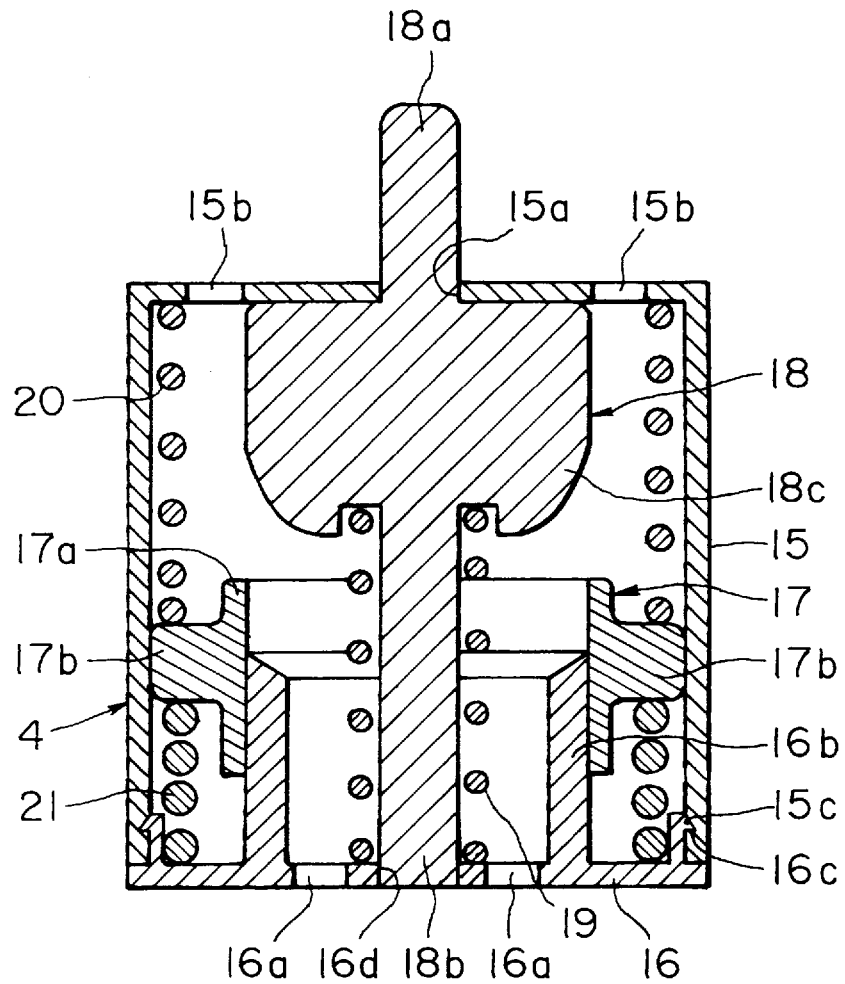
FIG. 6 is a longitudinal sectional view showing a temperature-actuated valve of a second embodiment.

FIGS. 6 and 7 are views showing a second embodiment of the temperature-actuated valve according to the present invention, FIG. 6 being a longitudinal sectional view when the valve is opened and FIG. 7 being a longitudinal sectional view when the valve is closed.

Referring to FIG. 6, the valve body 15 of the temperature-actuated valve 4, different from the above-described first embodiment, is composed of a cylindrical pipe with the lower end being open, and the plug 16 is fitted to the lower end and the pilot valve body 17 and the main valve body 18 are arranged therein coaxially.

On the top end of the body 15 in the middle portion, similar to the plug 6 in the afore-described embodiment, is provided the small hole 15a, around which the circular inlet openings 15b are provided. Further, the plug 16 is provided around the center thereof with, for example, four circular outlet openings 16a, and is formed around the outlet openings with the valve seat 16b with a vertical annular rise.

As shown in an enlarged view of FIG. 6, the plug 16 is provided with a plurality of engaging projections 16c at the points of the outer periphery, and the body 15 is formed on the inner periphery at the lower end with engaging recesses 15c in which the above-described projections 16c fit elastically. The plug 16 is connected integrally with the body 15 in such a way that the engaging projections 16c are inserted into the body 15 and are fitted to the engaging recesses 15c.

The above-described assembly construction enables the body 15 and the plug 16 to be assembled without using screws or the like and, accordingly, there is no need to provide rib-like connecting seats or the like for the screws on the plug 16 and the body 15, so the bulkiness of the temperature-actuated valve 4 is reduced. Further, even though the body 15 and the plug 16 are not connected to each other in a watertight way, when the flow passage is shut off by the pilot valve body 17 and the main valve body 18 as the hot water at a high temperature passes therethrough, the remaining hot water having a high temperature can be discharged, and thus the leakage of hot water can be promoted utilizing the loose joint between the engaging projections 16c and the engaging recesses 15c. In place of the provision of the engaging recesses 15c on the inner periphery of the body 15, engaging holes may be provided which are passed through the peripheral wall.

The pilot valve body 17 is composed of the valve ring 17a and four guides 17b provided on the outer periphery thereof, similar to the afore-described example, and the valve ring 17a is fitted onto the periphery of the valve seat 16b and, simultaneously, is movable coaxially within the body 15 by means of the guides 17b.

The main valve body 18 is formed on the upper and lower ends with an upper guide 18a and a lower guide 18b, respectively, and is incorporated in such a way that the upper guide 18a is passed through a small hole 15a provided on the upper surface of the body 15 and the lower guide 18b is passed through a through-hole 16d provided in the middle of the plug 16. The main valve body 18 is formed with a cone 18c between the upper and lower guides 18a and 18b which is of an outline shape tapering gradually at the lower end side, said cone 18c having the peripheral surface at the lower end side which can be brought into a seating engagement with the upper end of the valve seat 16b.

Between the cone 18c of the main valve body 18 and the plug 16 is incorporated a spring 19 which energizes the main valve body 18 in the direction of opening the valve, and between the inner wall of the upper end of the body 15 and the guide 17b of the pilot valve body 17 is provided a biasing spring 20 which energizes the pilot valve body 17 downward in the drawing. Similar to the afore-described example, the temperature-actuated spring 21 as a shape-memory element is incorporated in the downstream side of the pilot valve body 17.

If the temperature of the mixed water is appropriate, the pilot valve body 17 and main valve body 18 of the temperature-actuated valve 4 are each held in the position shown in FIG. 6 and the mixed water is supplied to the shower head 3. When the temperature of the mixed water reaches a temperature higher than the set value, the temperature-actuated spring 21 deforms in the direction of expansion to cause the pilot valve body 17 to rise, similar to the afore-described example. This makes the distance between the upper end of the valve ring 17a of the pilot valve body 17 and the cone 18c short, so that the flow passage therebetween is throttled. Accordingly, when the pressure of the inner flow passage downstream of the cone 18c is reduced and the water pressure due to the mixed water applied to the upper end surface of the upper guide 18a overcomes the energizing force of the spring 19, the main valve body 18 is moved downward and the whole surface of the upper end of the cone 18c is subjected to the water pressure, so that as shown in FIG. 7, the cone 18c is brought into a seating engagement with the valve seat 16b to shut off the flow passage toward the shower head.

After the flow passage has been shut off by the temperature-actuated valve 4, the temperature of the mixed water is set to the low temperature side by operating the hot and cold water mixing valve 1. This allows the mixed water having a low temperature to be supplied utilizing a leakage of the mixed water within the temperature-actuated valve 4, similar to the afore-described example and, accordingly, the load of production of the temperature-actuated spring 21 becomes small. Therefore, the pilot valve body 17 is restored from the position shown in FIG. 7 to the initial position in FIG. 6 by the pressure applied by the mixed water and the restoring force of the biasing spring 20. At this time, since the main valve body 18 is subjected to the pressure of the mixed water which leaks, toward the downstream side and remains in the position of valve closing state in FIG. 7, the supply of the mixed water is temporarily stopped by operating the hot and cold water mixing valve 1 in order to restore the main valve body 18 to the valve opening position in FIG. 6. This causes the main valve body 18 to be moved to the valve opening position in FIG. 6 by the restoring force of the spring 9 and, thereafter, if the mixed water is supplied by operating the hot and cold water mixing valve 1, delivery from the shower head 3 is started again.

FIG. 8 is a modification of the guide construction of the main valve body 18 in the body 15 and the plug 16 in regard to the second embodiment, and a modification for ensuring the quantity of flow and the prompt discharge of the remaining hot water when the flow passage is shut off.

Figure 8A:
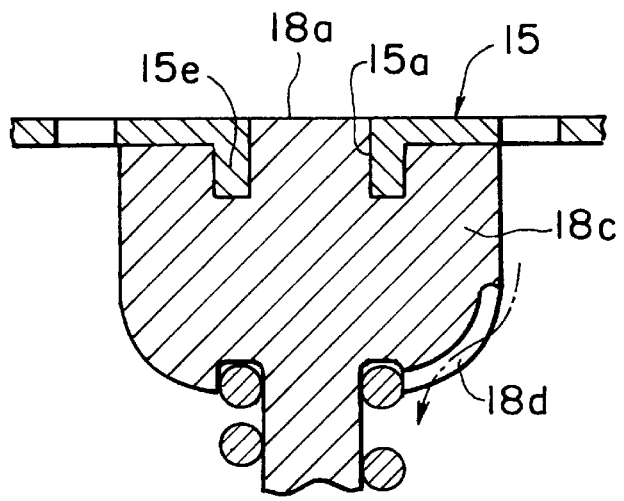
FIG. 8A is a partially enlarged view of the temperature-actuated valve in F.6, showing the joint construction of the upper end of the main valve body and the body, and a notch for a flow passage.
Figure 8B:
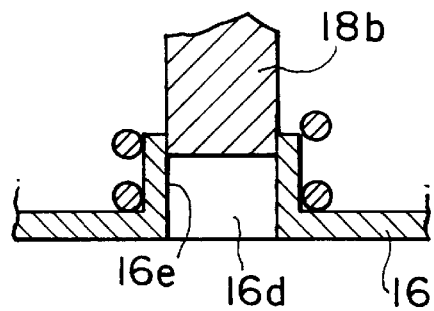
FIG. 8B is a partially enlarged sectional view showing the joint construction of the lower end of the main valve body and the plug.

Referring to FIG. 8A, a tubular guide 15e protruding inwardly is formed on the inner peripheral edge of the small hole 15a of the body 15, and the upper end of the cone 18c strikes the inner wall of the upper end of the body 15 when the flow passage is opened, as shown in FIG. 6, and the upper guide 18a is positioned substantially in the same plane as the upper surface of the body 15 without protruding from the upper end of the body 15. As shown in FIG. 8B, a guide 16e protruding inwardly is formed around the through-hole 16d of the plug 16, in which the lower guide 18b is inserted.

With the provision of such guides 15e and 16e, if when the main valve body 18 opens the flow passage, the upper guide 18a and the lower guide 18b are designed to come to the position shown in FIGS. 8A and 8B and the stroke at the time of closing the valve is designed to such a degree as to be made a little smaller than the axial length of the guide 16d, the lower guide 18b does not protrude from the lower end of the plug 16 even when the valve is closed. Therefore, the temperature-actuated valve 4 can be made small in bulkiness so that the upper and lower guides 18a and 18b do not protrude outwardly during the valve opening and closing time.

Figure 8C:
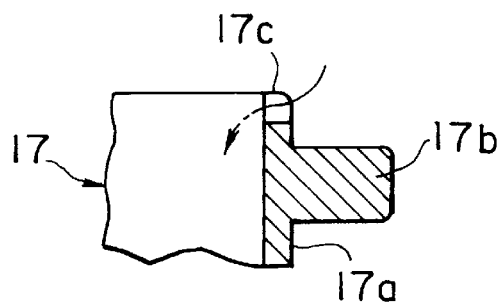
FIG. 8C is a partially enlarged sectional view showing an example of the provision of the notch for a flow passage at the upper end of the valve ring of a pilot valve body.

Further, as shown in FIG. 8A, notches 18d are provided on the peripheral surface of the lower end side of the cone 18c at constant distances in the radial direction and, as shown in FIG. 8C, a plurality of notches 17c are provided at the upper end of the pilot valve body 17, so that these notches 18d and 17c can be each used as the flow passage of the mixed water, as shown with the one-dot chain line in the drawing. The provision of the notches 18d and 17c as described above allows the flow rate of the mixed water at the time of the normal water flow to be ensured and, in addition, the notches 18d and 17c can be utilized for the discharge of the remaining hot water even when the mixed water which reaches a high temperature is shut off.

Figure 8D:
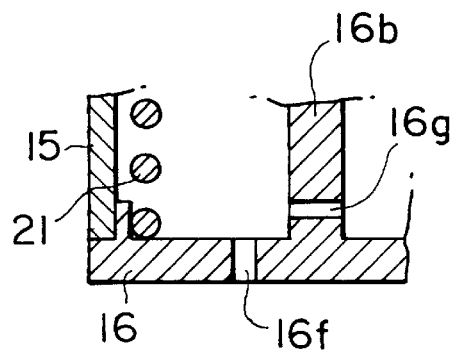
FIG. 8D is a partially enlarged sectional view showing an example of the provision of a drain hole at the bottom of the plug.

FIG. 8D shows a modification of the second embodiment intended to improve the temperature sensing property of the temperature-actuated spring 21, in which it is effective to provide a drain hole 16f on the bottom of the plug 16 outside the valve seat 16g and to provide a drain hole 16g which passes through the valve seat 16b. These drain holes 16f and 16g make the portion within the body 15 in which the temperature-actuated spring 21 is accommodated communicate with the downstream side of the temperature-actuated valve 4. Therefore, when water is supplied after the temperature-actuated valve 4 is closed at the time of a high temperature, the hot water having a high temperature remaining around the temperature-actuated spring 21 can be discharged from the drain holes 16f and 16g to quickly restore the portion within the body 15 to low temperature. Accordingly, the time up to a decrease in the load of production of the temperature-actuated spring 21 is shortened, and the time up to a return of water flow is also shortened. In the example shown in the drawing, the drain holes 16f and 16g are provided at the two points, however, even when only one of these drain holes is provided, the effect of shortening the time up to the return of water flow is the same.

Figure 9:
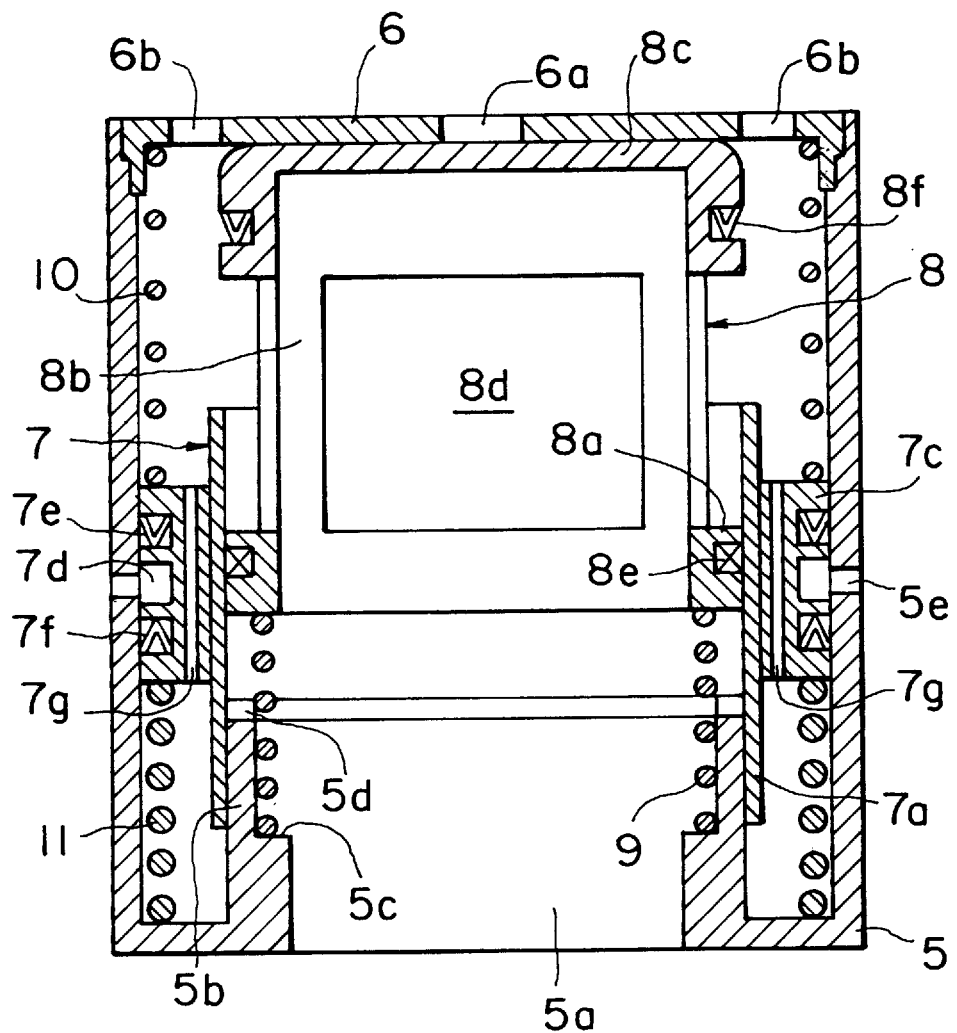
FIG. 9 is a longitudinal sectional view showing a third embodiment.
Figure 10:
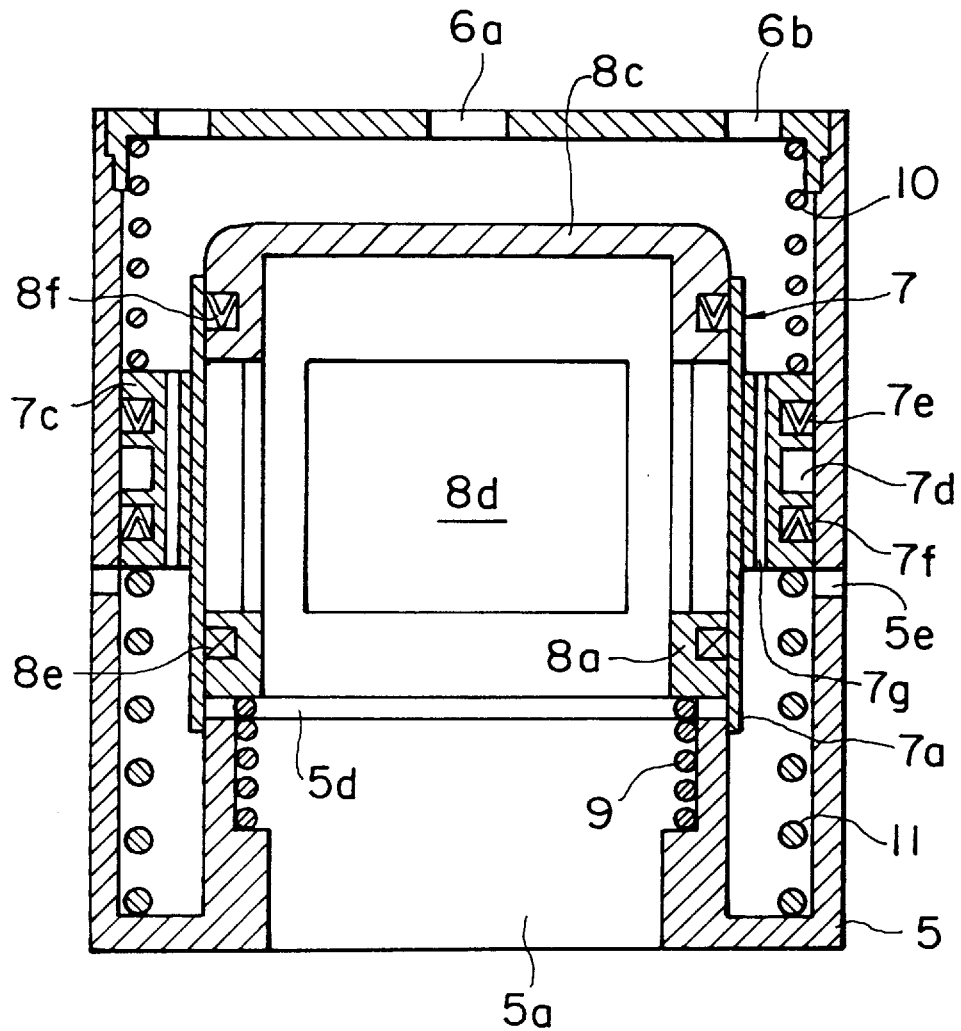
FIG. 10 is a longitudinal sectional view showing a state of the temperature-actuated valve in the example of FIG. 9 being closed.
Figure 11:
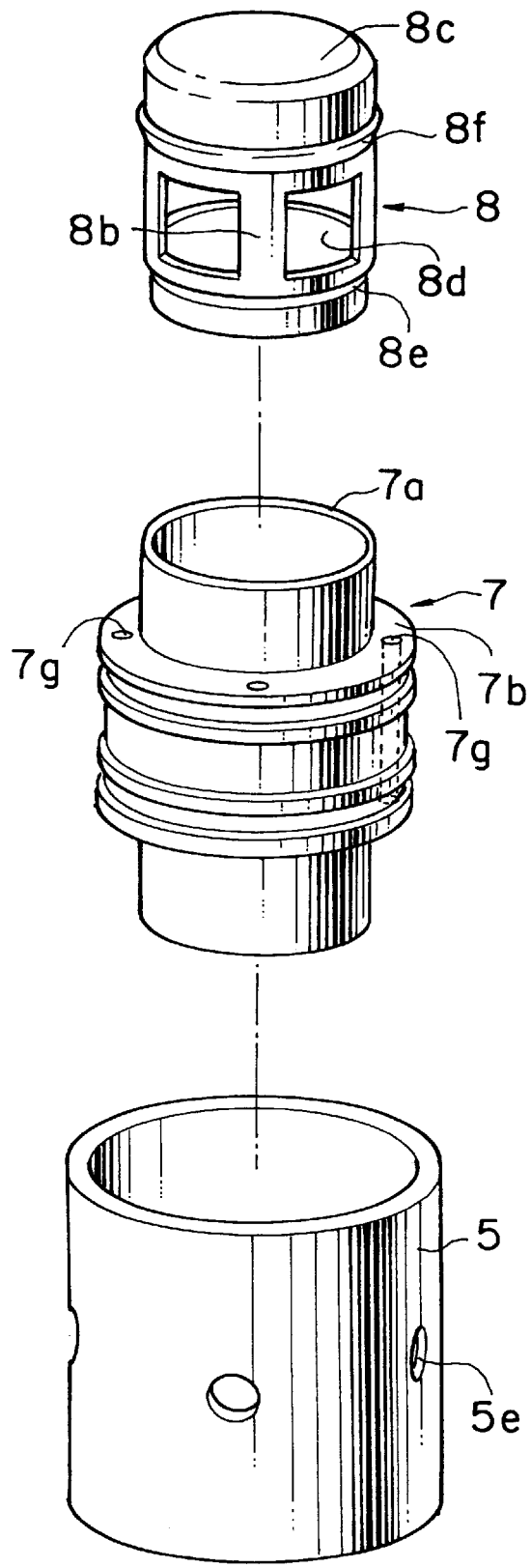
FIG. 11 is an exploded view showing the body, main valve body and pilot valve body in the temperature-actuated valve of FIGS. 9 and 10.

FIGS. 9 to 11 are views showing a third embodiment of the present invention, which embodiment is a modification of the temperature-actuated valve 4 shown in FIGS. 2 to 5, and which is constructed in such a way that the remaining water at a high temperature when the flow passage is shut off at the time of a high temperature is caused to escape from the outer peripheral wall of the body 5 to the downstream side. The same members as those shown in FIGS. 2 to 5 are indicated with the common reference numerals and the detailed explanation thereof is omitted.

Packings 8e and 8f which make close contact with the inner peripheral surface of the valve ring 7a of the pilot valve body 7 are provided on the respective outer peripheries of the valve ring 8a of the main valve body 8 and the pressure receiving plate 8c at the upper end thereof, and the valve seat 5b is provided on the top end thereof with a packing 5d with which the lower end of the valve seat 8a is brought into a seating engagement. Further, the pilot valve body 7 is provided integrally on the outer peripheral surface of the valve ring 7a with an annular guide 7c, which is formed on the outer peripheral surface thereof with an annular flow passage 7d and which is provided with packings 7e and 7f at the upper and lower points which sandwich the annular flow passage 7d. Further, the guide 7c is provided with a plurality of communicating holes 7g each having an axis of the opening parallel to the axis of the valve ring 7a, and the communicating holes 7g bring the spaces above and below the guide 7c into communication with each other.

Also, on the peripheral wall of the body proper 5 are provided escape holes 5e at constant pitches for discharging the remaining hot water having a high temperature from the upstream side of the temperature-actuated valve 4 when the temperature-actuated valve 4 is closed at the time of a high temperature. These escape holes 5e are provided at the position where the escape holes 5e face the annular flow passage 7d and communicate therewith, when the main valve body 8 is positioned at the upper end of the stroke and is in a valve opening state, as shown in FIG. 9, and when the pilot valve body 7 is balanced by the biasing spring 10 and the temperature-actuated spring 11. FIG. 11 shows a schematic exploded view of the body 5, pilot valve body 7 and main valve body 8.

The movement of the pilot valve body 7 and main valve body 8 is completely similar to that shown in FIGS. 2 to 5, and if the temperature of the mixed water from the hot and cold water mixing valve 1 is appropriate, the valve opening state shown in FIG. 9 is maintained. At this time, the annular flow passage 7d of the guide 7c communicate with the escape holes 5e, however, since the guide 7c itself is sealed by the packings 7e and 7f, the mixed water which has flowed into the body 15 does not pass through, but all the mixed water passes through the inner flow passage of the pilot valve body 7 and main valve body 8 and is discharged from the outlet opening 5a to the shower head side.

When the temperature of the mixed water reaches a high temperature, the temperature-actuated spring 11 causes the pilot valve body 7 to rise in FIG. 9, similar to the first embodiment, and a subsequent reduction in the pressure within the main valve body 8 causes the lower end of the valve ring 8a of the main valve body 8 to be brought into a seating engagement with the packing 5d quickly, as shown in FIG. 10 and, at the same time, the inlet opening 8d is closed by the valve ring 7a of the pilot valve body 7 to shut off the flow passage.

As shown in FIG. 10, the pilot valve body 7 is moved upwardly by the temperature-actuated spring 11 at the same time as the main valve body 8 is closed. In this case, if an appropriate combination of the spring constants of the temperature-actuated spring 11 and biasing spring 10 and the axial length of the valve ring 7a are selected, it is possible for the upper and lower inner peripheral surfaces of the valve ring 7a to cover the packings 8f and 5d, as shown in the drawing and, at the same time, is possible to position the lower end of the guide 7c above the escape holes 5e of the body 5.

Therefore, even after the flow passage toward the outlet opening 5a has been closed by the main valve body 8 and the pilot valve body 7, the mixed water from the inlet opening 6b passes through the flow passage outside the main valve body 8 and the valve ring 7a by way of the communicating hole 7g and is discharged gradually through the escape holes 5e. The construction of the flow passage may be such that the hot water at a high temperature from the escape hole 5e may be sprayed from the interior of the elbow 1b directly toward the outside, and the supply of hot water toward the shower head 3 may be shut off.

In this way, since the provision of the communicating holes 7g in the guide 7c allows the remaining hot water at a high temperature to be positively discharged from the communicating holes 7g when the valve is closed, a drop in the temperature of the mixed water within the flow passage at the side of the hot and cold water mixing valve 1 can be promoted. Therefore, in the case where the hot water at a high temperature is adapted to be discharged, for example, from the elbow 1b, the time until the mixed water having an appropriate temperature is started to supply to the shower head 3 after the valve is closed is shortened, and an ease of use is improved.

In each example as described above, in the case of the temperature-actuated valve 4 of the second embodiment shown in FIGS. 6 to 8, it is necessary to operate the hot and cold water mixing valve 1 at the upstream side and restart the discharge after the flow passage is shut off at the time of a high temperature, however, in the place of such construction, it is possible for the temperature-actuated valve 4 to be automatically restored to the restart of the discharge utilizing the drop in the temperature of the mixed water after the flow passage is shut off. Such example is shown in FIGS. 12 to 15 as a fourth embodiment of the present invention.

Figure 12:
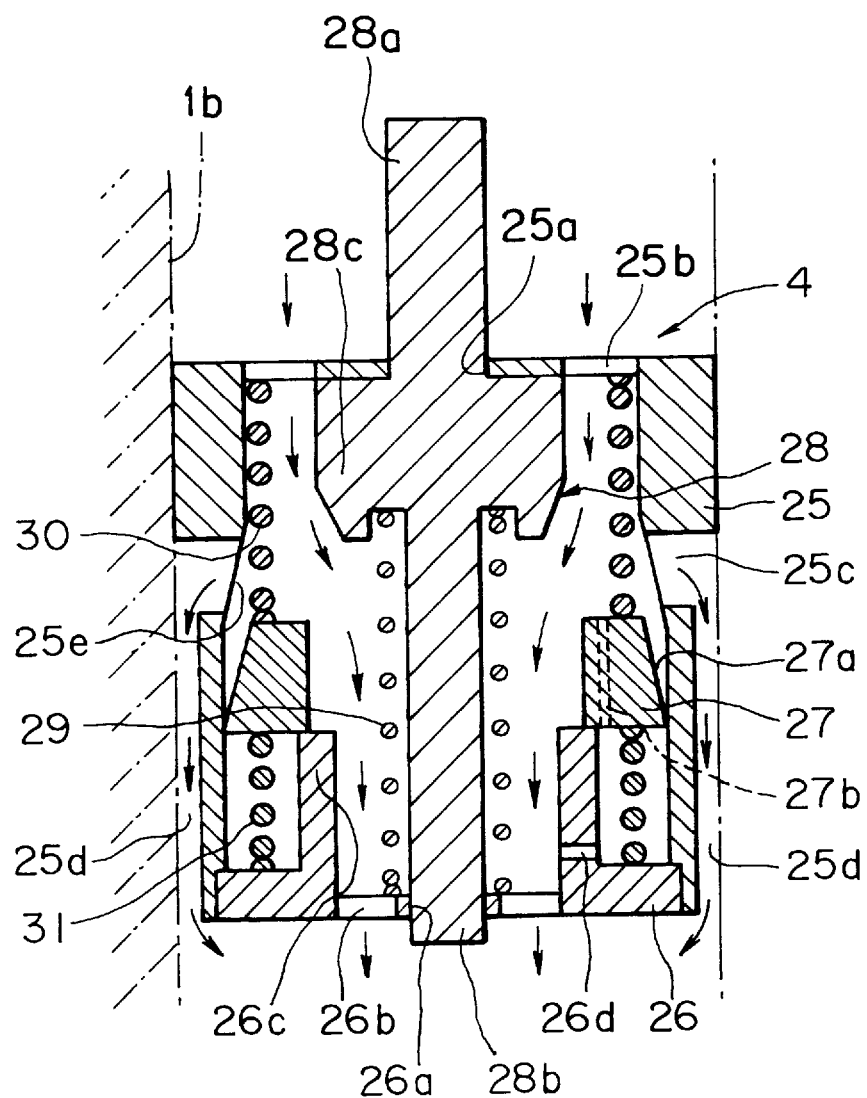
FIG. 12 is a longitudinal sectional view showing a fourth embodiment.

The embodiment shown in FIG. 12 is substantially the same in the fundamental construction as that shown in FIG. 6. The temperature-actuated valve 4 forms the outline by the plug 26 at the lower end of the cylindrical body 25, in which the pilot valve body 27 and the main valve body 28 are incorporated.

Figure 13A:
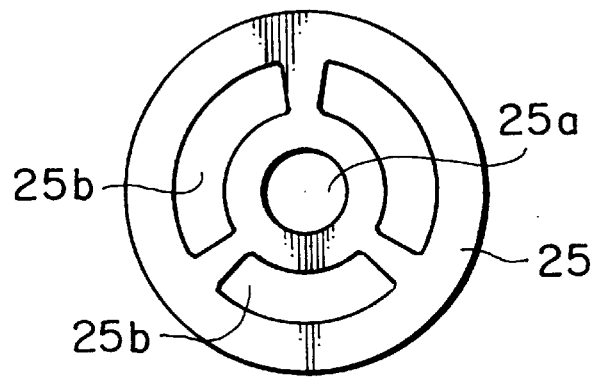
FIG. 13A is a plan view of the body of the temperature-actuated valve.
Figure 13B:
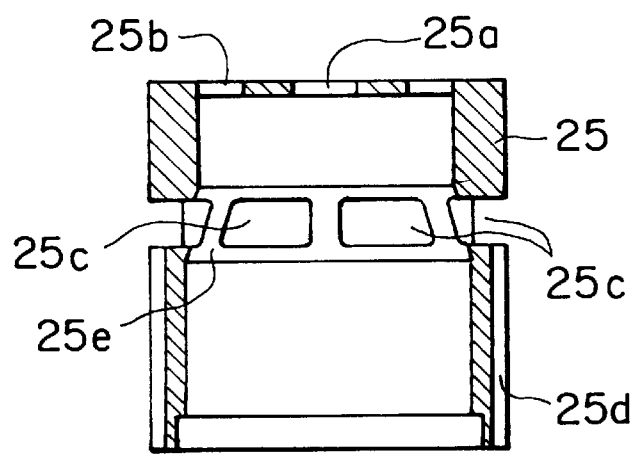
FIG. 13B is a longitudinal sectional view of the body.
Figure 13C:
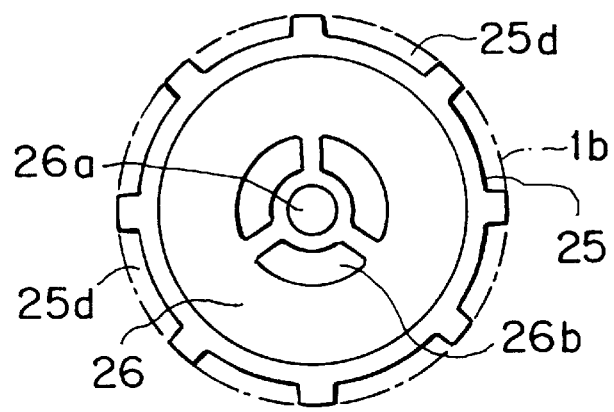
FIG. 13C is a bottom view of the body to which the plug is fitted.

The body 25 is provided at the upper end with the small hole 25a through which the upper guide 28a of the main valve body 28 is passed, similar to the second embodiment, and the three inflow openings 25b are provided around the small hole 25a and a plurality of ports 25c are provided on the peripheral wall of the body 25 as second outlets. The outer periphery of the body 25 is such that the upper portion above these ports 25c has an outer diameter which fits water-tightly into the inner wall of the flow passage of the elbow 1b shown in FIG. 1 and the lower portion below the ports 25c is formed with a plurality of flow passage grooves 25d up to the lower end of the body 25 in such a way as to produce a clearance between the inner wall of the flow passage of the elbow 1b and the body 25. Further, the ports 25c are formed in such a way that the inner peripheral surface of the body opens into the portion of the tapered surface 25e tapering in shape in the upper side, as shown in FIG. 13B in detail. The ports 25c are aligned to a plurality of flow grooves 25d formed on the outer peripheral surface of the body 25, respectively, so that the interior of the body 25 communicates with the flow passage at the downstream side within the elbow 1b by way of the flow grooves 25d from the ports 25c.

The plug 26 is provided with the small hole 26a through which the lower guide 28b of the main valve body 28 is passed, similar to the second embodiment, and it is provided around the small hole 26a with the outlet openings 26b, and is formed with the annular valve seat 26c with a vertical rise on the surface facing the interior of the body 25. Further, at the base end portion of the valve seat 26c is provided a drain hole 26d having a small diameter for a leakage of hot water from the interior of the body 25.

The main valve body 28 is energized toward the upstream side by the spring 29 which is fitted around the lower guide 28b, and the pilot valve body 27 is held by the biasing spring 30 and the temperature-actuated spring 31. The relation of the energizing force versus each of the valve bodies 27 and 28 by the springs 29 to 31 and the property of the load of production versus a change in the temperature of the temperature-actuated spring 31 are completely similar to the second embodiment.

As shown in FIG. 12, the pilot valve body 27 has an annular body which can be seated on the upper end surface of the valve seat 26c, and the outer peripheral surface thereof is formed as a tapered surface 27a which is aligned in shape with the tapered surface 25e of the portion of the ports 25c provided on the body 25. The outer periphery of the lower end portion of the tapered surface 27a has an outer diameter to such a degree as to be slidable on the inner peripheral surface of the body 25, and has an inner diameter which is a little greater than the outer diameter of the cone 28c of the main valve body 28. Further, at the position corresponding to the outside of the valve seat 26c is axially provided a drain hole 27b having a small diameter, which makes the inner flow passage of the body 25 communicate with the drain hole 26d provided at the base end of the valve seat 26c.

Also in the construction shown in FIG. 12, if the temperature of the mixed water from the hot and cold water mixing valve 1 is appropriate, the pilot valve body 27 and the main valve body 28 are maintained in the position shown in FIG. 12, and the mixed water from the inflow opening 25b is separated into two types flows, i.e; one flow passing from the outlet opening 26b toward the downstream side and the other flow passing from the ports 25c through the flow passage grooves 25d toward the downstream side. A small quantity out of the mixed water enters from the drain hole 27b of the pilot valve body 27 into the outside of the valve seat 26c and, while passing by the portion of the temperature-actuated spring 31, flows away from the drain hole 26d toward the downstream side.

In this way, since the temperature-actuated spring 31 is exposed to the mixed water for a period of time when the temperature of the mixed water is not high, the temperature of the mixed water can be always sensed. When the temperature of the mixed water reaches a high temperature, the load of production of the temperature-actuated spring 31 becomes great due to a change in the temperature toward the high temperature side and deforms in the direction of expansion thereof, thereby causing the pilot valve body 27 to rise, similar to the second embodiment.

Figure 14:
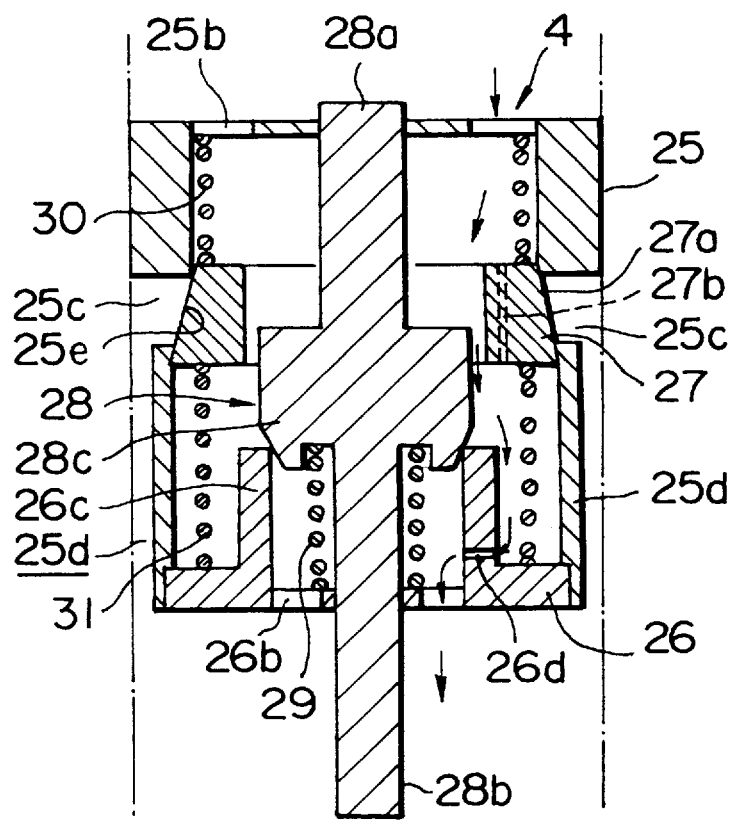
FIG. 14 is a longitudinal sectional view of the temperature-actuated valve in FIG. 12 with the flow passage being closed.

The rise of the pilot valve body 27 causes the ports 25c to be closed gradually by the tapered surface 27a of the pilot valve body 27 and, as shown in FIG. 14, the tapered surface 27a is brought into a seating engagement with the tapered surface 25e of the body 25 to thereby close the ports 25c completely, and the cone 28c of the main valve body 28 enters into the pilot valve body 27 so that the water flow area is greatly reduced. Accordingly, the difference in pressure between the upstream side and downstream side of the main valve body 28 is caused to rise, whereby the main valve body 28 is brought into a seating engagement with the upper surface of the valve seat 26c quickly to thereby shut off the flow passage.

Hereupon, since the flow passage of the ports 25c is closed by a seating engagement between the respective tapered surfaces 27a and 25e of the pilot valve body 27 and body 25, the leakage of the mixed water from the ports 25c can be removed. Namely, the pilot valve body 27 and the body 25 are joined by the fit of the taper, and the ports 25c positioned with a state of being included in the tapered surface 25e are closed by the tapered surface 27a of the pilot valve body 27. In the case of a valve mechanism such as a spool, for example, it requires the construction in which a packing is mounted around the valve body to ensure the seal between the valve body and the inner wall of the flow passage, however, in the case of the taper fit by the tapered surfaces 25e and 27a, the ports 25c can be surely closed without using such packing.

In this way, when the flow passage is shut off at the time of hot water having a high temperature, there is no outflow of the mixed water from the port 25c and, as shown in FIG. 14, a small quantity of mixed water flowing by way of the flow passage of an annular section between the pilot valve body 27 and the cone 28c flows away continuously from the drain hole 26d toward the downstream. Namely, even when the main valve body 28 is in its valve closing position, the temperature actuated spring 31 remains exposed to the mixed water, a small quantity of which flows continuously toward the shower head 3. The quantity of the mixed water after the flow passage is shut off is mainly controlled by the throttling of the drain hole 26d, and such controlled flow rate is such that it flows down little by little from the shower head 3. Moreover, if such controlled flow rate is to such a degree as to be able to be rapidly restored by the heat transmission to the temperature-actuated spring 31 when the hot and cold water mixing valve 1 is set to the low temperature side, the operation from the shut-off of the flow passage to the restoration can be carried out in a short time utilizing a drop of the temperature of the mixed water.

When the temperature-actuated valve 4 is shut off, as shown in FIG. 14, a user comes to know a high temperature setting of the hot and cold water mixed valve 1 and, in order to use the shower again, operates using this hot and cold water mixing valve 1 so that the temperature of the mixed water drops. At the time of starting the operation to the low temperature side, the mixed water having a high temperature remains in the body 25, however, the mixed water at a high temperature is supplied in such a way as to be pushed out gradually toward the side of the shower head 3 by the supply of the water at a low temperature. In this case, so long as the temperature of the mixed water does not drop to a sufficient low temperature, the temperature-actuated spring 31 maintains the state shown in FIG. 14 and the ports 25c remain closed by the pilot valve body 27, and only a small quantity of the mixed water having a high temperature passes toward the side of the shower head 3.

In this way, for a period of time when the temperature of the mixed water does not drop up to the optimum value after the flow passage is shut off, the mixed water at a high temperature is only supplied to the shower head 3 from the drain hole 26d, so if a flow rate of the mixed water from the drain hole 26d is kept small and is such a degree as to fall in drops from the shower head 3, there is no danger of the hot water at a high temperature being poured onto the user. Further, if a flow rate of the mixed water passing through the drain hole 26d is set so that it satisfies also a condition of a flow rate to such a degree as to be able to rapidly discharge the remaining hot water at a high temperature within the body 25, the time up to the temperature-actuated spring 31 contracts and deforms is shortened and the time until the water discharge begins is also shortened.

Figure 15:
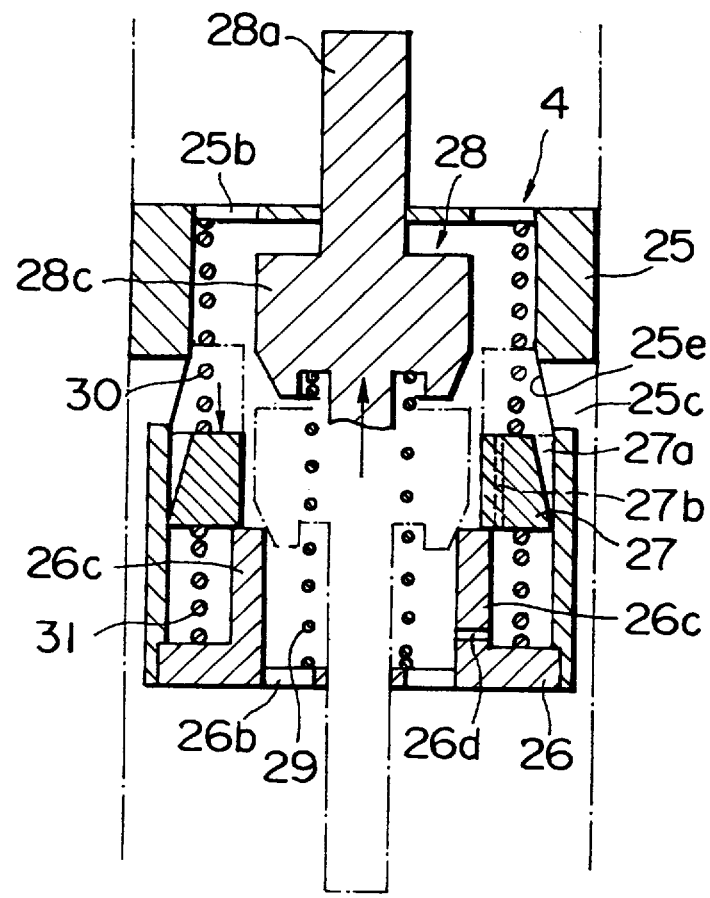
FIG. 15 is a longitudinal sectional view showing a procedure of the temperature-actuated valve being restored from the shut-off to the opening of the flow passage.
Figure 16:
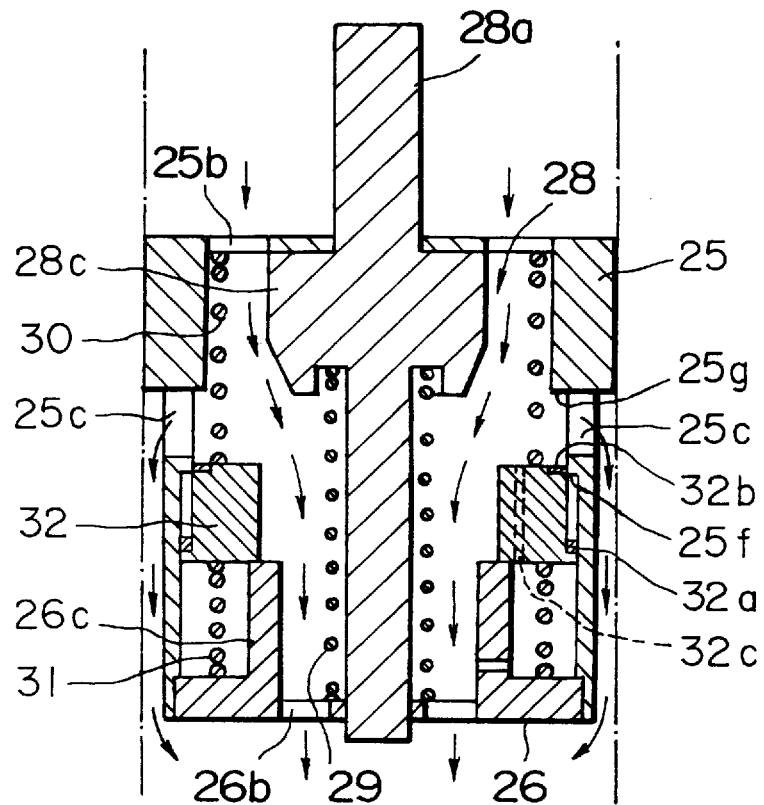
FIG. 16 is a longitudinal sectional view showing a modification of the fourth embodiment.

The resetting to the low temperature side using the hot and cold water mixing valve 1 causes the temperature of the mixed water within the body 25 to drop and, as shown in FIG. 15, the temperature-actuated spring 31 contracts and the pilot valve body 27 also drops to thereby open the ports 25c, thereby allowing the mixed water to pass through the interior of the body 25. Accordingly, a difference in the pressure between the upstream side and downstream side of the main valve body 28 is gradually decreased, and the main valve body 28 is moved upward by a force of restoration of the spring 29 and finally is restored automatically to the initiate state shown in FIG. 12.

In this way, when the sprayed water from the shower head 3 at the time of a high temperature is stopped, the main valve body 28 can be opened by the operation of the hot and cold water mixing valve 1 only to decrease the temperature of the mixed water. The temporary water stopping operation as performed in the above-described second embodiment is not required, thereby improving the ease for use.

In the explanation as described above, the drain holes 27b and 26d are provided in the pilot valve body 27 and the valve seat 26c, respectively, however, the appropriate clearance between the inner periphery of the pilot valve body 27 and the cone 28c and the appropriate clearance between the cone 28c and the valve seat 26c make it to also possible to provide the construction which allows the mixed water to leak little by little.

FIGS. 16 to 19 are a modification of the above-described fourth embodiment, in which the port is provided on the peripheral wall of the body 25, similar to the above-described embodiment. The present modification is different from the fourth embodiment in the seal construction between the pilot valve body and the ports, and the same members as those shown in FIG. 12 are indicated with common reference characters.

Figure 17:
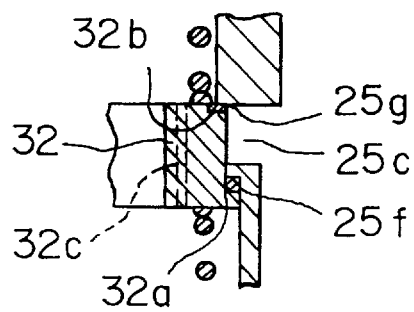
FIG. 17 is a partially enlarged longitudinal sectional view showing the shut-off of the port by the pilot valve body.

The pilot valve body 32 is provided with a packing 32a on the flange portion provided at the lower end, as shown in FIG. 17 in an enlarged scale and, simultaneously, with a packing 32b on the outer periphery at the upper end portion. Similar to the example in FIG. 12, the pilot valve body 32 is provided with a drain hole 32c in the axial direction which communicates with the flow passage toward the temperature-actuated spring 31. In the body 25, the stepped portion 25f protruding inwardly is formed, as a seating surface for the packing 32a, at the lower side of a plurality of ports 25c provided on the peripheral wall of the body 25, and also the upper side of the port 25c protrudes inwardly and forms a seating surface 25 g for the packing 32b (refer to FIG. 17).

Even in the case of such pilot valve body 32, when the temperature-actuated spring 31 expands due to the water having a high temperature, the packings 32a and 32b make close contact with the stepped portion 25f and the seating surface 25g, respectively, as shown in FIG. 17. Accordingly, the ports 25c are perfectly sealed by the packings 32a and 32b, and the mixed water from the hot and cold water mixing valve 1 flows around the temperature-actuated spring 31, so that sensing the temperature is performed in a good way for a period of time when the flow passage is shut off.

Figure 18:
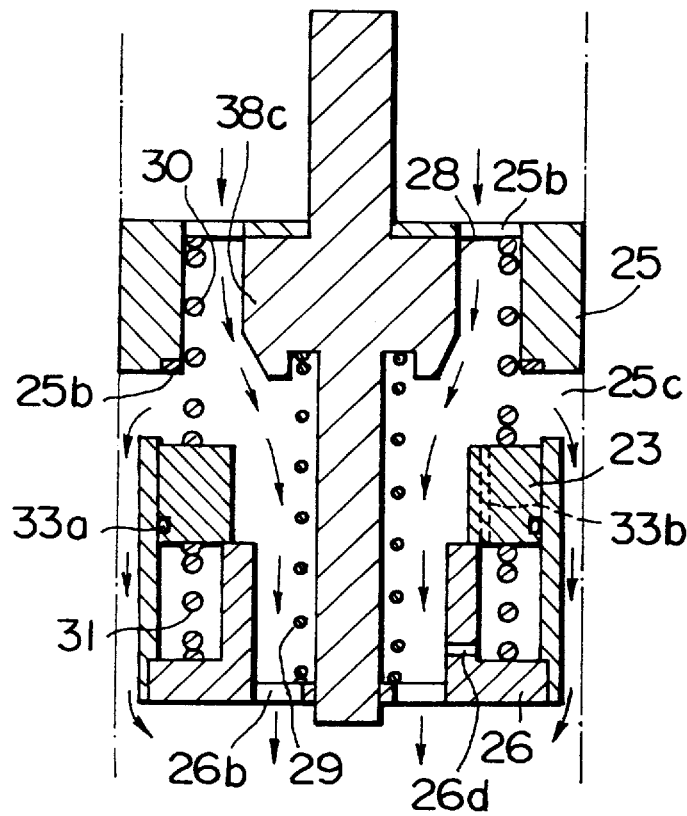
FIG. 18 is a longitudinal sectional view corresponding to FIG. 16, which is a further example of the construction of the port being shut off.

FIG. 18 is a longitudinal sectional view of the temperature-actuated valve showing the other modification of the seal construction of the port.

Figure 19:
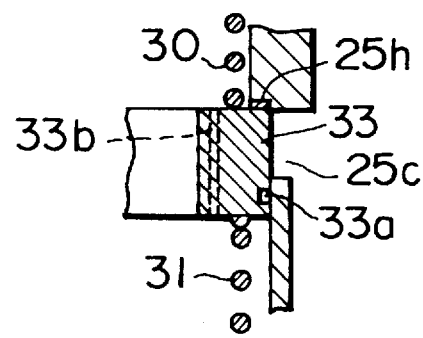
FIG. 19 is a longitudinal sectional view corresponding to FIG. 17, showing the shut-off of the port by the pilot valve body.

In this example, as shown in FIG. 19 in an enlarged scale, the pilot valve body 33 is provided with a packing 33a of U-shaped cross-section which makes close contact with the inner peripheral surface of the body 25 and is provided with a drain hole 33b, and the body 25 is provided with a packing 25h at the upper side of the port 25c, with which the upper surface of the pilot valve body 33 is brought into a seating engagement. Also in this example, at the time of a high temperature, the pilot valve body 33 is caused to rise and to bring the upper surface thereof into a seating engagement with the packing 25h, as shown in FIG. 19, whereby the ports 25c are sealed with the packing 33a.

FIG. 20 is a sectional view showing a fifth embodiment of the present invention.

In the present embodiment, the temperature-actuated valve 40 is incorporated into the elbow 1b which connects the hot and cold water mixing valve 1 to the shower hose 2.

The elbow 1b comprises a cylindrical elbow body 45 with the upper and lower ends being open, an external threaded pipe 42 connected to outside the lower end of the elbow body 45, and a nut member 43 for fixing the external threaded pipe 42 to the elbow body 45.

The temperature-actuated valve 40 includes, as the outline members, a housing 46 inserted from the lower end of the elbow body 4, and a cap 41 attached to the upper end of the housing 46, and the main valve body 48 and a spool valve body 47 as the pilot valve body are disposed within the housing 46.

The cap 41 comprises a ring portion 41a inserted and fitted into the upper end of the housing 46, and a central portion 41c joined to the ring portion 41a by way of a plurality (for example, 4 in number) of ribs 41b and disposed in the center of the ring portion 41a. The central portion 41c of the cap is of a circular arc-like section which enlarges smoothly from the upstream side to the downstream side, and a projection 41d with the lower end formed as a flat surface is provided at the center of the end of the downstream side, so that a pressure chamber 41e is formed.

Further, between the ring portion 41a and the center portion 41c is formed a flow passage 41f through which the mixed water passes. Moreover, on the peripheral edge of the end of the downstream side of the center portion 41 is a packing 41g having a predetermined width with which the spool valve body 47 makes seating engagement.

The housing 46 is in the form of a cage with the peripheral wall being open and is provided with a insert opening 46d in the center portion, around which a plurality of outlet openings 46a are provided. Further, on the outer peripheral position of these outlet openings 46a is provided a valve seat 46b facing the upstream side. On the outer periphery of the valve seat 46b is formed an annular groove 46c having a predetermined width.

Reference numeral 47 designates the pilot valve body, and the inner wall portions at the upper and lower ends of a hollow cylindrical valve ring 47a engages the outer periphery of the rib 41d of the bush 41 and the outer periphery of the valve seat 46b for sliding movement in the axial direction. The pilot valve body 47 further has an annular rib 47b projecting outwardly from the outer periphery of the valve ring 47a, and the temperature-actuated spring 44 is disposed between the annular rib 47b and the lower end portion of the bush center portion 41c, with the upper and lower ends of the temperature-actuated spring 44 being in an abutting engagement with the bush center portion 41c and the annular rib 47b, respectively.

Moreover, a biasing spring 49 is disposed between the annular rib 47b and the annular groove 46c of the plug 46.

At the end of the downstream side of the valve ring 47a of the pilot valve body 47 is provided a flow opening 47c and, at the time of use of the normal shower, the mixed water which flows from the flow passage 41f is adapted to flow to the shower hose 2 passing through the flow opening 47c and the outlet opening 46a.

A main valve body 48 which is substantially cylindrical is inserted into the pilot valve body 47 slidably in the axial direction. A drain hole 48a is passed through in the center portion of the main valve body 48, a tubular body 48d is integrally provided in connection with the drain hole 48a, and the main valve body 48 is formed on the outer periphery with two upper and lower annular grooves 48b and 48c. A U-packing 51 is disposed within the respective annular grooves 48b and 48c with the seal portion side facing each other.

A main valve body spring 52 which energizes the main valve body 48 toward the upstream side is disposed between the lower portion of the main valve body 48 and the upper end surface of the plug 46. The tubular body 48d of the main valve body 48 is inserted into and through the insert opening 46d of the plug 46.

The operation of the present embodiment having the above-described construction will be described below. In the case where the mixed water is within a range of temperature proper to the use of the shower, as shown in the right half of FIG. 20, the temperature-actuated spring 44 maintains the contracted shape, and the pilot valve body 47 is positioned so that the upper end portion of the valve ring 47a is in an abutting engagement with the packing 41g in the bush center portion 41c (is moved to the upstream side) by the energizing force of the biasing spring 49.

This shuts off the inflow of the mixed water into the upper portion of the main valve body 48, and the mixed water flows passing through the flow passage 41f of the bush 41, the outer peripheral side of the pilot valve body 47, the flow opening 47c of the pilot valve body 47 and the outlet opening 46a of the plug 46 toward the side of the shower hose 2.

In this case, the main valve body 48 exists in a state where it is brought into an abutting engagement with the bush center portion 41c by the energizing force of the main valve body spring 52 and the water pressure of the mixed water acting on the lower end portion of the main valve body 48. Further, since the two upper and lower U-packings 51 are disposed between the main valve body 48 and the pilot valve body 47, the mixed water never flows down passing through the clearance between the main pilot valve 48 and the pilot valve body 47.

Next, when the temperature of the mixed water approaches the temperature limit of use of the shower, the temperature-actuated spring 44 begins to change in the direction of expansion due to a shape-memory property. This deformation of the temperature-actuated spring 44 causes the pilot valve body 47 to be moved downwardly (moved to the downstream side), as shown in the left half of FIG. 20.

The downward movement of the pilot valve body 47 causes the upper end portion of the valve ring 47a to separate away from the lower end portion of the bush center portion 41c, so that the mixed water flows into the pressure chamber 41e of the bush 41 and the upper portion of the main valve body 48. Thus, the main valve body 48 overcomes the energizing force of the main valve body spring 52 and is moved downward within the valve ring 47a, so that the lower end portion of the main valve body 48 is brought into an abutting engagement with the valve seat 46b of the plug 46 to thereby shut off the flow passage between the flow opening 47c and the outlet opening 46a.

Since the clearance between the pilot valve body 47 and the main valve body 48 is perfectly sealed by the U-packings 51, the water pressure of the mixed water positively acts on the upper portion of the main valve body 48, and the flow passage-shutting off movement of the main valve body 48 is promptly and surely performed.

When, after the water having a high temperature is shut off, the mixed water having a low temperature is caused to flow through the drain hole 48a of the main valve body 48 by the operation of the hot and cold water mixing valve 1, the temperature-actuated spring 44 contracts again and the pilot valve body 47 is caused to rise up to the position of the bush center portion 41c, as shown in the right half of FIG. 20. This shuts off the water pressure to the upper portion of the main valve 48, and the main valve body 48 is moved upward by the energizing force of the main valve body spring 52 and the water pressure acting on the lower end portion thereof, whereby it is separated away from the valve seat 46b.

When the main valve body 48 begins to open, the pressure at the downstream side of the main valve body 48 drops due to the flow, however, since the drain hole 48a of the main valve 48 communicates with the downstream side by way of the tubular body 48d provided in connection with the drain hole 48a, the pressure on the upper surface of the main valve body 48 can be made low, whereby the water discharge can be resumed more smoothly.

In this way, according to the present embodiment, the provision of the U-packing 51 and the main valve body spring 52 allows the movement of the main valve body 48 shutting off the flow passage and the movement of the main valve body 48 resuming the flow passage to be performed rapidly and positively. This enables the pressure receiving area of the main valve body 48 to be made small, thereby allowing the temperature-actuated valve device to be made smaller in size in the radial direction.

Figure 21:
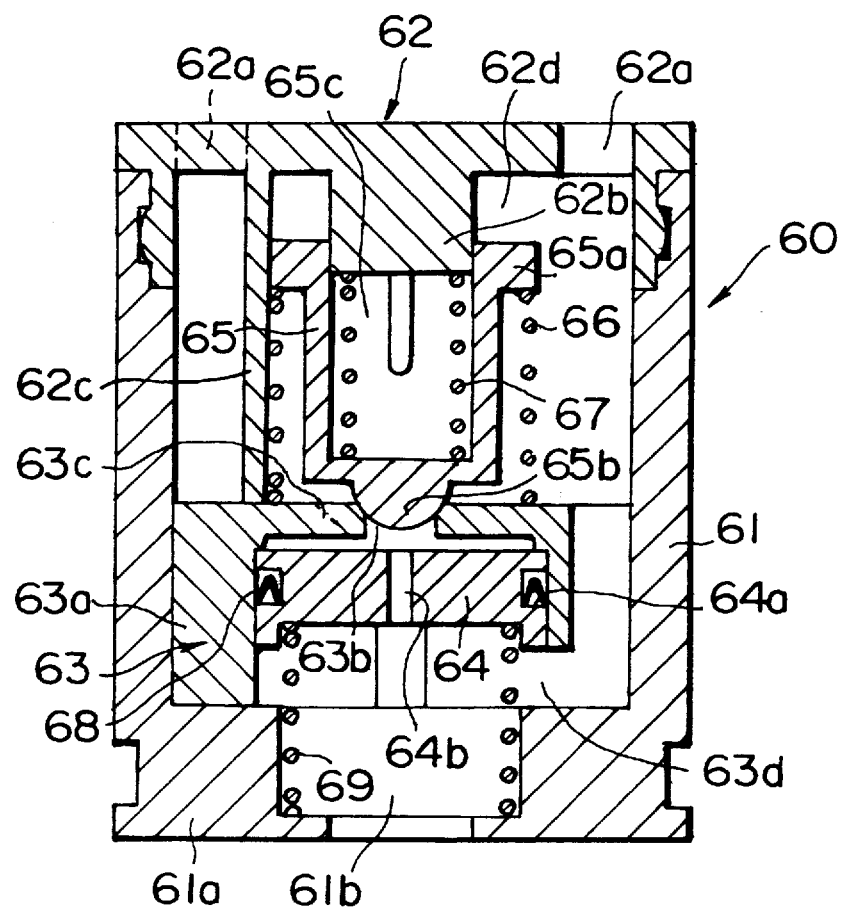
FIG. 21 is a sectional view showing a sixth embodiment.

FIG. 21 is a sectional view showing a sixth embodiment of the present invention.

In the present embodiment, the temperature-actuated valve 60 includes a tubular body 61 with the upper end being open, and a plug 62 having a plurality of flow openings 62a near the peripheral edge is secured to the upper end opening of the body 61. Further, the outlet opening 61b is made in the bottom 61a of the body 61.

The above-described plug 62 comprises a center guide 62b in the center portion extending toward the inner direction of the axis, and a plurality of peripheral guides 62c provided parallel to the center guide 62b at predetermined distances in the outer periphery of the center guide 62b. The plurality of the peripheral guides 62c are formed at predetermined distances in the peripheral direction, and the mixed water is allowed to flow passing through the peripheral distances.

Between the lower end portion of the peripheral guide 62c of the plug 62 and the bottom 61a of the body 61 is disposed a hollow cylindrical main valve body guide 63. This main valve body guide 63 comprises a cylinder 63a in which the main valve body 64 is slidably moved in the axial direction, and the upper wall 63c which closes the upper end portion of said cylinder 63a and which is provided at the center portion with the flow opening 63b.

A pilot valve body 65 is disposed movably between the plug 62 and the main valve body guide 63 in the axial direction. The pilot valve body 65 has a hollow cylindrical body with an outer flange 65a being formed at the upper end thereof, and a hemisphere-like valve part 65b is provided so as to protrude at the lower end thereof.

The center guide 62b of the plug 62 is slidably inserted into the hollow portion 65c of the pilot valve body 65, and the outer flange 65a is slidably inserted into the guide groove 62d formed between the center guide 62b of the plug 62 and the peripheral guide 62c. Further, the valve part 65b of the pilot valve body 65 abuts the center flow opening 63b of the main valve body guide 63 to thereby close it.

A temperature-actuated spring 66 is disposed between the outer flange 65a of the pilot valve body 65 and the upper wall 63 of the main valve body guide 63. Further, a biasing spring 67 is disposed within the hollow portion 65c of the pilot valve body 65 so that both ends of the biasing spring 67 abut the inner wall surface of the hollow portion 65c of the pilot valve body 65 and the center guide portion 62b of the plug 62.

The cylindrical main valve body 64 is slidably inserted into the cylinder 63a of the main valve body guide 63. On the peripheral wall of the main valve body 64 which is in sliding contact with the cylinder 63a is formed an annular groove 64a, in which a U-packing 68 is disposed. Moreover, a flow opening 64b having a small diameter is formed in the center of the main valve body 64.

A plurality of flow openings 63d are provided at the end of the downstream side of the cylinder 63a of the main valve body guide 63, and the mixed water which flows into from the flow opening 62a of the plug 62 is adapted to flow, passing through the flow opening 63d, from the outlet opening 61b to the shower hose.

Between the main valve body 64 and the bottom 61a of the body proper 61 is disposed a main valve spring 69, which energizes the main valve body 64 toward the upstream side.

The function of the present embodiment composed of the above-described construction will be described. While the mixed water having a temperature within an allowable temperature range of use of the shower flows, the temperature-actuated spring 66 contracts in shape, as shown in FIG. 21, and the valve part 65b of the pilot valve body 65 abuts the center flow opening 63b by the energizing force of the biasing spring 67 to thereby close the center flow opening 63b.

Thus, the water pressure of the mixed water does not act on the upper end of the main valve body 64, and the main valve body 64 is pressed upwardly toward the upstream side by the energizing force of the main valve body spring 69 and the water pressure of the mixed water which flows into from the flow opening 63d. Accordingly, the mixed water flows through the flow opening 63d and is discharged from the outlet opening 61b.

When the temperature of the mixed water rises up to a high temperature near the allowable temperature limit of use of the shower, the temperature-actuated spring 66 changes in shape in the direction of expansion, and the pilot valve body 65 overcomes the energizing force of the biasing spring 67 and is moved toward the upstream side. This causes the valve part 65b of the pilot valve 65 to be separated away from the center flow opening 63b to thereby open the center flow opening 63b.

This center flow opening 63b causes the mixed water to flow into the upstream side of the main valve body 64 in the cylinder 63a to thereby push down the main valve body 64 toward the downstream side by the water pressure. This push-down force acts efficiently on the main valve body 64, thereby allowing the main valve body 64 to be moved down rapidly and positively, since the U-packing 68 is provided on the peripheral wall of the main valve body 64 and the clearance between the cylinder 63a and the main valve body 64 is sealed.

The main valve body 64 overcomes the energizing force of the main valve body spring 69 and is moved downward until it is brought into an abutting engagement with the bottom surface 61a of the body 61, so that the flow opening 63d is shut off and the discharge of the hot water having a high temperature is stopped.

Thereafter, when the mixed water having a low temperature is caused to flow through the flow opening 64b having a small diameter of the main valve body 64 by operating the hot and cold water mixing valve 1, the temperature-actuated spring 66 contracts again and the pilot valve body 65 causes the center flow opening 63b to be closed. This causes the water pressure on the upstream side of the main valve body 64 to drop, thereby allowing the main valve body 64 to be pushed upward again toward the upstream side by the energizing force of the main valve body spring 69, so that the flow opening 63d is made and the mixed water is discharged from the outlet opening 61b.

In this way, according to the present embodiment, making the pilot valve body 65 perform the valve closing and opening movement by the temperature-actuated spring 6 allows the shut-off of the mixed water and the movement of re-discharge of the mixed water by the main valve body 64 to be performed quickly and surely.

Figure 22:
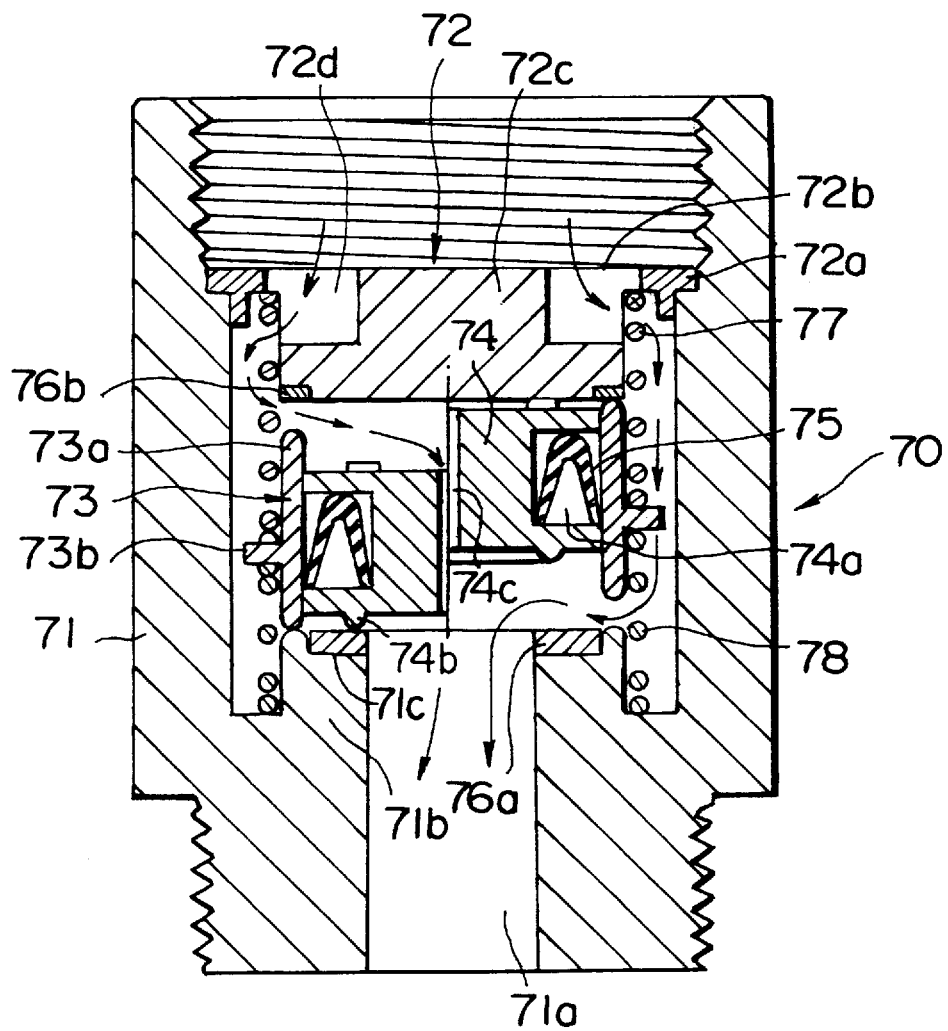
FIG. 22 is a sectional view showing a seventh embodiment.

FIG. 22 is a sectional view showing a seventh embodiment of the present invention. The present embodiment is of the construction similar to that of the fifth embodiment shown in FIG. 20, however, it is different from the fifth embodiment in the sliding guide means of the pilot valve body and the seal means of the pilot valve body.

A body 71 of a temperature-actuated valve 70 is composed of a hollow cylindrical body opened at the upper end and having a bottom 71b which is formed with an outlet opening 71a in the center portion at the lower end of the cylindrical body. Further, a main valve seat 71c is provided on the bottom 71b toward the upstream side in such a way to enclose the outlet opening 71a.

To the opening at the upper end of the body 71 is fixed a bush 72 which includes an annular ring portion 72a, and a center portion 72c held on the ring 72a by way of a plurality of (for example, four in number) ribs 72b in the center portion of the ring portion 72a. The bush 72 is fixed by fitting the ring portion 72a into the opening at the upper end of the body 71, and a flow passage 72d is formed between the ring portion 72a and the center portion 72c.

A pilot valve body 73 is disposed slidably between the main valve seat 71c and the center portion 72c in the axial direction. The pilot valve body 73 comprises a hollow cylindrical valve ring 73a and a plurality of (for example, 4 in number) ribs 73b provided on the outer peripheral surface of the valve ring 73a so as to protrude outwardly. The outer diameter of such plurality of ribs 73b is made a little smaller than the inner diameter of the body 71 so that the pilot valve body 73 is slidable within the body 71. Further, the upper and lower ends of the valve ring 73a are adapted to be brought into an abutting engagement with the center portion 72c and the main valve seat 71c, respectively. A main valve body 74 which is substantially cylindrical is disposed within the pilot valve body 73 for sliding movement in the axial direction and it is formed with an annular groove 74a on the outer periphery of the main valve body 74. A U-packing 75 is mounted within the annular groove 74a to make the sliding clearance between the main valve body 74 and the pilot valve body 73 small.

The main valve body 74 is provided with a ring-like projection 74b on the lower end surface thereof, and the projection 74b is adapted to be brought into an abutting engagement with the main valve seat 71c.

Moreover, the main valve body 74 is formed in the center thereof with a small hole 74c passing therethrough. A seal member 76a made of an elastic resin material is applied to the upper surface of the main valve seat 71c to improve the sealing property when the lower end of the projection 74b and the valve ring 73a of the pilot valve body 73 abut the main valve seat. Further, the similar sealing member 76b is applied to the position where the upper end of the valve ring 73a abuts the center portion 72c of the bush 72.

A temperature-actuated spring 77 is disposed between the plurality of ribs 73b of the pilot valve body 73 and the ring portion 72a of the bush 72, and a biasing spring 78 is disposed between the plurality of ribs 73b and the bottom 71b of the body 71 to keep the balance with the above-described temperature-actuated spring 77.

Next, the operation of the present embodiment having the construction as described above will be described.

While the mixed water having a temperature within an allowable temperature range of use of the shower flows, the temperature-actuated spring 77 is contracted in shape and, as shown in the right half of FIG. 22, the pilot valve body 73 is moved to such a position that the upper end of the valve ring 73a abut the seal member 76b of the center portion 72c by an energizing force of the biasing spring 78. This causes the water pressure on the upper end portion of the main valve body 74 to drop, and the main valve body 74 is pushed upwardly up to the position where it is brought into an abutting engagement with the center portion 72c of the bush 72 by the water pressure of the mixed water which flows into from the lower side of the pilot valve body 73. Accordingly, the mixed water passes through the flow passage 72d and enters into the flow passage between the pilot valve body 73 and the body 71, and after passing the spaces between the plurality of ribs 73b, it enters into the pilot valve body 73 and flows out from the outlet opening 71a toward the shower hose side.

When the temperature of the mixed water approaches the high temperature limit which is usable with the shower, the temperature-actuated spring 77 changes in shape in the direction of expansion, and overcomes the energizing force of the biasing spring 78 to thereby push down the pilot valve body 73.

As shown in the left half of FIG. 22, when the pilot valve body 73 is moved downward up to the position where it is brought into an abutting engagement with the sealing member 76a of the main valve seat 71c, the lower end side of the main valve body 74 becomes a lower pressure and, simultaneously, the upper end side of the main valve body 74 becomes a high pressure by the water pressure of the mixed water which flows into over the upper end of the pilot valve body 73, so that the main valve body 74 also is moved down up to the position where it is brought into abutting engagement with the main valve seat 71c. In this way, the outlet opening 71a is shut off and the outflow of the mixed water having a high temperature is stopped.

Next, when the mixed water having a low temperature is supplied by operating the hot and cold water mixing valve, the water at a high temperature remaining within the temperature-actuated valve is discharged through the small hole 74c of the main valve body 74 and, further, the temperature-actuated spring 77 contracts in shape due to the mixed water at a low temperature, thereby causing the pilot valve 73 to rise to the position shown in the right half of FIG. 22 again.

In this way, the upper end side of the main valve body 74 becomes a low pressure and the lower end side becomes a high pressure under the water pressure of the mixed water which flows into, so that the main valve body 74 is caused to rise toward the bush 72 and the outlet opening 71a is made to thereby discharge the mixed water.

In the present embodiment, since the U-packing 75 is mounted on the outer peripheral wall of the main valve body 74, the sliding clearance between the pilot valve body 73 and the main valve body 74 becomes small and, utilizing the difference in the water pressure which acts on the upper end side and lower end side of the main valve body 74, the main valve 74 can be moved promptly and positively.

The embodiments according to the present invention described above in which the temperature-actuated valve is built in the elbow to which a shower hose is connected, offer a function of preventing the water at a high temperature from being discharged from the shower head. The temperature-actuated valve device according to the present invention can be further applied in such a way that it is incorporated into the flow passage switching valve device, whereby the discharge of the water at a high temperature from the shower head is stopped and the water at a high temperature is discharged from the delivery pipe in a safe way.

Now, an embodiment in which the temperature-actuated valve device according to the present invention is applied to the flow passage switching valve will be described below.

Figure 23:
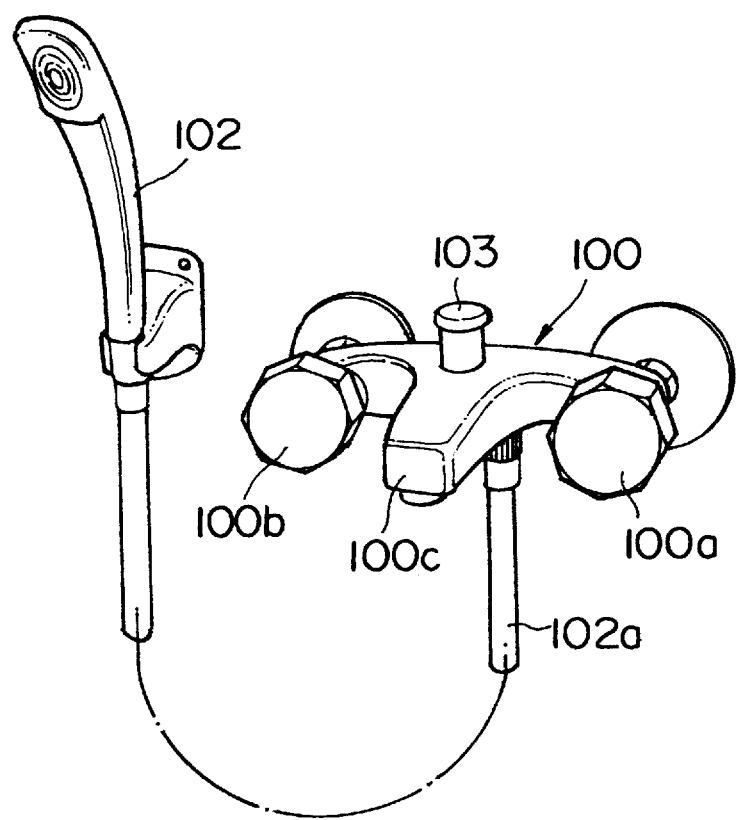
FIG. 23 is a schematic illustration showing a hot and cold water mixing valve equipped with a flow passage switching valve according to the present invention, together with a shower head.

FIG. 23 is a schematic view showing the hot and cold water mixing valve and shower head equipped with a switching valve according to the present invention.

The mixing valve body 100 of the hot and cold water mixing valve is connected to the cold water supply pipe arrangement and hot water supply pipe arrangement of a building, and a cold water handle 100a and a hot water handle 100b are provided to operate a cold water valve and a hot water valve the flow passages of which communicate with the pipe arrangement, a delivery pipe 100c for delivering the mixed water being provided. To the mixing valve body 100 is connected a hose 102a in communication with a flow passage which branches off from the delivery pipe 100c, a shower head 102 being connected to the hose 102a, and an operating handle 103 for switching operation of the flow passage from the delivery pipe 100c side to the shower head 102 side and vice versa extends from the upper surface.

FIG. 24 is a longitudinal sectional view of an essential portion showing the construction of incorporation of the switching valve linked to the operating handle 103.

Figure 25:
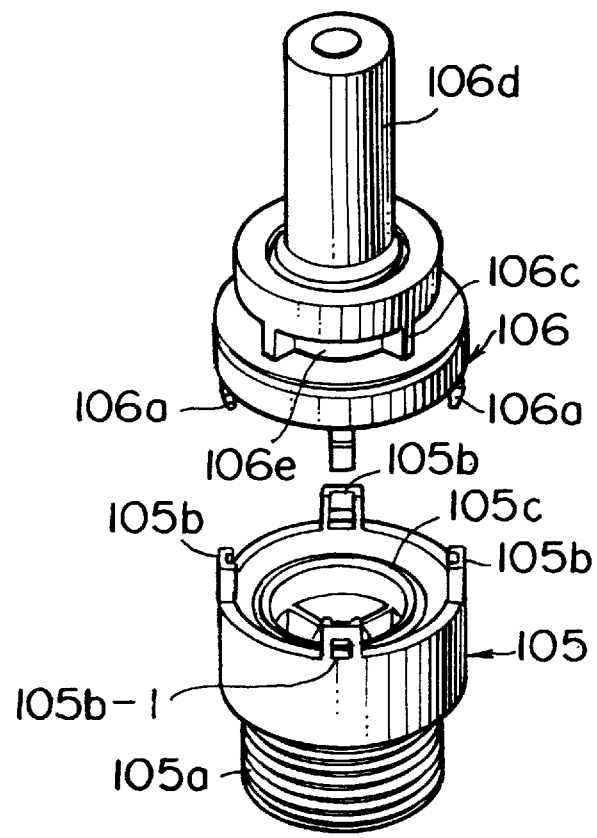
FIG. 25 is an exploded view of the upper and lower housings of the switching valve.

The switching valve is accommodated within a chamber 104d in which a mixed water flow passage 104a communicating with the mixing chamber at the respective downstream side of the cold water valve and hot water valve, a delivery flow passage 104b communicating with the side of the delivery pipe 100c and a shower side flow passage 104c communicating with the side of the shower head 102 intersect with each other and, as shown in FIG. 25, it comprises a lower housing 105 and a upper housing 106 as an outline member.

The lower housing 105 has an externally threaded portion 105a at the lower end side, which is screwed into the inlet portion of the shower side flow passage 104c with a packing 104c-1 interposed thereon, and it has four stationary seats 105b with a vertical rise at the upper end side each being provided with an engaging hole 105b-1 which is integrally engaged by a hook 106a of the upper housing 106. The lower housing 105 is formed therein with a shower side valve seat 105c, as shown in FIG. 26A and FIG. 26B and, at the immediate downstream side thereof, valve openings 105e are provided between cross-like ribs 105d in the flat shape, said ribs having a boss 105f of an annular section in the center of the rib 105d.

The upper housing 106 is joined to the inner periphery of the chamber 104d in a sealed state with a packing 104d-1 interposed therebetween and is connected to the lower housing 105 by inserting the hook 106a into the engaging holes 105b-1 of the stationary seats 105b, and thus the upper and lower housing are integrally connected, with the spaced portions between the respective peripheral distances of the hooks 106 and stationary seats 105b being provided as inlet holes 106b which communicate with the flow passage of the mixed water. Further, on the upper end side of the upper housing is integrally formed a sleeve 106d by way of cross-like ribs 106c in the shape of the plan view, and the spaces between the four ribs 106c serve as the outlet opening 106e which makes the interior of the upper housing 106 communicate with the delivery side flow passage 104b.

The sleeve 106d of the upper housing 106 is passed through the hole 100d provided on the upper surface of the mixing valve body 100 and extends up to the outside, and the spindle 103a connected to the operating handle 103 is incorporated into the sleeve 106d for up and down movement in a water tight way by a packing 106d-1. At the lower end side of the sleeve 106d, a valve body 107 which comes into and out of contact with a valve seat 105c is held between the rib 103b formed on the spindle 103a and a stop ring 103c and integrally secured.

Figure 28:
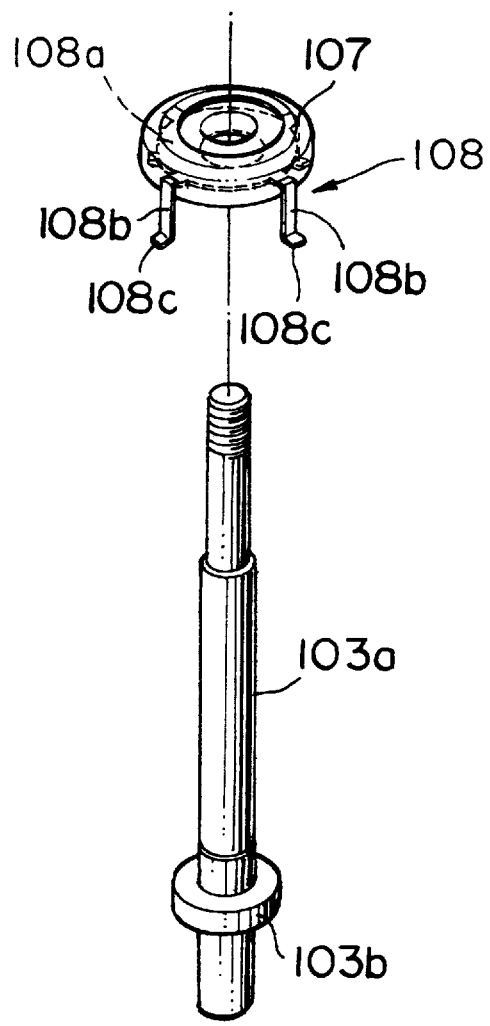
FIG. 28 is an exploded view of a spindle, a valve body and a pressure receiving ring.

FIG. 28 is an exploded view of the spindle 103a and the valve body 107, and a pressure receiving ring 108 made of metal or synthetic resin is integrally attached to the valve body 107 made of rubber. The pressure receiving ring 108 includes an annular base 108a which is sealed and fixed within the valve body 107, and four legs 108b extending downwardly, each having a pressure receiving seat 108c extending out radially at the lower end of the legs 108b.

As shown in FIG. 24, a temperature-actuated spring 109 is interposed between the pressure receiving seat 108c of the pressure receiving ring 108 secured to the valve body 107 and the upper housing 106. This temperature-actuated spring 109 is disposed around the four legs 108b and the valve body 107, with the lower end being supported by the pressure receiving seat 108c, as shown in the drawing, and the upper end being inserted into and held by an annular groove 106f formed on the lower surface of the upper housing 106. The portion formed outside the annular groove 106f and facing the valve body 107 forms as a valve seat 106g at the delivery side.

The temperature-actuated spring 109 has such a shape-memory property that the load of production changes due to the temperature of the temperature-actuated spring 109 itself and, at a certain temperature or below, the load of production is small and the elastic reaction force is restrained to a small force, and when the certain temperature is exceeded, the load of production becomes large and the temperature-actuated spring 109 expands. This temperature-actuated spring 109 is so set that its property shifts at a temperature a little lower than the upper limit temperature as the shower is used.

Namely, in a range of comfortable temperature as the shower is used, the spring constant of the temperature-actuated spring 109 is set to such a value that when no mixed water is supplied and the pressure of the load is zero, the spindle 103a overcomes the sliding resistance against the packing 106d-1 and can be moved downward in FIG. 24 and, simultaneously, it is set to a value a little smaller than a force of action by which the valve body 108 is moved upward by the pressure of supply of the mixed water of approximately 5 liters/min. which is a general lower limit value of the quantity of delivery as the shower is used. Further, in a range of temperature exceeding the comfortable temperature of the shower, the temperature-actuated spring 109 is set to the spring constant which is capable of producing a load moving the valve body 107, which is in seating engagement with the valve seat 106g at the delivery side, toward the valve seat 105c at the shower side, when the temperature-actuated spring 109 is gradually restored to the previously stored shape. The load of production at this time is set to a value greater than the force which presses the valve body 107 toward the valve seat 106g at the delivery side by the pressure of supply of approximately 15 litters/min. which is a general upper limit value of the quantity of delivery as the shower is used.

With the construction described above, for a period of time when the operating handle 103 is pressed down, as shown in FIG. 24, the valve body 108 is in a seating engagement with the valve seat 105c at the shower side, the mixed water from the mixed water flow passage 104a passes through the inlet opening 106b flowing over the valve seat 105c at the delivery side which is opened, and flows through the outlet opening 106e to the delivery flow passage 104b, until it is discharged from the delivery pipe 101c.

Since the water pressure of the mixed water which is passed through acts on the upper surface of the valve body 107, which is accordingly energized toward the valve seat 105c of the shower side, so that the shower flow passage 104c is maintained in a state of being closed. When the temperature of the mixed water is low, the load of production of the temperature-actuated spring 109 is small, but if only the operating handle 103 is pressed down, the shower side flow passage 104c can be closed utilizing the water pressure of the mixed water as described above. Moreover, since the load of production of the temperature-actuated spring 109 becomes great as the temperature of the mixed water becomes high, the force which energizes the valve body 107 toward the valve seat 105c at the shower side becomes strong, whereby a more stable valve-closed state can be maintained than the case in which the temperature of the mixed water is low. Accordingly, in the case where, for example, a small quantity of the mixed water having a high temperatures is delivered from the delivery pipe 100c, the pressure of supply of the mixed water drops and a force of energizing the valve body 107 toward the valve seat 105c at the shower side becomes small, however, since the load of production of the temperature-actuated spring 109 increases, the valve body 17 is strongly pressed against the valve seat 105c at the shower side, thereby enabling the valve-closed state to be stabilized.

Figure 29:
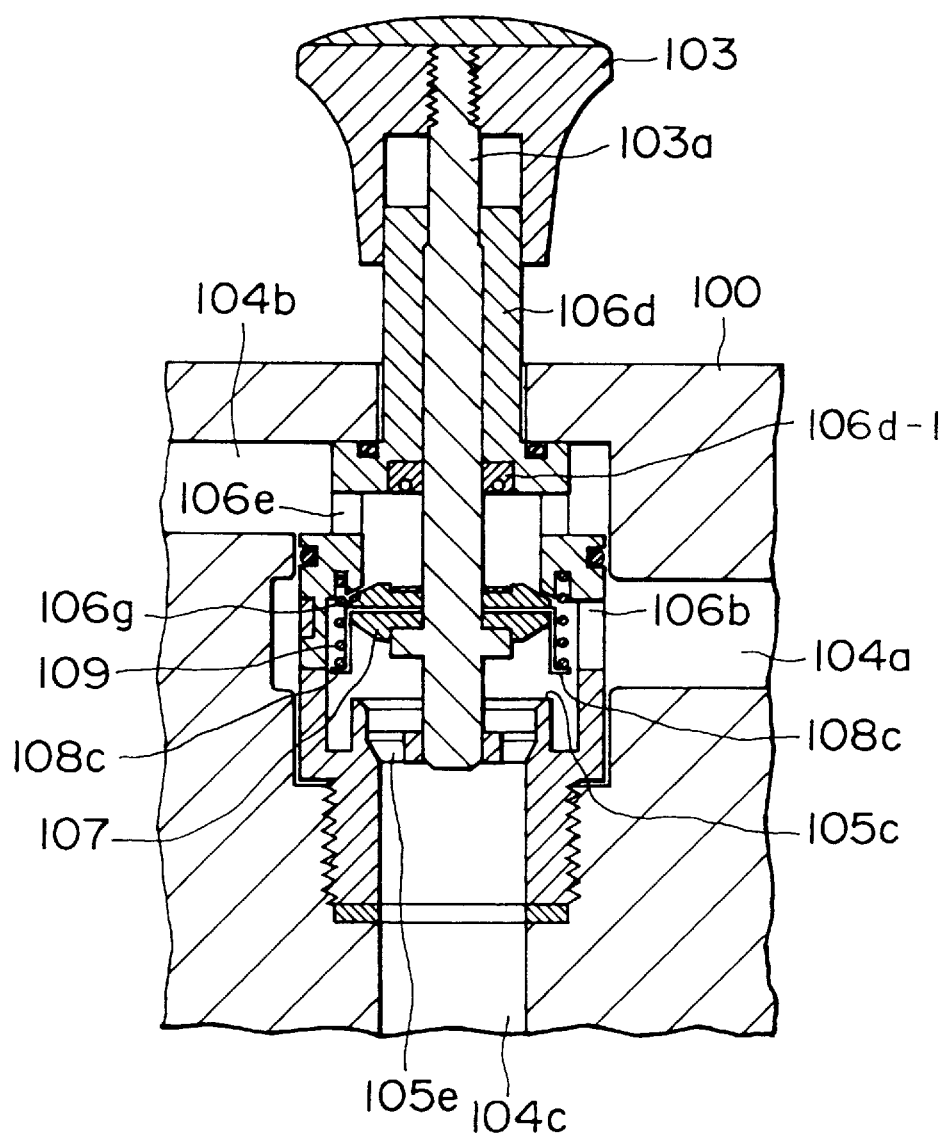
FIG. 29 is a longitudinal sectional view showing a state of the switching valve in FIG. 24 being switched to the shower side.

In the meantime, in order to switch from the side of the delivery pipe 100c to the side of the shower head 102, the operating handle 103 is pulled upwardly to bring the valve body 107 into a seating engagement with the valve seat 106g at the delivery side, as shown in FIG. 29. This causes the valve seat 105c at the shower side to be opened and also causes the mixed water from the inlet opening 106b to be supplied by way of the shower side flow passage 104c to the shower head 102, and the temperature-actuated spring 109 contracts in shape by a rise of the pressure receiving ring 108.

Hereupon, as described above, with respect to the temperature of the mixed water within a range of comfortable temperature of the shower, the spring constant of the temperature-actuated spring 109 is made smaller than a force of action due to the pressure of the mixed water applied to the valve body 107 at the time of the lower limit of the shower discharge quantity, whereby the valve body 107 is maintained in the state shown in FIG. 29 by the pressure from the mixed water, and the flow passage to the side of the shower head 102 is kept open.

Further, when the temperature of the mixed water reaches a high temperature and reaches a region of exceeding the upper limit of the temperature which is used in the shower, the load of production of the temperature-actuated spring 109 becomes great gradually and the temperature-actuated spring 109 which has contacted in shape, as shown in FIG. 29, expands and is restored to the original shape shown in FIG. 24. Namely, when the set temperature of the mixed water rises suddenly from one cause or another and reaches a high temperature, the temperature-actuated spring 109 senses such high temperature and deforms to cause the valve body 107 to be moved away from the valve seat 106g at the delivery side until the valve body 107 seats onto the valve seat 105c at the shower side, thereby allowing the discharge from the shower head 102 to be automatically switched to the discharge from the delivery pipe 100c.

In such switching operation, if the load of production of the temperature-actuated spring 109 corresponding to the temperature of the mixed water is designed to also overcome a force of action due to the water pressure applied to the valve body 107 in the upward direction when a quantity of supply of the mixed water is the maximum quantity of discharge at the time of use of the shower, the valve body 107 is caused to be moved to the side of the valve seat 105c to thereby shut off the flow passage regardless of the flow rate of discharge when the shower is used.

In this way, while the shower head 102 to which the flow passage is switched is being used, when the temperature of the mixed water exceeds the upper limit of temperature for use of the shower, the flow passage is automatically switched to the side of the delivery pipe 100c by the restoration in shape due to an increase in the load of production of the temperature-actuated spring 109. For this reason, even when a change to the high temperature side of the mixed water occurs while the shower is being used, the hot water at a high temperature is never poured to a human body and, when the operation is started, the switching valve exists in such a state that the spindle 103a and valve body 107 always close the flow passage toward the shower head 102 due to their own weights and no mixed water is discharged from the shower head 102; therefore, such switching valve can be used as the valve in which a property of safety is further improved.

Further, in the embodiment described above, since the temperature-actuated spring 109 is disposed so that it can be inserted from the outside of the valve body 107, the temperature-actuated spring 109 can be disposed to face the inlet opening 106b in the periphery thereof, as shown in FIGS. 24 and 29. Fore this reason, when the mixed water at a high temperature is supplied with the switching valve being switched to the shower side, the temperature-actuated spring 109 is exposed to such mixed water having a high temperature and can be actuated quickly, thereby allowing the discharge of the water at a high temperature from the shower head 102 to be shut off promptly. Moreover, after the switching operation is made to the side of the delivery pipe 100c, the temperature-actuated spring 109 can be quickly actuated in a similar way also in response to a decrease in the temperature of the mixed water after adjustment in temperature is recommenced in the hot and cold water mixing valve, and switching from the delivery side to the shower side again can be operated in a very short time.

It is necessary to set the load of production of the temperature-actuated spring 109 on the basis of the water pressure from the mixed water applied to the valve body 107. In the meanwhile, since the load of production is proportional to a diameter of the wire rod of a raw material of the temperature actuated spring 109, to use the wire rod made of a shape-memory alloy having a great diameter is preferable in order to be capable of correspond also to a condition of execution including the high supply pressure of the mixed water. However, if such a wire rod made of a shape-memory alloy having a great diameter is used as a raw material, not only the cost of production is expensive but also the resistance of the flow passage becomes great and, therefore, also the maximum quantity of discharge is limited. Accordingly, in order to remove such disadvantageous situation, if an appropriate pressure-reducing valve is attempted to be incorporated in the mixed water flow passage 104a or at the upstream side thereof to maintain the pressure of supply of the mixed water, the wire diameter of the temperature-actuated spring 109 can be made smaller and the problem regarding an aspect of cost and the maximum quantity of discharge is removed.

Figure 30:
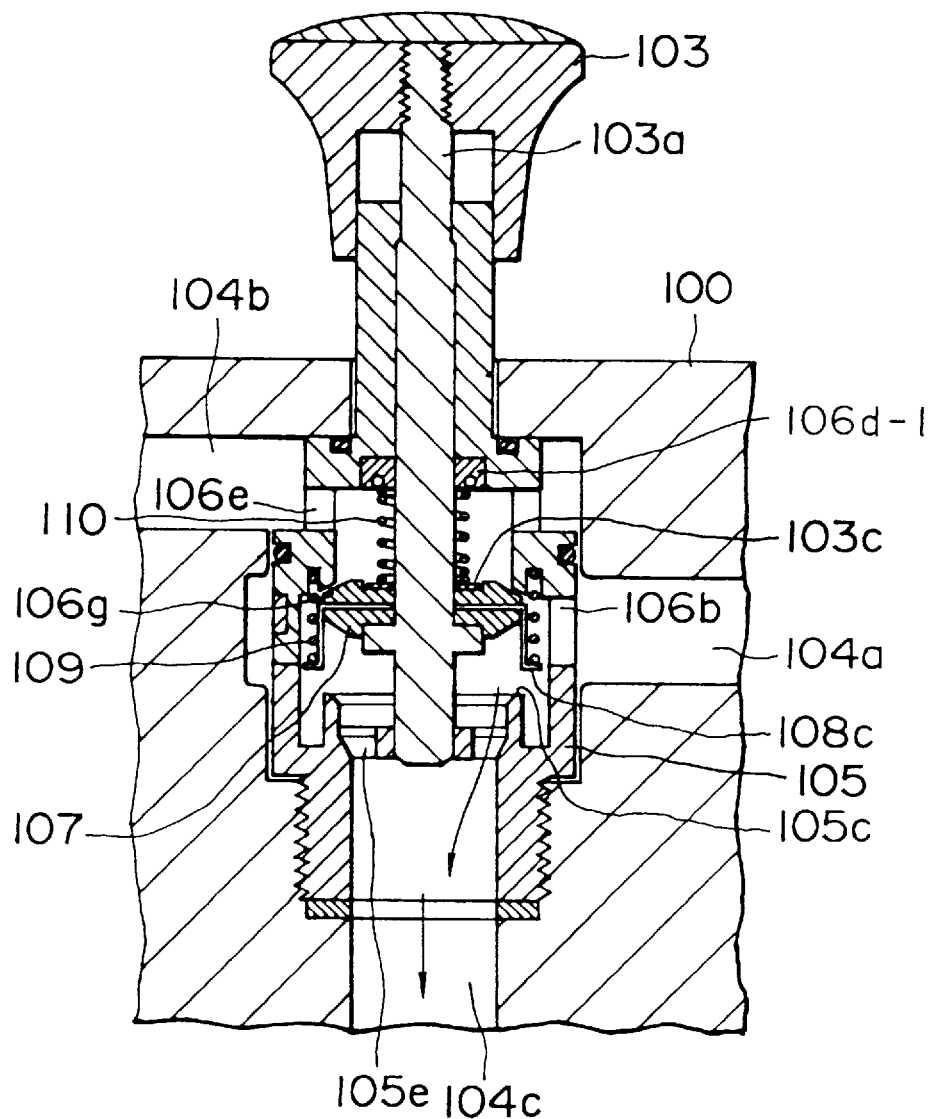
FIG. 30 is a longitudinal sectional view showing an example of the switching valve provided with an auxiliary spring.

FIG. 30 is a sectional view showing a further embodiment of the switching valve according to the present invention, in which an auxiliary spring 110 is disposed between the lower surface of the upper housing 106 and the retaining ring 103c in the switching valve of the first embodiment shown in FIGS. 24 and 29.

The auxiliary spring 110 is a general compression coil spring made of a steel wire rod, and the spring constant is determined in such a way that the composite spring constant, when the auxiliary spring 110 is arranged in parallel to the temperature-actuated spring 109, is smaller than a force of action which presses the valve body 107 in the direction of the valve seat 106g at the delivery side by the water pressure from the mixed water corresponding to the lower limit of the quantity of discharge when the shower is used.

Referring to FIG. 30, pulling up the operating handle 103 causes the valve body 107 to be brought into a seating engagement with the valve seat 106g at the delivery side to thereby open the flow passage at the shower side, and the flow passage is maintained in the state shown in the drawing by the water pressure of the supplied mixed water. When the temperature of the mixed water exceeds the upper limit when the shower is used, the load of production of the temperature-actuated spring 109 becomes great and presses the valve body 107 toward the valve seat 105c at the shower side. At this time, when the valve body 107 is moved away from the valve seat 106g at the delivery side, the pressure of the mixed water comes to be applied also to the upper surface of the valve body 107, and an initial difference in the pressure between the upper and lower surfaces of the valve body 107 is canceled and gradually changes to a state of equilibrium. Accordingly, the valve body 107 is subjected to an energizing force by the compression auxiliary spring 110 and, along with the restoration of shape due to the load of production of the temperature-actuated spring 109, the valve body 107 is quickly moved toward the valve seat 105c at the shower side.

The provision of the auxiliary spring 110 in this way allows the movement of the valve body 107 toward the valve seat 105c at the shower side when the mixed water changes to a high temperature to be more accelerated compared with the above-described example, whereby the discharge of the water at a high temperature from the shower head 102 can be rapidly stopped. Therefore, the mixed water at an appropriate temperature remaining in the hose 102a at the downstream side of the valve seat 105c at the shower side can be made to such a degree to be pushed out, so the user is never subjected to the water having a high temperature.

Figure 31:
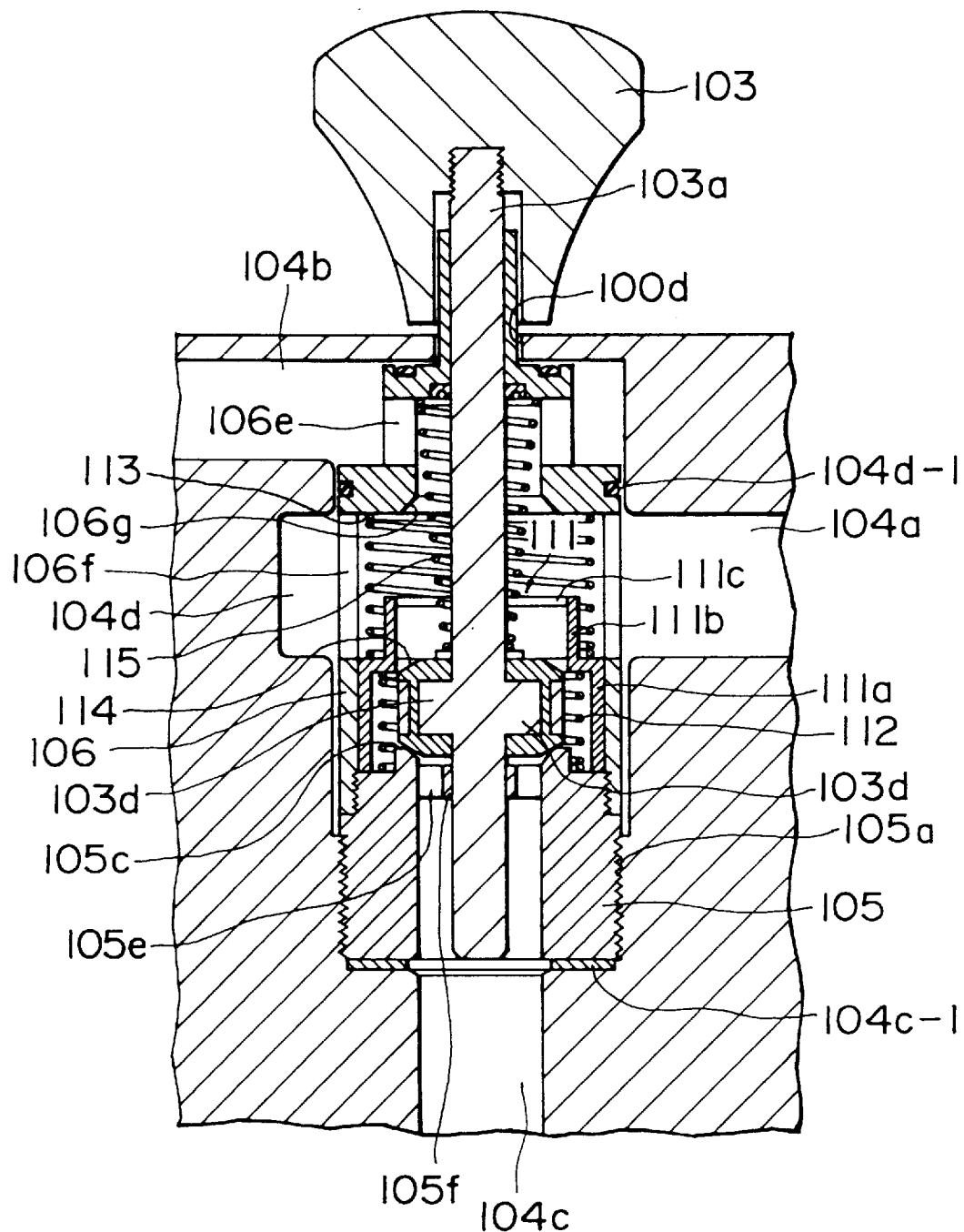
FIG. 31 is a longitudinal sectional view showing an example of the switching valve provided with a pilot valve body.

FIG. 31 is an example of a pilot valve type switching valve which can be preferably used in an equipment having a high supply pressure of the mixed water, in which a switching valve is incorporated in a chamber 104d which communicates with the mixed water flow passage 104a, with the delivery side flow passage 104b and with the shower side flow passage 104c provided in the mixing valve body of the hot and cold water mixing valve, respectively.

Figure 32:
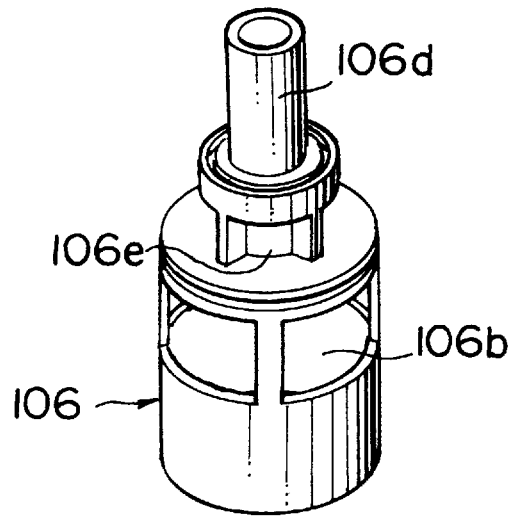
FIG. 32 is a perspective view showing the outline of the upper housing of the switching valve in FIG. 31.

An example shown in FIG. 31 is different from the above-described embodiment in that the lower housing 105 and the upper housing 106 are threadably connected in the coaxial relation, and the hook 106a and the stationary seat 105b are not provided and, as shown in a perspective view of the upper housing 106 of FIG. 32, this example is further different in that the inlet openings 106b communicating with the mixed water flow passage 104a is of a shape which is greater than that of the above-described embodiment and which is made in the peripheral wall. The other housing construction is substantially similar to that of the above-described embodiment, and the same members are indicated by the common reference characters.

Figure 33A:
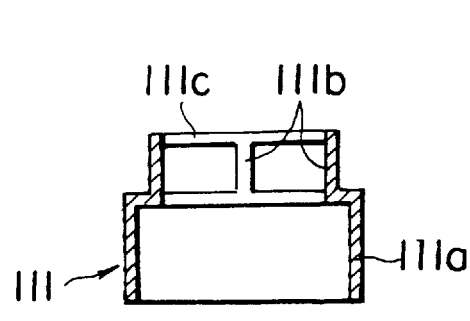
FIG. 33A is a longitudinal sectional view of the pilot valve body.
Figure 33B:
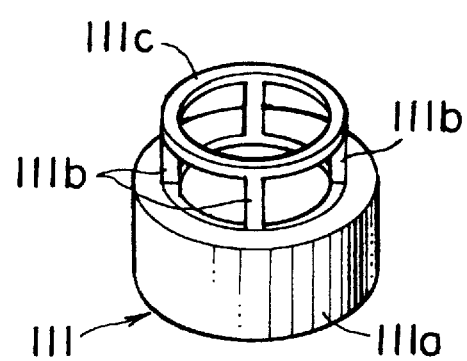
FIG. 33B is a schematic perspective view of the pilot valve body.

A pilot valve body 111 which is movable up and down is incorporated into the upper housing 106 by sliding the pilot valve body 111 along the inner peripheral surface thereof. As shown in FIGS. 33A and 33B, this pilot valve body 111 is composed of a cylindrical valve ring 111a and an annular stopper 111c formed on the forward ends of four spacers 111b provided on the upper end of the valve ring 111a. A temperature-actuated spring 112 is incorporated in the interior of the valve ring 111a between the upper surface of the lower housing 105 and the valve ring 111a, and a compression biasing spring 113 made of a normal wire rod as a raw material is interposed between the upper surface of the valve ring 111a and the lower surface of the upper housing 106.

At the portion offset to the lower end side of the spindle 103a is formed a rib 103d, and a main valve body 114 is attached to the rib 103d in such a way as to cover the upper and lower surfaces thereof. Between the main valve body 114 and the upper housing 106 is interposed a compression auxiliary spring 115, which energizes the main valve body 114 toward the valve seat 105c at the shower side, similar to the embodiment shown in FIG. 30.

In FIG. 31, the main valve body 114 is in a seating engagement with the valve seat 105c at the shower side to thereby open the flow passage 104b toward the delivery pipe 100c. At this time, the main valve body 114 is restrained to the valve closing position by the water pressure of the mixed water and, simultaneously, also the pilot valve body 111 is held in the position shown in the drawing by the water pressure applied to the upper surface of the valve ring 111a. The temperature-actuated spring 115 contracts and both the biasing spring 113 and auxiliary spring 115 expand to thereby energize the main valve body 114 and the pilot valve body 111 toward the valve seat 105c at the shower side, respectively.

If the temperature of the mixed water exists within a range lower than the lower limit of the temperature appropriate to the shower, the load of production of the temperature-actuated spring 112 does not change and, so, the pilot valve body 111 remains stopped in the position shown in the drawing and the discharge of the mixed water from the outlet opening 100c is continued.

Figure 34:
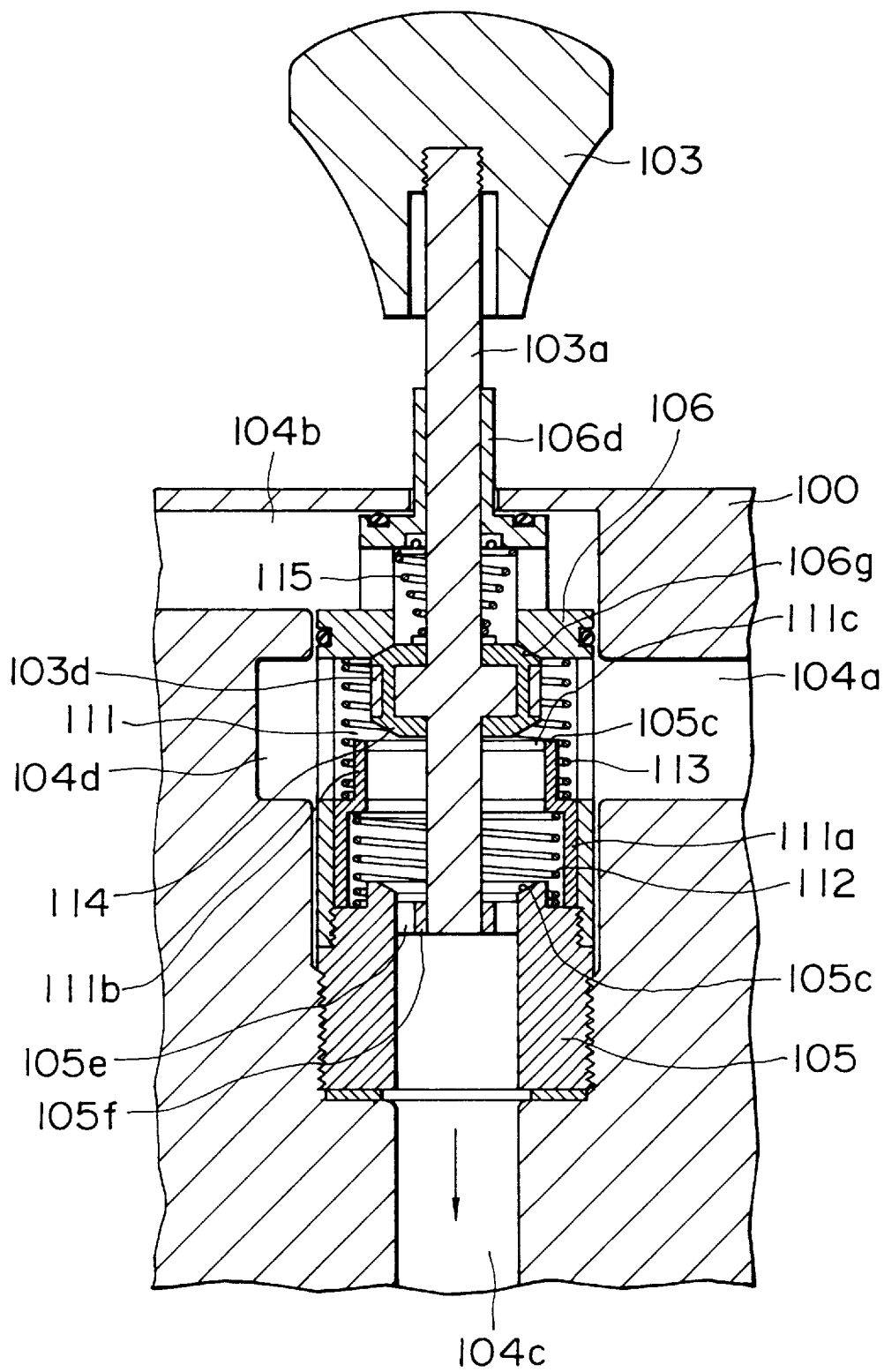
FIG. 34 is a longitudinal sectional view showing a state when the switching valve in FIG. 31 is switched to the shower side.

In the meantime, the operating handle 103 is pulled up, as shown in FIG. 34, to discharge the mixed water from the shower head 102, the main valve body 114 is brought into a seating engagement with the valve seat 106g at the delivery side. Further, if the spring constant of the auxiliary spring 115 is designed to be made smaller than a force of action due to the water pressure of the mixed water, as described in the embodiment shown in FIG. 30, the main valve body 114 can be held in the position shown in FIG. 34 and the supply to the shower head 102 is continued.

Figure 35:
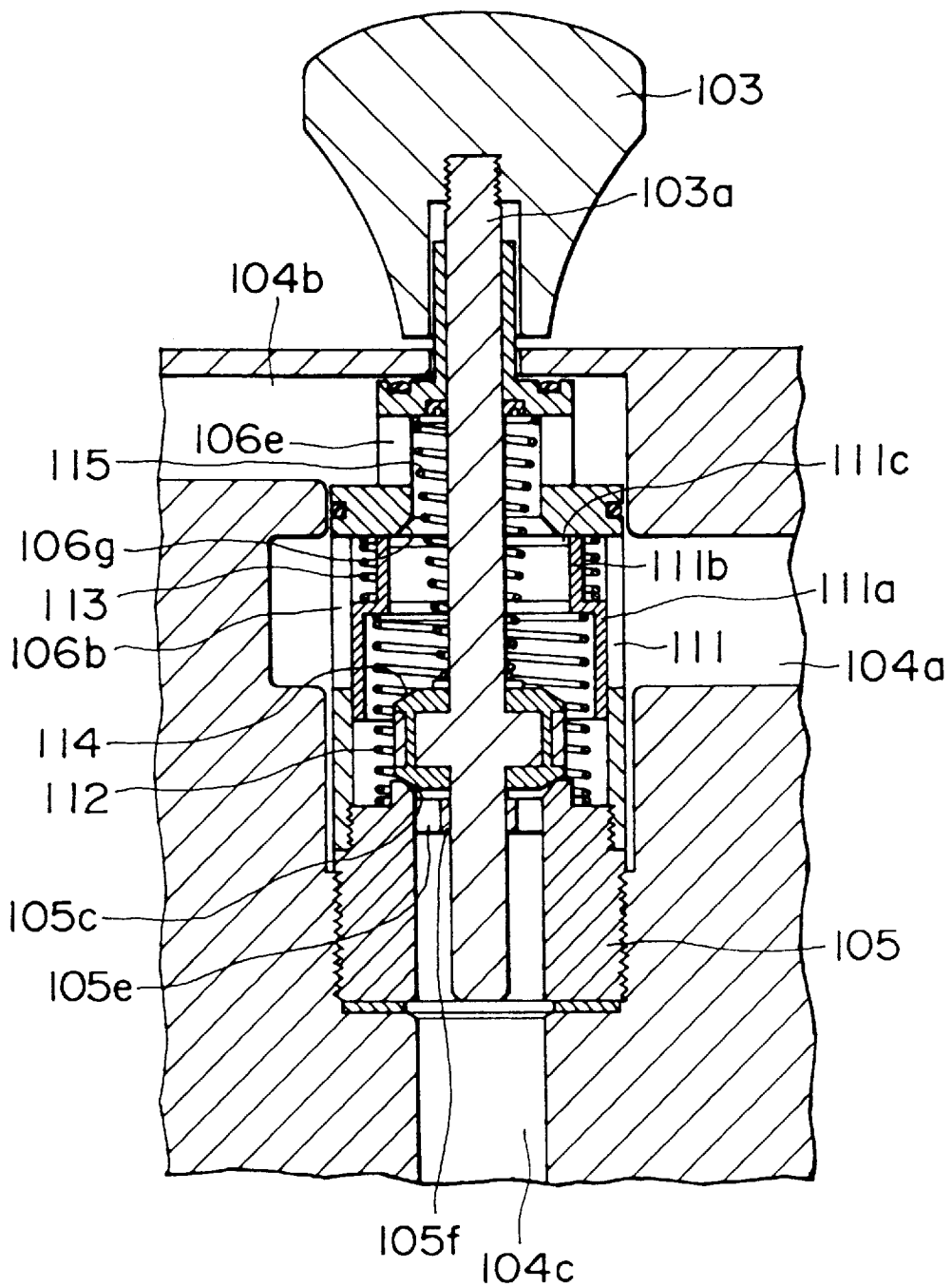
FIG. 35 is a longitudinal sectional view when the pilot valve body has risen by the mixed water at a high temperature at the time of the delivery of the shower.

When the mixed water from the shower head 102 is being discharged, in the case where the temperature of the mixed water rises and exceeds the temperature of the upper limit of the shower, the load of production of the temperature-actuated spring 112 increases gradually and it is restored in shape. This causes an energizing force of the temperature-actuated spring 112 to overcome that of the biasing spring 113, so the pilot valve body 111 rises gradually from the position shown in FIG. 34. This rise of the pilot valve body 111 causes the valve ring 111a to gradually throttle the opening area of the inlet opening 106b of the upper housing 106 until the upper end of the stopper 111c strikes the lower surface of the upper housing 106 and is stopped, as shown in FIG. 35.

Throttling the inlet opening 106b due to the valve ring 111a of the pilot valve body 111 causes the quantity of inflow of the mixed water into the interior of the pilot valve body 111 itself to be reduced. The pilot valve body 111 rises up to the position shown in FIG. 35, so a decrease in the inflow causes the inner pressure to drop and the water pressure around the main valve body 114 to also drop. Accordingly, at the step in which the energizing force of the auxiliary spring 115 has overcome the water pressure which attempts to lift the main valve body 114, the main valve body 114 is pressed toward the valve seat 105c at the shower side, so that as shown in FIG. 35, at the same time as the valve seat 106g at the delivery side is opened, the valve seat 105c at the shower side is closed to thereby switch the flow passage to the side of the delivery pipe 100c.

In the device provided with such pilot valve body 111, when the mixed water reaches a high temperature in the case where the flow passage is connected to the side of the shower head 102, it is only necessary that the temperature-actuated spring 112 expands to cause the pilot valve 111 to rise, thereby causing a drop in pressure around the main valve body 114. For this reason, compared with the device in which the valve body 107 is directly moved by the temperature-actuated spring 109, as in the embodiment shown in FIGS. 24, 29 and 30, the temperature-actuated spring 112 is subjected to heat and expands only a little, thereby allowing preparations for switching the flow passage to be made and making it possible to perform the movement of stopping the discharge from the shower head 102 more quickly.

Moreover, even in the case of the pilot valve body 111, since the main valve body 114 is moved toward the valve seat 105c at the shower side utilizing a drop in the pressure of the mixed water which flows into the interior of the pilot valve body 111, the load applied to the main valve body 114 does not considerably change even in the case where the supply pressure of the mixed water is high. Therefore, the stability can be given to the movement of the main valve body 114 and the spindle 103a to which the main valve body 114 is secured and, for example, the poor seating engagement of the main valve 114 with the valve seat 105c at the shower side at the time of a high temperature is prevented, thereby making it possible to stop the water surely.

In each of the examples, the lift valve type is adopted in which the valve bodies 107 and 114 are moved by the up and down movement of the operating handle 103, however, the rotary-type valves shown in FIG. 36 and below can be modified to the construction in which the switching operation from the shower side to the delivery side can be automatically performed in response to the temperature of the mixed water. This will be described below.

Figure 36:
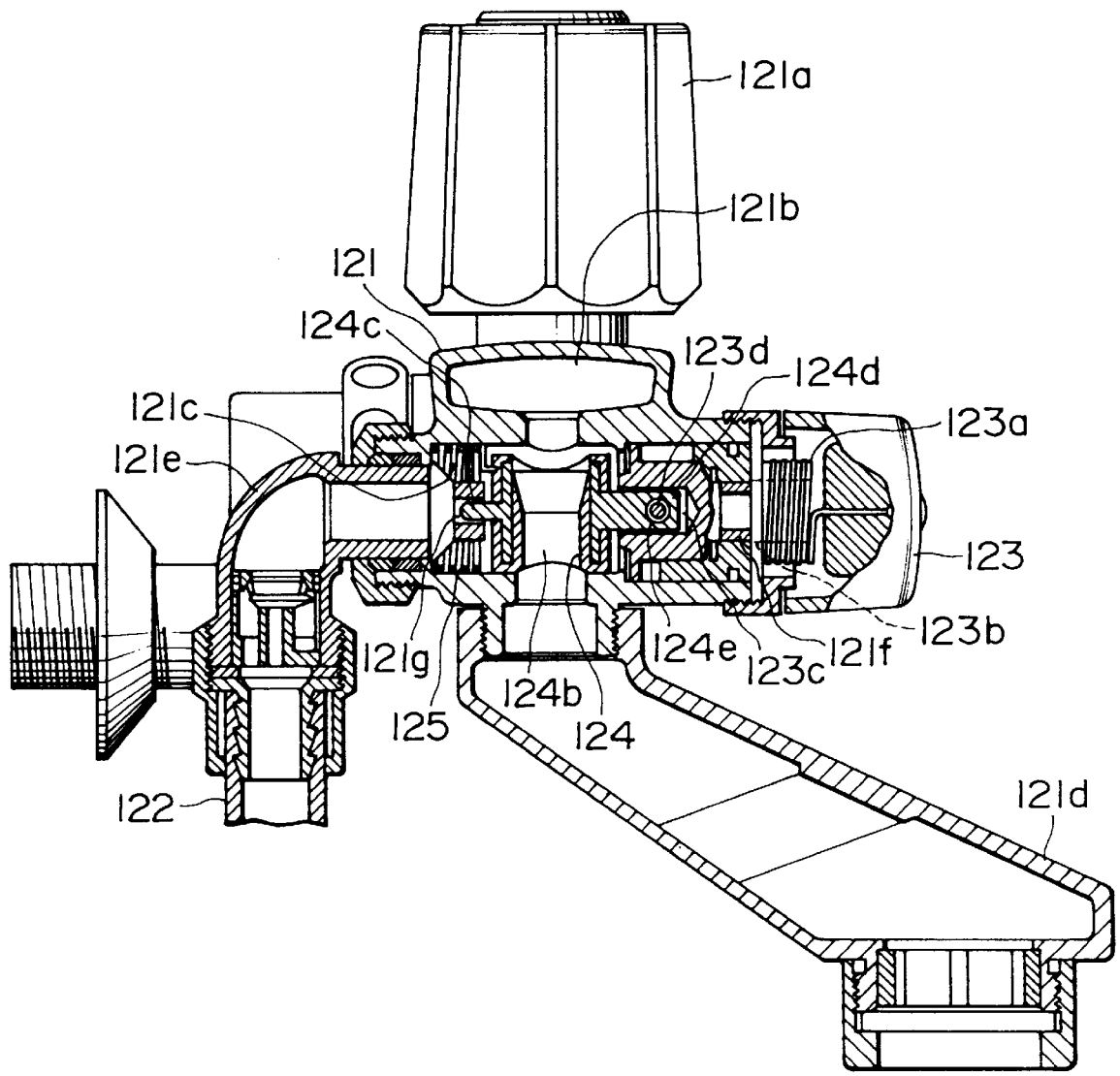
FIG. 36 is a longitudinal sectional view of the left side surface of the hot and cold water mixing valve provided with a switching valve including a temperature-actuated spring which rotates the valve body.
Figure 37:
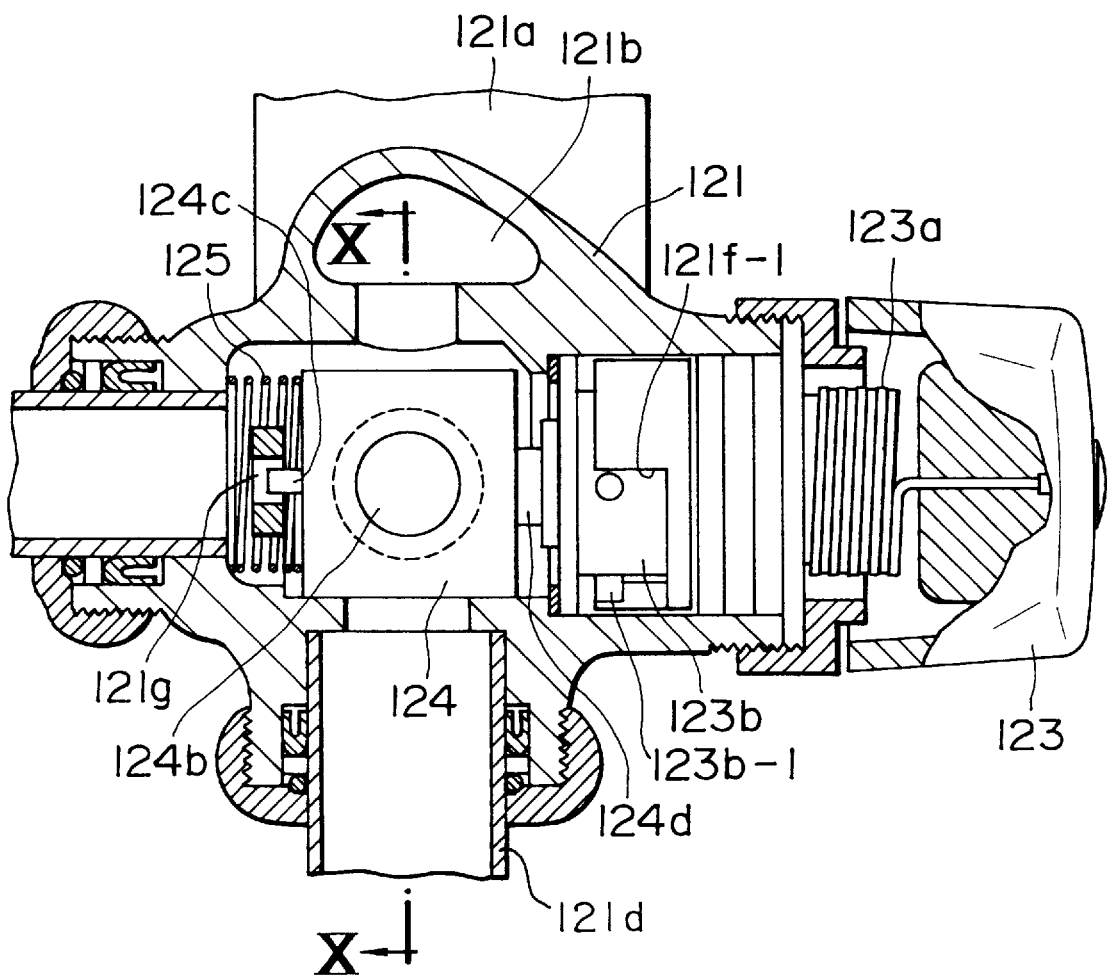
FIG. 37 is a longitudinal sectional view of the left side surface of an essential portion of the hot and cold water mixing valve in FIG. 36 when the switching valve is switched to the shower side.
Figure 38:
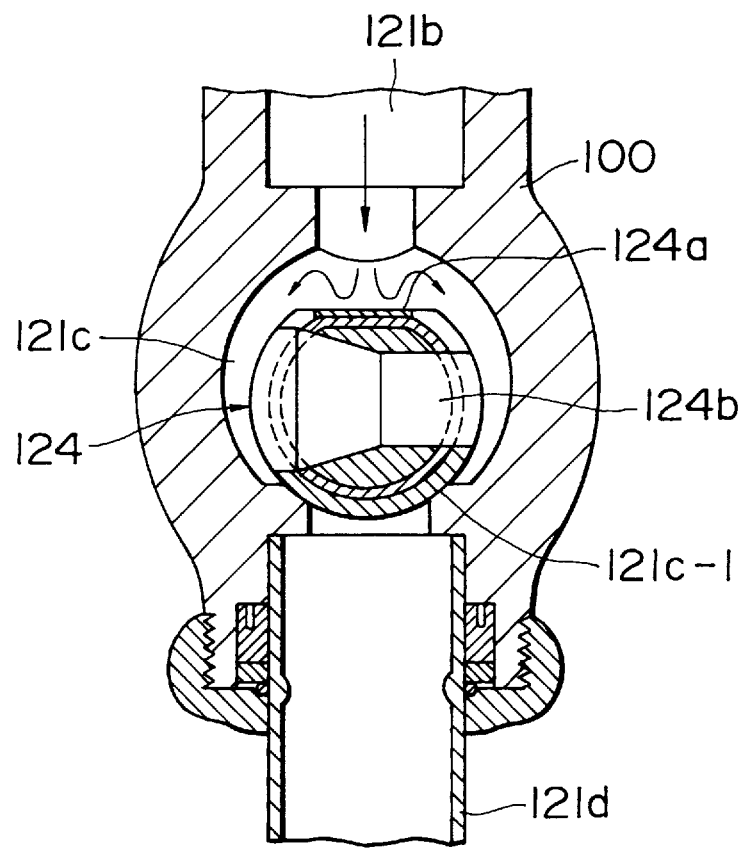
FIG. 38 is a longitudinal sectional view taken along line X—X of FIG. 37.

FIG. 36 is a longitudinal sectional view, at the left side, of the hot and cold water mixing valve and showing a state in which the flow passage has been switched to the delivery pipe side, FIG. 37 is a longitudinal sectional view, at the left side, of an essential portion when the switching operation is made to the shower side and FIG. 38 is a longitudinal sectional view taken along line X—X of FIG. 37.

In the mixing valve body 121 of the hot and cold water mixing valve, the cold water valve and the hot water valve are disposed at the right and left sides as viewed from the front, respectively, similar to the example shown in FIG. 23, and by operating these cold and hot water valves using the cold water handle 121a and the hot water handle (not shown), cold water and hot water are mixed in the mixing chamber 121b formed at the downstream side of the valves. The switching valve chamber 121c is formed at the downstream side of the mixing chamber 121b, and the delivery pipe 121d is connected to the lower end of the switching valve chamber 121c and a joint 121e for connecting a hose 122 of the shower head (not shown) is connected to the back thereof.

The rotary-type operating handle 123 for switching the flow passage, disposed at the front of the mixing valve body 121 is linked between the bush 121f secured to the mixing valve body 121 and the operating handle 121f by way of a torsion spring 123a. The switching valve can be maintained normally with the switching valve being switched to the side of the delivery pipe 121d by the energizing force of the torsion spring 123a, as described later.

As shown in FIG. 36, the spindle 123b is connected to the operating handle 123 and faces with the forward end thereof the switching valve chamber 121c, said spindle 123b being linked to the valve body 124. As shown in FIG. 38, this valve body 124 is in the form of a cylinder having a pressure receiving surface 124a which is formed by making a portion of the peripheral surface as a flat surface, and it is provided with a valve hole 124b having the opening axis intersecting at a right angle to the axial line of the spindle 123b. As shown in FIG. 36, the valve body 124 is provided with a protruding shaft 124c at the left end and with a linking shaft 124d for connecting to the spindle 123b at the right end.

The protruding shaft 124c is loosely inserted into a support hole 121g formed as a portion of the inner wall of the switching valve chamber 121c and is linked in such a way that an annular clearance produces between the outer peripheral surface of the protruding shaft 124c and the inner peripheral surface of the support hole 121g. The spindle 123 is provided at the forward end with a holding hole 123c having an inner diameter greater than the outer diameter of the linking shaft 124d, into which the linking shaft 124d is adapted to be loosely inserted. Further, the support hole 123c is provided with a pin 123d in the direction of intersecting at a right angle with the axis of the spindle 123b, and the pin 123d is inserted into the linking hole 124e provided in the linking shaft 124d, thereby linking the linking shaft 124d to the spindle 123d. The inner diameter of the linking hole 124e is made greater than the outer diameter of the pin 123d to thereby provide a degree of freedom to some degree to the linking shaft 124d with respect to the pin 123d.

The linked relation between the protruding shaft 124c and the support hole 121g and between the linking shaft 124d and the spindle 123b allows the valve body 124 to have the plays in the right and left direction, in the up and down direction as well as in the composed direction of the above-described directions in FIG. 36, with respect to the support hole 121g and the spindle 123b which are fixed in position, whereby it is possible for the valve body 124 to swing freely in a certain range.

Further, a temperature-actuated spring 125 is incorporated into the interior of the switching valve chamber 121c against the inlet portion of the joint 121e. This temperature-actuated spring 125 is a coil spring, similar to the torsion spring 123a and, in FIG. 36, is firmly connected at the left end to the inner wall of the switching valve chamber 121c and at the right end to the valve body 124. The winding direction of the coil of the temperature-actuated spring 125 and the connecting point of the coil to the valve body 124 are set in such a way that the valve body 124 switched to the discharge at the shower side shown in FIG. 38 is caused to be rotated clockwise, at the time of the restoration of shape due to the load of production when the temperature-actuated spring is exposed to a high temperature.

Moreover, when the valve body 124 is rotated from the position shown in FIG. 38 clockwise by 90 degrees up to the position shown in FIG. 36, the spindle 123b is provided with a projection 123b-1 and the bush 121f is provided with a stopper 121f-1 in order to prevent the further rotation of the valve body 124, as shown in FIG. 37.

In the construction described above, for a period of time when water is stopped and when the discharge have finished, the valve body 124 is set to the position shown in FIG. 36 and is switched to the flow passage to the side of the delivery pipe 121d. In this state, when the temperature of the mixed water is low, the load of production is not caused in the temperature-actuated spring 125, so, there is no force of action which rotates the valve body 124 clockwise in FIG. 38, and the valve body 124 is maintained in the position shown in the drawing.

Further, even when the temperature of the mixed water reaches a high temperature and a force of action which rotates the valve body 124 clockwise in FIG. 38 is exerted on the valve body 124 due to the load of production of the temperature-actuated spring 125, the projection 123b-1 of the spindle 123b, with the position of the valve body 124 shown in FIG. 36, engages the stopper 121f-1 of the bush 121f to thereby prevent a further rotation, so that with the valve body 124 being maintained in the state shown in FIG. 36, the mixed water is discharged from the delivery pipe 121d.

When the flow passage is switched to the shower side, the operating handle 123 is rotated so that the valve body 124 rotates counterclockwise in FIG. 38. This causes the valve body 124 to come to the position shown in FIGS. 37 and 38, and the pressure receiving surface 124a comes to face the side of the mixing chamber 121b. Since the valve body 124 is disposed with the play existing in the switching valve chamber 121c, as described before, it is subjected to the water pressure of the mixed water which flows from the mixing chamber 121b to the joint 121c, whereby the outer peripheral surface of the valve body 124 is brought into a seating engagement with the valve seat 121c-1 formed on the inner wall of the switching valve chamber 121c, as shown in FIG. 38. Accordingly, the flow passage toward the side of the delivery pipe 121d is closed to thereby switch the flow passage to the shower side.

If the temperature of the mixed water exceeds the upper temperature limit of the shower when switching to the shower side and being used, the valve body 124 is caused to be rotated clockwise in FIG. 38 by the load of production of the temperature-actuated spring 125. This causes the valve hole 124b to communicate with the delivery pipe 121d and to be aligned directly under the outlet of the mixing chamber 121b, as shown in FIG. 36, so that the mixed water is introduced into the side of the delivery pipe 121d to thereby stop the supply of the mixed water to the shower side.

The direction in which the temperature-actuated spring 125 rotates the valve body 124 is the same as the direction of restoration of the torsion of the torsion spring 123a at the side of the operating handle 123, and the valve body 124 is quickly rotated along with the restoration of the torsion spring 123a.

FIG. 39 shows the construction of a switching valve in which if the mixed water having a high temperature is supplied when the valve is being used at the shower side, the flow passage is switched from the shower side to the side of the delivery pipe 121d by rotating the operating handle 123 utilizing the torsion due to the torsion spring 123a.

Figure 40:
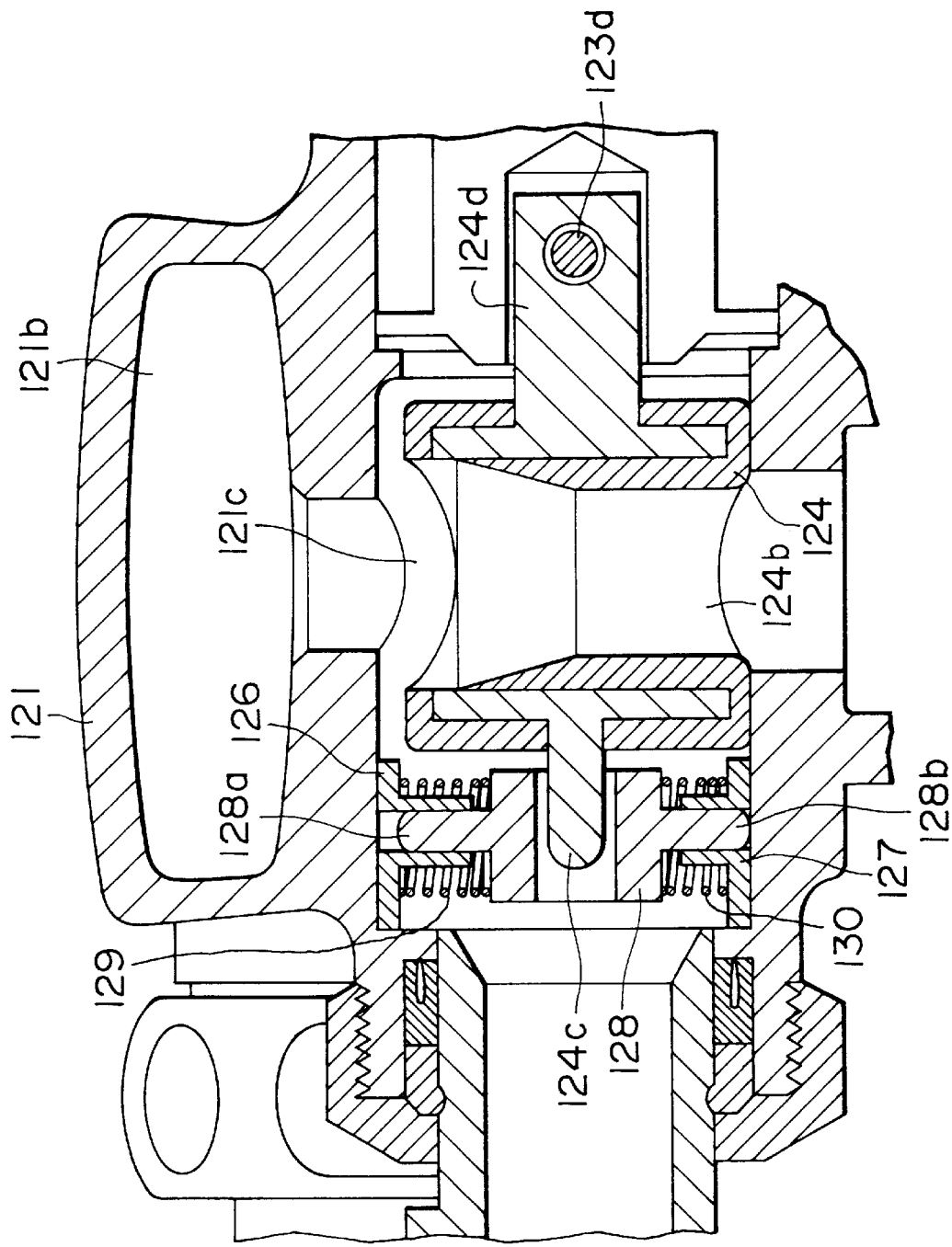
FIG. 40 is a longitudinal sectional view showing an essential portion of the switching mechanism in FIG. 39.

In the position where the joint 121e faces in the interior of the switching valve chamber 12c, a pair of hollow guides 126 and 127 are arranged vertically, as shown in an enlarged view of an essential portion of FIG. 40, and to these guides 126 and 127 are linked a holding block 128 for up and down movement in which the protruding shaft 124c of the valve body 124 is loosely inserted. The holding block 128 is provided at the upper and lower surfaces with pins 128a and 128b which are slidably inserted into the hollow portions of the guides 126 and 127.

Between the guide 126 disposed at the upper side and the holding block 128 is incorporated a coil-like biasing spring 129 made of a steel wire rod, and between the guide 127 disposed at the lower side and the holding block 128 is provided in a similar way a coil-like temperature-actuated spring 130. This temperature-actuated spring 130 has such a property of shift that it contracts below the upper limit of the temperature of the mixed water when the shower is used, as shown in FIG. 40, and when exceeding the upper limit, it is restored in shape and expands due to the load of production.

Also in this example, when the flow passage is switched to the shower side, the valve body 124 is held in the position shown in FIG. 38, and the outer peripheral surface of the valve body 124 is in a seating engagement with the valve seat 121c-1 to close the flow passage at the side of the delivery pipe 121d. When the temperature of the mixed water exceeds the upper limit of temperature as the shower is used, the temperature-actuated spring 130 expands to thereby raise the holding block 128 in FIG. 40. Accordingly, the seating engagement of the outer peripheral surface of the valve body 124 with the valve seat 121c-1 is released and the resistance against the rotation of the valve ring 124 does not act, so the temperature-actuated spring 130 is restored to the side opposite the direction of torsion of the torsion spring 123a which energizes the valve body 124 by way of the spindle 123b, so that the valve body 124 changes from the position shown in FIG. 38 to the position shown in FIG. 40, thus, the valve body 124 returns to the position shown in FIG. 40.

In this way, when the temperature of the mixed water rises for a period when the shower is being used, the switching of the flow passage from the shower side to the side of the delivery pipe 121c is automatically performed by setting the valve body 124 to a position easy to be rotated by the temperature-actuated spring 130 and utilizing the restoration by the torsion spring 123a.

FIG. 41 is an enlarged longitudinal sectional view of an essential portion showing a further embodiment of the switching valve according to the present invention, which also is of such construction that as the flow passage is switched from the shower side to the side of the delivery pipe 100c, the resistance against the rotation of the valve body 124 is released by the temperature-actuated spring.

A shifter 131 which is movable to the right and left direction in the drawing is incorporated into the outlet portion from the switching valve chamber 121c to the joint 121e, and the protruding shaft 124c of the valve body 124 has a tapered portion 124c-1 at the forward end portion facing the shifter 131. The shifter 131 is provided at one end with a sleeve 131a which is greater than the outer diameter of the forward end of the tapered portion 124c-1 of the protruding shaft 124 and which is smaller than the outer diameter at the base end side of the tapered portion 124c-1, and the sleeve 131a has a great diameter portion at the downstream side, on the outer periphery of which a flange 131b is formed. The sleeve 131a is provided in the peripheral wall with flow path holes 131c which forms the flow passage toward the shower side. The flange 131b is sandwiched by a biasing spring 132 made of a steel wire rod and a temperature-actuated spring 133, which is restored in shape and expands by the mixed water having a high temperature.

Other construction is the same as that of the embodiments shown in FIGS. 36 to 40, and during normal operation and when finishing the use of shower, the valve body 124 is maintained in the position in which the flow passage is switched to the side of the delivery pipe 121d, as shown in FIG. 41. When the flow passage is switched to the shower side, the valve body 124 is caused to be rotated from the state shown in FIG. 41 by 90 degrees to thereby close the flow passage at the side of the delivery pipe 121d, as shown in FIGS. 37 and 38.

When the temperature of the mixed water exceeds the upper limit with the flow passage being switched to the shower side, the temperature-actuated spring 133 is restored in shape and expands, thereby causing the shifter 131 to be moved to the right in FIG. 41. This movement causes the tapered portion 124c-1 of the protruding shaft 124c to enter into the sleeve 131a, and the protruding shaft 124c comes to be fitted into the sleeve 131a due to the above-described relation between the shape of the tapered portion 124c-1 and the inner diameter of the sleeve 131a.

Hereupon, the axis of the protruding shaft 124, when the valve body 124 is in the position in which it is switched to the shower side, is adapted to come to the positional relation in which it is a little lower than the axis of the sleeve 131a, with the peripheral outer surface of the valve body 124 coming into a seating engagement with the valve seat 121c-1 to thereby close the flow passage toward the side of the delivery pipe 121d, as shown in FIG. 38. Also, since the position in the height of the sleeve 131a is fixed, as the shifter 131 shifts to the right in FIG. 41 and the tapered portion 124c-1 fits gradually into the sleeve 131a, the inclination of the tapered portion 124c-1 causes the valve body to be moved upwardly, thereby causing the peripheral surface thereof to disengage the valve seat 121c-1, whereby a resistance against the rotation of the valve body 124 does not act, similar to the examples shown in FIGS. 39 and 40. For this reason, the valve body 124 is caused to be rotated up to the position shown in FIG. 41 by a force of restoration of the torsion spring 123a, so that the flow passage is switched from the shower side to the side of the delivery pipe 121d.

Figure 42:
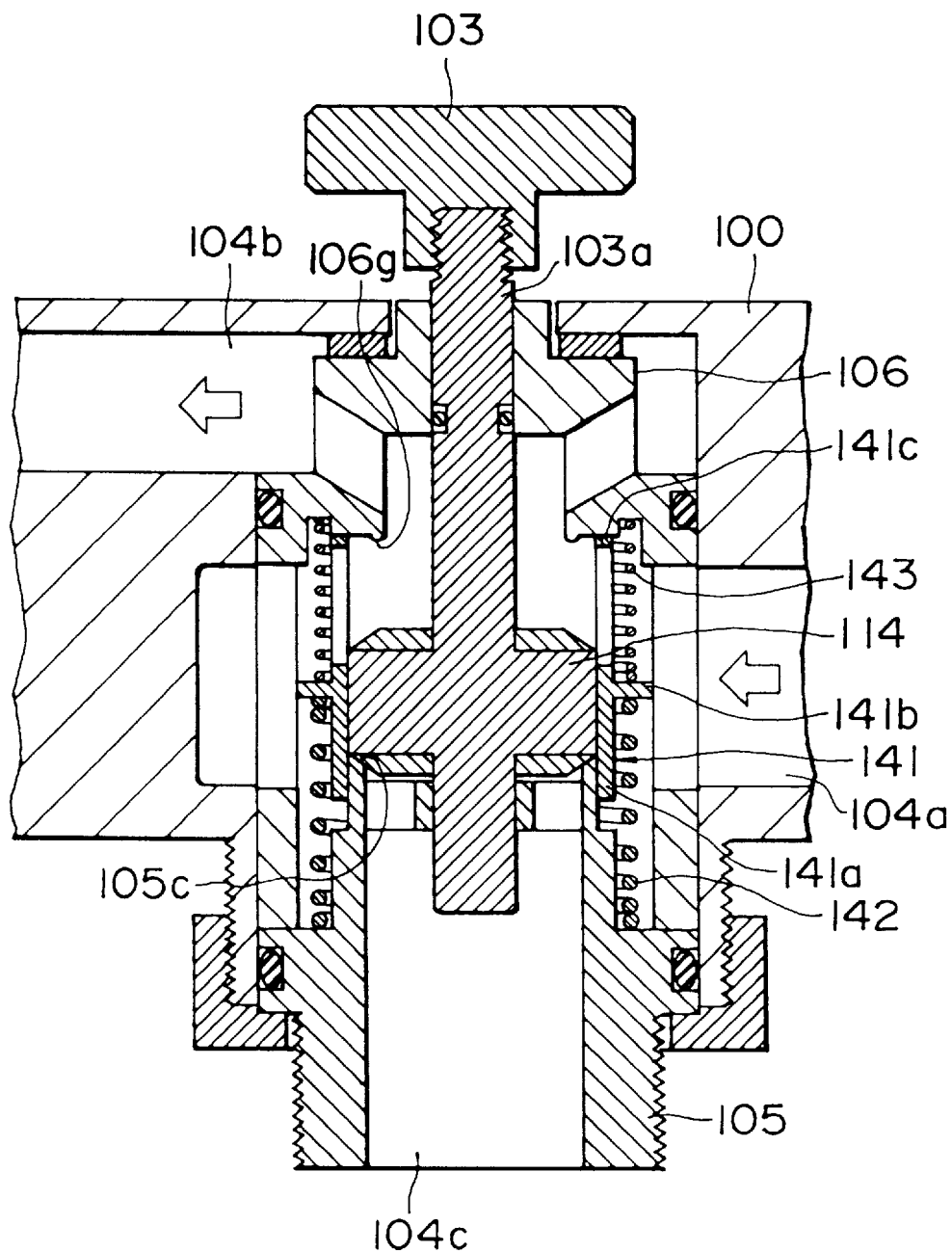
FIG. 42 is a longitudinal sectional view showing an example of a spool valve body being incorporated as a pilot valve, with the flow passage toward the delivery pipe side being opened.
Figure 43:
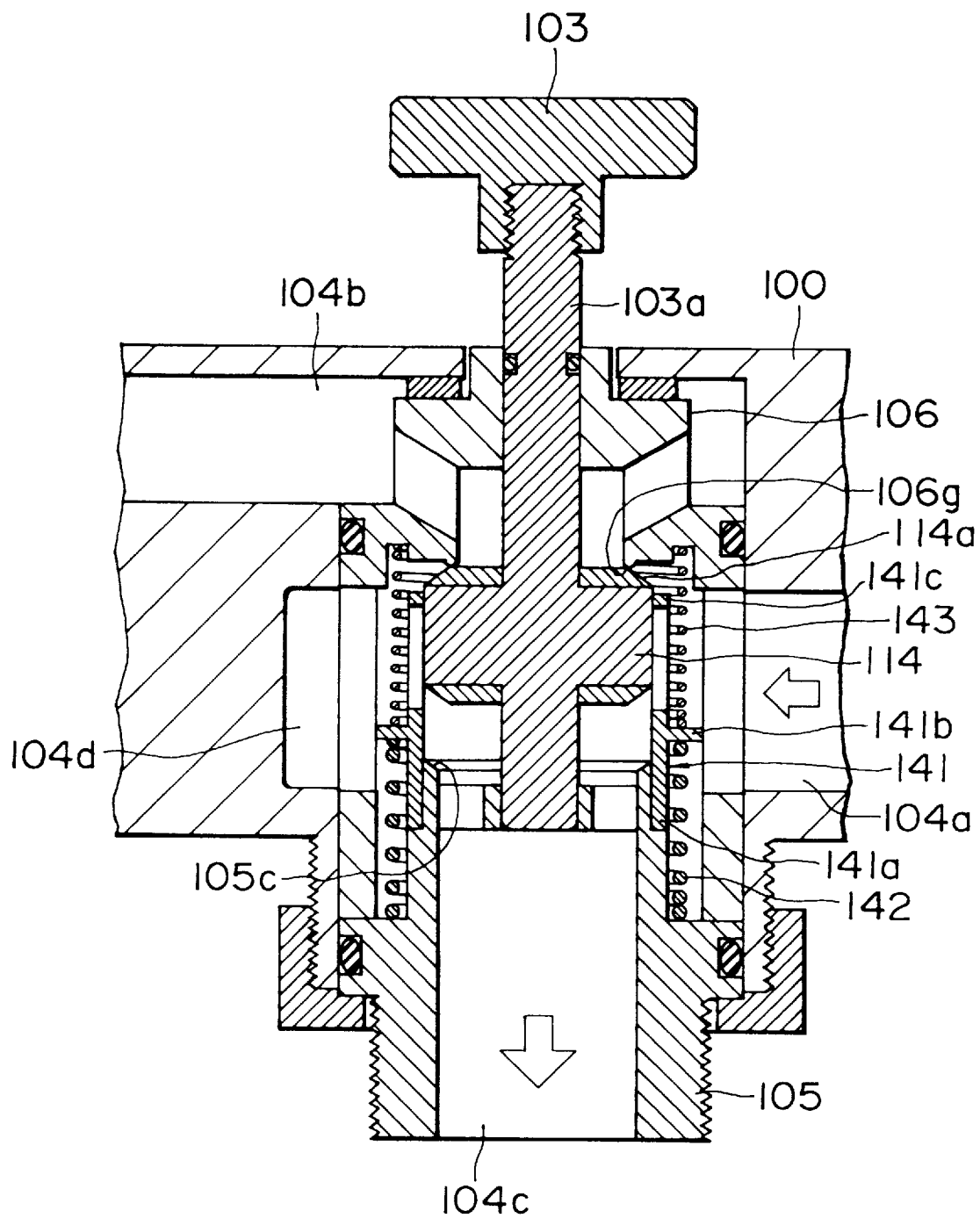
FIG. 43 is a longitudinal sectional view showing a state when the flow passage is switched to the shower side in the example of FIG. 42.
Figure 44:
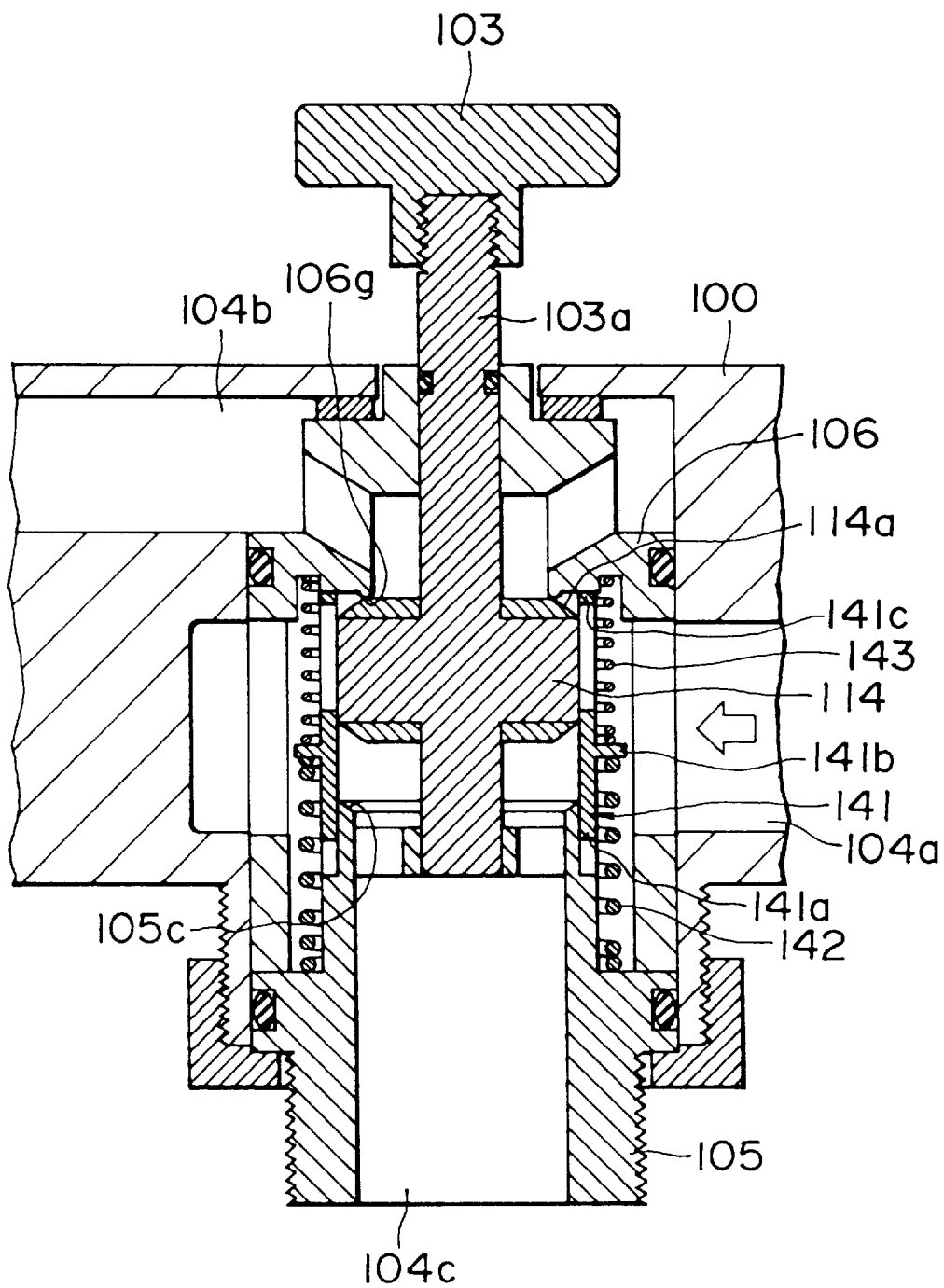
FIG. 44 is a longitudinal sectional view showing the movement of the spool valve body in the case where the mixed water has reached a high temperature when the shower is being used in the example of FIG. 42.

FIGS. 42 to 44 are longitudinal sectional views of an essential portion showing a further embodiment provided with a spool valve type-pilot valve body.

This example is of a type similar to the pilot valve body described already in FIGS. 31 to 35, and the parts having the same functions are indicated by the reference characters common to those in the above-described embodiment and the detailed explanation is omitted.

Similar to the above-described embodiment, a cylindrical hollow pilot valve body 141 is incorporated between the upper and lower housings 105 and 106. The pilot valve body 141 is formed with a valve ring 141a similar to the pilot valve body 111 shown in FIG. 33, which is provided on the outer peripheral surface thereof with a flange 141b. The upper portion of the flange 141b is designed as a portion in which the flow passages can be formed, and the pilot valve body 141 has with an annular stopper 141c at the top end.

The construction of the flow passage regarding this pilot valve body 141 is similar to the above-described embodiment, in which the pilot valve body 141 is accommodated in a chamber 104d which branches to the delivery side flow passage 104b and the shower side flow passage 104c from the mixed water flow passage 104a, and the pilot valve body 141 is fitted onto the main valve body 114 provided at the lower end side of the spindle 103a of the operating handle 103. Between the lower surface of the flange 141b and the lower housing 105 is incorporated a temperature-actuated spring 142, and between the upper surface of the flange 141b and the upper housing 106 is disposed a biasing spring 143.

Also in the example in which such pilot valve body 141 is provided, the discharging and switching operation is similar to that in the above-described embodiment and, as shown in FIG. 43, when the operating handle 103 is pulled up and switched to the shower side, the surface of the main valve body 114 to which the water pressure is applied is greater in the lower surface than in the upper surface, so, the upper end of the main valve body 114 is pressed against the valve seat 106g at the delivery side and the discharge from the shower side is maintained.

When the mixed water reaches a high temperature in this state, the temperature-actuated spring 142 expands and the pilot valve body 141 covers the lower end side of the main valve body 114 so that the water pressure is not applied, as shown in FIG. 44. The water pressure of the mixed water is applied only to the pressure receiving surface 114a in the form of conical surface extending toward the mixed water flow passage side from the valve seat 106g at the delivery side of the main valve body 114, and presses down the main valve body 114. After such press-down, when the main valve body 114 is moved away from the valve seat 106g at the delivery side, the water pressure is applied to the whole upper surface of the main valve body 114, so that the main valve body 14 is pressed against the valve seat 105c at the shower side to thereby stop the discharge from the shower side and to switch the shower to the discharge from the spout side, as shown in FIG. 42.

In this way, in the embodiment shown in FIGS. 42 to 44, an auxiliary spring or the like for energizing the main valve body 114 toward the valve seat 105c at the shower side is not provided, however, utilizing a difference in the pressure on the upper and lower surfaces of the main valve body 114 due to the movement of the pilot valve body 141 when the temperature of the mixed water has reached a high temperature at the time of use of the shower allows the shower side flow passage to be closed quickly.

FIGS. 45 to 48 are sectional views showing a further embodiment of the switching valve according to the present invention.

The flow passage switching valve 150 according to the present embodiment is incorporated in the middle of the mixed water delivery pipe 100c of the mixing valve body 100 of the hot and cold water mixing valve and is linked to the operating handle 103 for performing the switching operation.

The switching valve 150 is provided with an upper housing 151 and a lower housing 152 which are inserted into the mixing valve body 100, said both housings 151 and 152 being joined to form the housing of the switching valve 150, and said joined portion is provided on the peripheral wall with an inlet opening 152a communicating with the mixed water flow passage 104a. Further, on the peripheral wall of the upper housing 151 is provided a delivery side flow passage 151a communicating with the delivery pipe 100c, and on the bottom 152b of the lower housing 152 is provided an outlet opening 152c communicating with a shower hose (not shown).

A valve seat 151b is formed at the position somewhat lower than the delivery side flow passage 151a of the upper housing 151. An inner tube 153 in the form of hollow cylinder communicating therein with the outlet opening 152c is disposed in the lower housing 152 so as to extend from the bottom 152b inwardly from the axial direction, and a main valve seat 153a is formed on the upper end of the inner tube 153.

Figure 46:
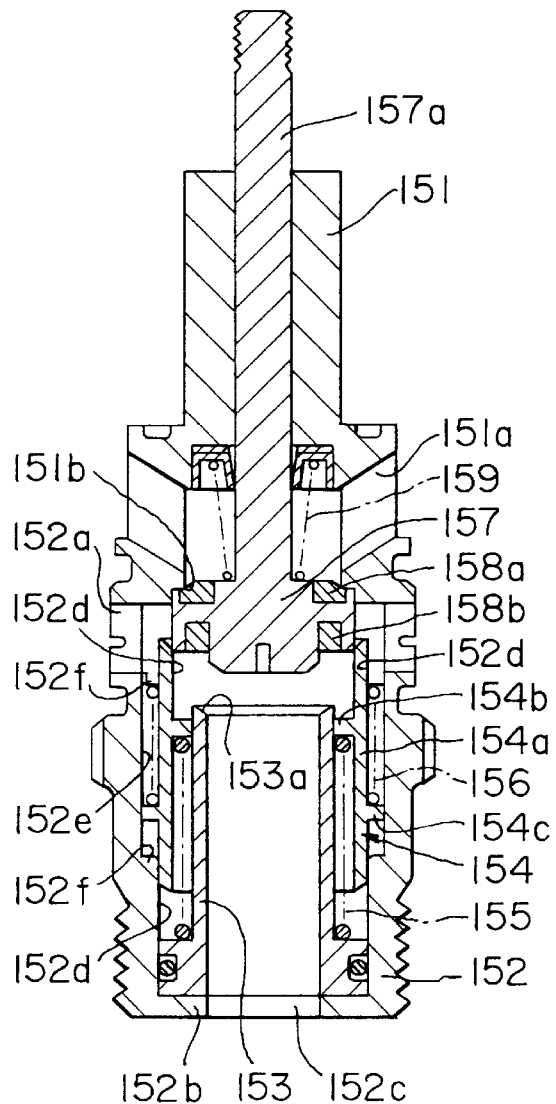
FIG. 46 is a longitudinal sectional view of an essential portion of the switching valve shown in FIG. 45.

The lower housing 152 is formed therein with two types of cylindrical inner walls 152d and 152e having different inner diameters which are greater than the outer diameter of the inner tube 153 (refer to FIG. 46). Namely, the cylindrical inner walls 152d having the same diameters are formed at a predetermined distance in one position near the bottom 152c and in the other position away from the bottom 152c, and these cylindrical inner walls 152d are smaller in the inner diameter than one cylindrical inner wall 152e formed between these cylindrical inner walls 152d, a stepped portion 152f being formed at the connecting portion between both cylindrical inner walls 152d and 152e.

Between the inner tube 153 and the cylindrical inner walls 152d and 152e is inserted a pilot valve body 154 for sliding movement in the axial direction. The pilot valve body 154 comprises a hollow cylindrical valve ring 154a, an inner flange 154b provided on the valve ring 154a so as to protrude inwardly therefrom and an outer flange 154c provided so as to extend outwardly. The outer periphery of the valve ring 154a is slidably moved along the two upper and lower cylindrical inner walls 152d, and the inner flange 154b is adapted to be slidably moved along the outer wall of the inner tube 153 and the outer flange 154c is adapted to be slidably moved along the cylindrical inner wall 152e, respectively.

A temperature-actuated spring 155 is disposed between the pilot valve body 154 and the inner tube 153, with the upper and lower ends being in an abutting engagement with the inner flange 154b and the bottom 152c, respectively.

A biasing spring 156 for energizing the pilot valve body 154 in the direction opposite the temperature-actuated spring 155 is disposed between the pilot valve body 154 and the cylindrical inner wall 152a.

A spindle 157a connected to the operating handle 103 is inserted into the upper housing 151, and the main valve body 157 is integrally formed with the lower end portion of the spindle 157a.

The outer diameter of the main valve body 157 is a little smaller than the inner diameter of the valve ring 154a of the pilot valve body 154. Seal members 158a and 158b are mounted on the upper and lower ends of the main valve body 157, respectively.

Moreover, a main valve body spring 159 which is connected at one end to the upper housing 151 for energizing the main valve body 157 downward is connected to the upper end portion of the main valve body 157.

Next, the function of the present embodiment composed of the construction described above will be described.

Figure 45:
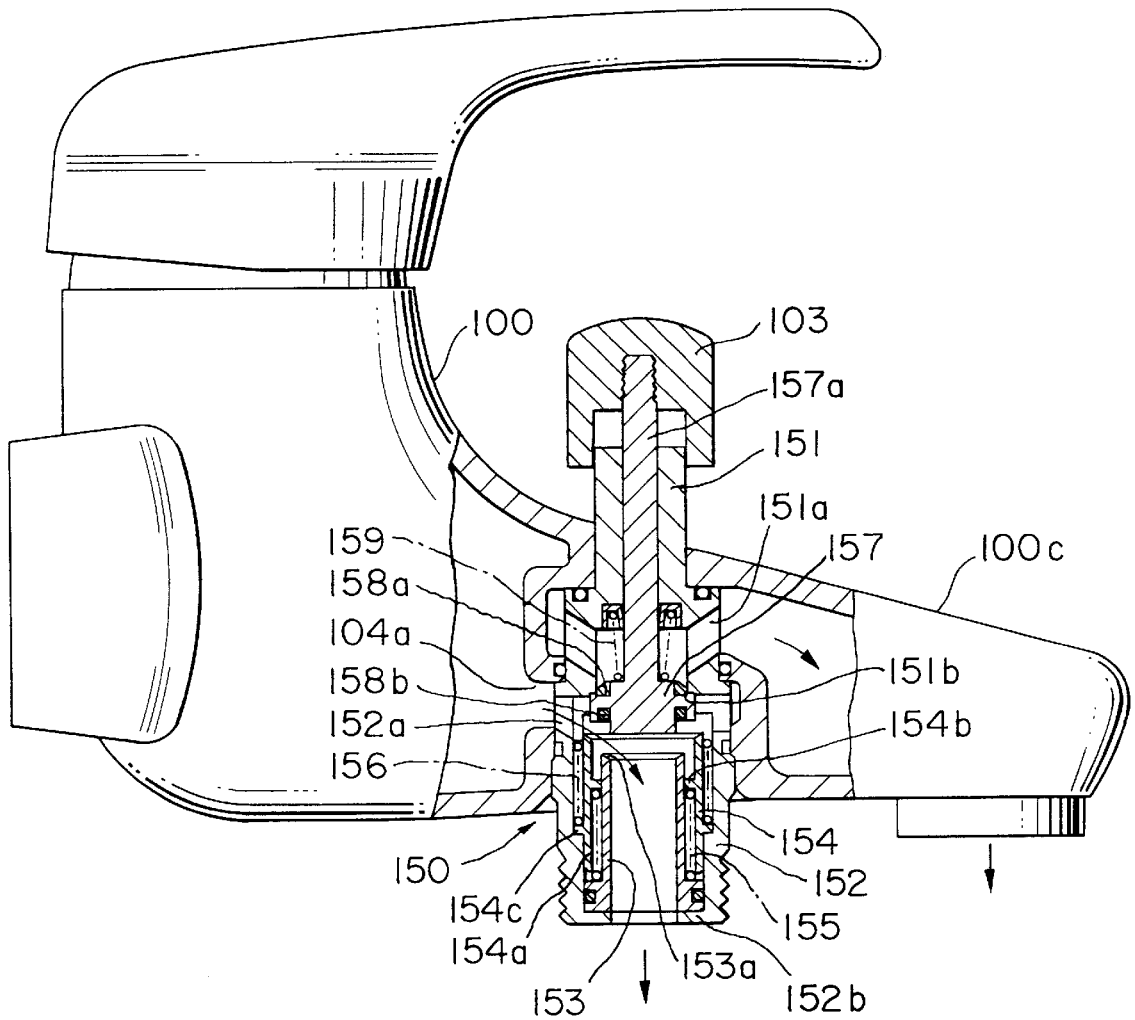
FIG. 45 is a longitudinal sectional view showing an example in which the cylindrical valve seat is provided in the flow passage at the shower side and, simultaneously, the pilot valve body is provided round the valve seat.

When the operating handle 103 is pulled up during the discharge of the mixed water from the delivery pipe 100c, the main valve body 157 is pulled up along with the spindle 157a and the seal member 158a at the upper end of the main valve body 157 is brought into an abutting engagement with the valve seat 151b of the upper housing 151, as shown in FIG. 45. In this state, since the water pressure above the main valve body 157 comes to zero and the water pressure of the mixed water acts on the lower side, the main valve body 157 overcomes the energizing force of the main valve body spring 159 and is maintained with the main valve body 159 being pulled up. This causes the mixed water to flow from the inlet opening 152a into the lower housing 152 and, after passing through the inner tube 153, the mixed water flows from the outlet opening 152c toward the shower hose.

In this case, if the temperature of the mixed water is within the allowable temperature range of use, the temperature-actuated spring 155 is of a contracted shape, as shown in FIG. 45, and the pilot valve body 154 is energized by the biasing spring 156 and is lowered to the lower position of the lower housing 152.

Figure 47:
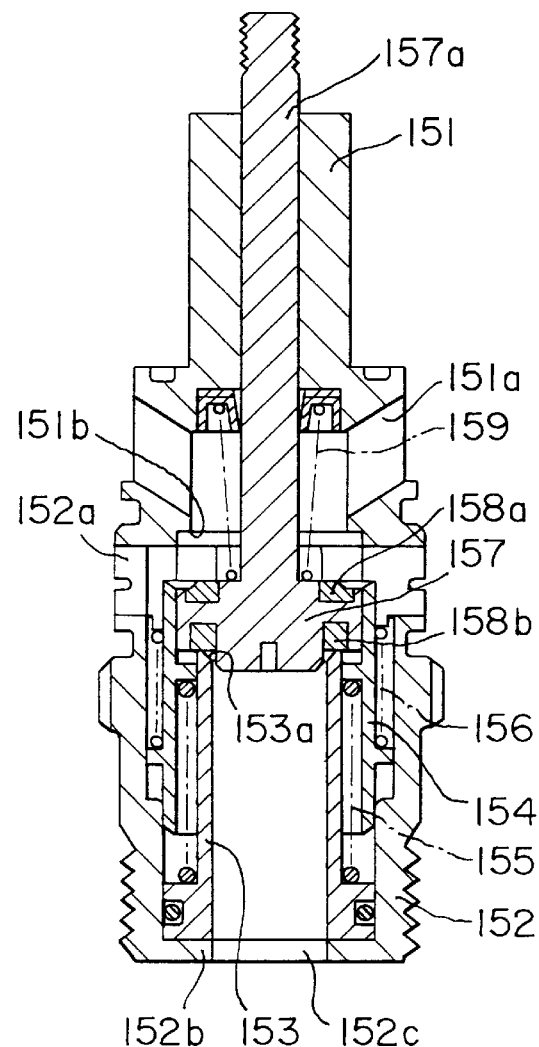
FIG. 47 is a longitudinal sectional view of an essential portion of the switching valve shown in FIG. 45.

When the temperature of the mixed water approaches the allowable limit value during the use of the shower, the temperature-actuated spring 155 deforms in the direction of expansion, and the pilot valve body 154 rises along the cylindrical inner wall 152d, as shown in FIG. 46. When the upper end of the valve ring 154a of the pilot valve body 154 rises up to the position where it comes into sliding contact with the outer periphery of the main valve body 157, the flow at the lower side of the main valve body 157 is shut off and the water pressure quickly drops. This causes the main valve body 157 to quickly drop by the energizing force of the upper main valve spring 159 and, as shown in FIG. 47, the seal member 158b at the lower end of the main valve body 157 is brought into seating engagement with the main valve seat 153a.

The downward movement of the main valve body 157 causes the flow passage communicating with the shower hose to be shut off, and the flow passage is switched from the shower side to the delivery pipe side.

Subsequently, when the hot and cold water mixing valve is operated to thereby lower the temperature of the mixed water, the temperature-actuated spring 155 deforms in the direction of contraction and the pilot valve body 154 drops to the lower position of the lower housing 152, as shown in FIG. 48. In this state, when the operating handle 103 is operated to pull up the spindle 157a, the state comes to that shown in FIG. 45 again and the flow passage is switched to the shower side.

Since, according to the present embodiment, the inner and outer flanges are provided inside and outside the pilot valve body to hold the temperature-actuated spring 155 and the biasing spring 156 by these flanges, while performing a guide function when the pilot valve body is slidably moved, the outer diameter of the pilot valve body 154 is made small, thereby enabling the switching valve to be made small in shape, compared with the above-described embodiment.

Figure 49:
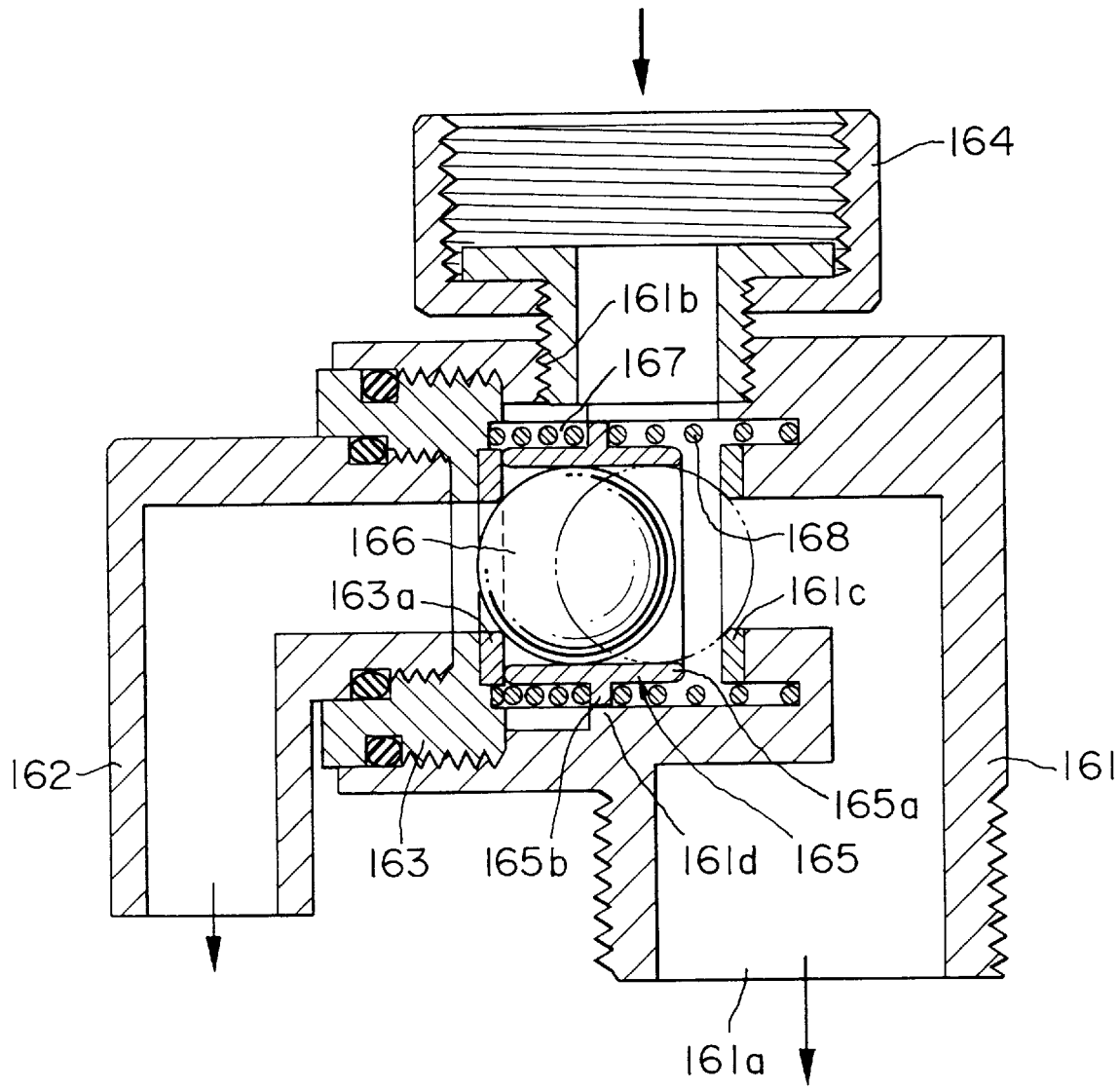
FIG. 49 is a longitudinal sectional view showing a further embodiment of the flow passage switching valve.
Figure 50:
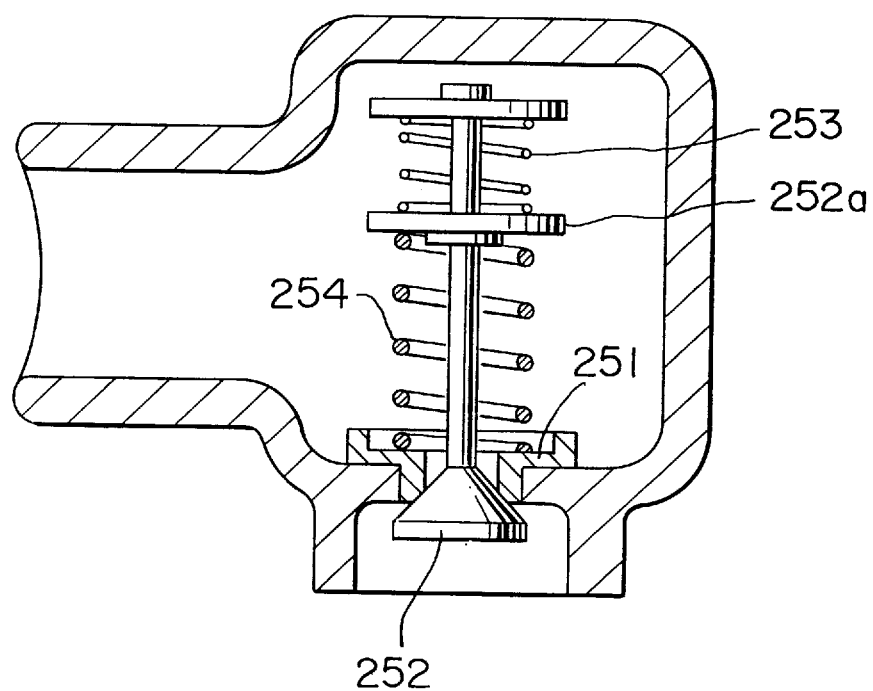
FIG. 50 is a sectional view showing an example of the conventional temperature-actuated valve.

FIG. 49 is a sectional view showing a further embodiment of the flow passage switching valve according to the present invention.

The present embodiment is designed so that a high temperature water discharge pipe 162 is connected to the shower elbow 161 connected to the mixed water discharge opening of the hot and cold water mixing valve (not shown), and the temperature-actuated valve device disposed within the shower elbow 161 allows the flow passage to be switched from the shower hose side to the side of the high temperature discharge pipe 162 and vice versa.

The shower elbow 161 is a hollow body with both ends being opened, at one end of which an outlet opening 161a connected to the shower hose is made. Further, a high temperature water discharge pipe 162 is connected to the opening at the other end by way of an annular spacer 163. Moreover, a mixed water supply pipe 164 connected to the mixed water discharge pipe of the hot and cold water mixing valve is connected to a flow opening 161b which is made into the side wall of the shower elbow 161, from the direction intersecting perpendicular to the axis which connects the shower elbow 161 and the high temperature discharge pipe 162.

A valve seat 161c in the form of a circular ring is provided within the shower elbow 161 facing the high temperature water discharge pipe 162. Further, similarly a valve seat 163a in the form of a circular ring is provided also on the surface of the annular spacer 163 directed to the shower elbow 161, with these valve seats 161c and 163a being arranged in a coaxially opposed relation.

Between both valve seats 161c and 163a is disposed a pilot valve body 165 slidably in the axial direction. This pilot valve body 165 comprises a hollow cylindrical valve ring 165a and an annular flange 165b provided on the outer periphery of the valve ring 165a so as to extend outwardly. The outer diameter of the annular flange 165b is somewhat smaller than the inner diameter of the cylinder portion 161d formed at the upstream side of the valve seat 161c of the shower elbow 161, so that the pilot valve body 165 can be slidably moved along the cylinder portion 161d.

A spherical main valve body 166 is disposed movably in the axial direction in the interior of the pilot valve body 165. This main valve body 166 is of a shape and dimension which allows the valve seats 161c and 163a in the form of a circular ring to be closed when the main valve body 166 is brought into an abutting engagement with these valve seats in the form of a circular ring.

Between the annular flange 165b of the pilot valve body 165 and the annular spacer 163 is disposed a temperature-actuated spring 167, and between the annular flange 165b and the opposed surface of the shower elbow 161 is disposed a biasing spring 168 for balancing the temperature-actuated spring 167 in the energizing force.

According to the present embodiment of the above-described construction, in the case where the mixed water having a temperature within the allowable temperature range of use of the shower is supplied from the mixed water supply pipe 164 into the shower elbow 161, the temperature-actuated spring 167 is of a contracted shape and, as shown by the full line in FIG. 49, the pilot valve body 165 is caused to be moved to the position where it is brought into an abutting engagement with the annular valve seat 163a of the annular spacer 163, by the energizing force of the biasing spring 168.

This makes the water pressure at the side of the annular spacer 163 of the main valve body 166 lower, and the water pressure of the mixed water passing through the side of the annular valve seat 161c of the shower elbow 161 causes the main valve body 166 to be moved toward the side of the annular spacer 163. The main valve body 166 is moved away from the valve seat 161c of the shower elbow 161, whereby the mixed water passes through the opening of the valve seat 161c and flows out from the outlet opening 161a toward the shower hose.

In the case where the temperature of the mixed water has risen up to a value near the allowable temperature limit value, the temperature-actuated valve 167 deforms in the direction of expansion, thereby causing the pilot valve body 165 to be moved toward the valve seat of the shower elbow 161.

When the pilot valve body 165 is moved up to the position in which it abuts the valve seat 161c of the shower elbow 161, the water pressure at the side of the shower elbow 161 of the main valve body 166 drops due to the decrease in the inflow of the mixed water and the water pressure at the side of the annular spacer 163 increases due to the inflow of the mixed water. This causes the main valve body 166 to be moved from the side of the annular spacer 163 to the valve seat 161c at the side of the shower elbow 161 and to be brought into an abutting engagement with the valve seat 161c, so that the flow passage toward the outlet opening 161a is shut off.

Accordingly, thereafter, the mixed water at a high temperature passes through the opening of the valve seat 163a of the opened annular spacer 163 and is discharged from the high temperature water discharge pipe 162.

When the temperature of the mixed water is caused to drop by operating the hot and cold water mixing valve, the temperature-actuated spring 167 contracts in shape again and the pilot valve body 165 is caused to be moved to the side of the annular spacer 163. This makes the pressure at the side of the annular spacer 163 of the main valve body 166 lower and makes the pressure at the side of the shower elbow 161 higher, so that the main valve body 166 is moved to the side of the annular spacer 163 to thereby open the valve seat 161*c* at the side of the shower elbow 161, whereby the mixed water flows out to the shower hose again.

In this way, the present embodiment enables the main valve body to be moved depending on the temperature of the supplied mixed water, thereby allowing the flow passage to be switched.

The present embodiment can be applied not only to a device for preventing hot water having a high temperature from being discharged from the shower head, but also, for example, to a valve for preventing hot water from flowing into the cartridge of a water cleaning equipment or to a device for preventing cold water from being discharged from the shower head.

Industrial Applicability

In the hot and cold water mixing valve to which a shower hose is connected, the present invention can be incorporated into the connecting portion of the shower hose, for example, the elbow for connection. This prevents the mixed water having an extremely high temperature from being sprayed from the shower head in the case where the mixed water at an extremely high temperature flows out due to a sudden change in the cold water supply pressure and the hot water supply pressure.

Further, incorporating the present invention into the hot and cold water mixing valve with a mechanism for switching the flow passage to the delivery pipe side or to the shower side, allows the flow passage to be switched to the delivery pipe side when the mixed water at a high temperature produces during the use of the shower, thereby preventing the hot water at a high temperature from being sprayed from the shower head.

Moreover, in the case where the present invention is incorporated into the hot and cold water mixing valve for use in a kitchen and a wash toilet stand, it can be used as a scald preventing mechanism which functions to shut off a sudden discharge of hot water having a high temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A temperature-actuated valve device comprising:

a body of the device provided with a fluid inlet opening and a fluid outlet opening;

a valve seat formed on a peripheral edge of said outlet opening;

a main valve body disposed within said body of the device, said main valve body mounted movably in a flow direction of fluid into and out of an abutting engagement with said valve seat to control the closing and opening operation of the outlet opening;

a tubular pilot valve body disposed within the body of the device, said pilot valve body mounted movably in the same direction as the direction of movement of said main valve body said pilot valve body causing a change in the fluid pressure acting on an upstream side or a downstream side of said main valve body; and a temperature-actuated means linked to said pilot valve body, said temperature-actuated means deforming when reaching a predetermined temperature.

2. A temperature-actuated valve device as claimed in claim 1, wherein the temperature-actuated means is composed of a member deformable in shape in response to a temperature change in such a way that, at below said predetermined temperature, said temperature-actuated device causes said pilot valve body to move to a position where the fluid pressure acts on the downstream side of said main valve body and, at above said predetermined temperature, said temperature-actuated device causes said pilot valve body to move to a position where the fluid pressure acts on the upstream side of said main valve body.

3. A temperature-actuated valve device as claimed in claim 1, wherein the temperature-actuated means comprises a spring made of a shape-memory alloy.

4. A temperature-actuated valve device as claimed in claim 1, wherein said main valve body is movable within the pilot valve body in the coaxial direction.

5. A temperature-actuated valve device as claimed in claim 1, wherein a biasing means is linked to the pilot valve body and produces an energizing force in the direction opposite an energizing direction of the temperature-actuated means.

6. A temperature-actuated valve device as claimed in claim 1, wherein a biasing means is linked to the main valve body and energizes the main valve body in the direction of separating the main valve body from the valve seat.

7. A temperature-actuated valve device as claimed in claim 1, wherein the body of the device is provided therein with a leak flow path through which fluid leaks to the downstream side while the main valve body is in an abutting engagement with the valve seat.

8. A temperature-actuated valve device as claimed in claim 7, wherein the main valve body is provided with a small hole which passes through in the axial direction.

9. A temperature-actuated valve device as claimed in claim 4, wherein a seal member is disposed between the outer periphery of the main valve body and the inner periphery of the pilot valve body.

* * * * *